(12) United States Patent
Takechi et al.

(10) Patent No.: US 11,648,629 B2
(45) Date of Patent: May 16, 2023

(54) LASER PROCESSING APPARATUS, LASER PROCESSING METHOD, AND CORRECTION DATA GENERATION METHOD

(71) Applicant: Panasonic Intellectual Property Management Co., Ltd., Osaka (JP)

(72) Inventors: Yohei Takechi, Osaka (JP); Jun Yokoyama, Osaka (JP); Takashi Urashima, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 435 days.

(21) Appl. No.: 16/853,742

(22) Filed: Apr. 20, 2020

(65) Prior Publication Data

US 2020/0361038 A1    Nov. 19, 2020

(30) Foreign Application Priority Data

May 16, 2019  (JP) .............................. JP2019-092936
Aug. 21, 2019  (JP) .............................. JP2019-151157

(51) Int. Cl.
*B23K 26/50*  (2014.01)
*B23K 26/06*  (2014.01)
*G01B 11/22*  (2006.01)

(52) U.S. Cl.
CPC .......... *B23K 26/50* (2015.10); *B23K 26/0643* (2013.01); *B23K 26/0648* (2013.01); *G01B 11/22* (2013.01)

(58) Field of Classification Search
CPC ................ B23K 26/50; B23K 26/0643; B23K 26/0648; B23K 26/14; B23K 26/032; G01B 11/22
See application file for complete search history.

(56) References Cited

U.S. PATENT DOCUMENTS 8,735,768 B2    5/2014  Urashima et al.
2011/0222024 A1*  9/2011  Lu ........................ G02B 27/148
353/31

(Continued)

FOREIGN PATENT DOCUMENTS

JP    2000-033488      2/2000
JP    2002-035981 A    2/2002

(Continued)

*Primary Examiner* — Brian W Jennison
(74) *Attorney, Agent, or Firm* — McDermott Will & Emery LLP

(57) ABSTRACT

A laser processing apparatus is used which includes: a laser oscillator that oscillates a processing laser beam at a processing point to be processed on a surface of a workpiece; an optical interferometer that emits a measurement beam to the processing point and generates an optical interference intensity signal based on interference generated due to an optical path difference between the measurement beam reflected at the processing point and a reference beam; a first mirror that changes traveling directions of the processing laser beam and the measurement beam; a second mirror that changes an incident angle of the measurement beam onto the first mirror; a lens that focuses the processing laser beam and the measurement beam on the processing point; a memory that stores corrected processing data; a control unit that controls the laser oscillator, the first mirror, and the second mirror based on the corrected processing data; and a measurement processing unit that derives a depth of a keyhole generated at the processing point by the processing laser beam, based on the optical interference intensity signal.

22 Claims, 38 Drawing Sheets

(56) References Cited

U.S. PATENT DOCUMENTS

| | | | | |
|---|---|---|---|---|
| 2011/0284508 A1* | 11/2011 | Miura | ............... | B23K 31/125 |
| | | | | 219/121.64 |
| 2014/0153085 A1 | 6/2014 | Dobbie | | |
| 2016/0039045 A1* | 2/2016 | Webster | ............... | G01B 11/22 |
| | | | | 356/450 |
| 2017/0326669 A1* | 11/2017 | Moser | ............... | B23K 15/0013 |

FOREIGN PATENT DOCUMENTS

| | | |
|---|---|---|
| JP | 2003-290960 | 10/2003 |
| JP | 2008-030109 | 2/2008 |
| JP | 2011-517428 | 6/2011 |
| JP | 2012-115875 | 6/2012 |
| JP | 2012-236196 | 12/2012 |
| JP | 2013-501964 | 1/2013 |
| JP | 2015-196169 | 11/2015 |
| JP | 6462140 B | 1/2019 |
| WO | 2009/120706 | 10/2009 |

\* cited by examiner

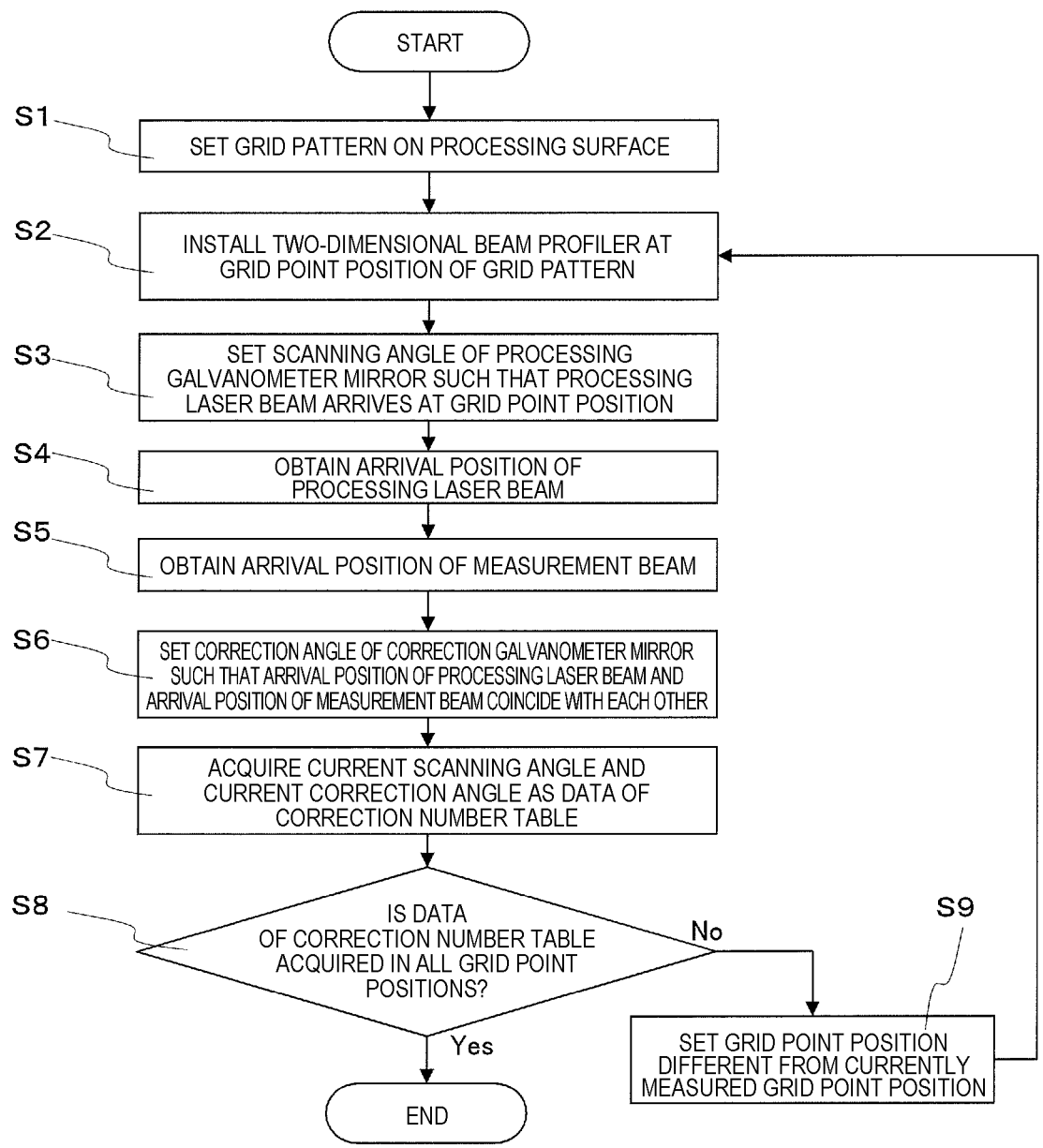

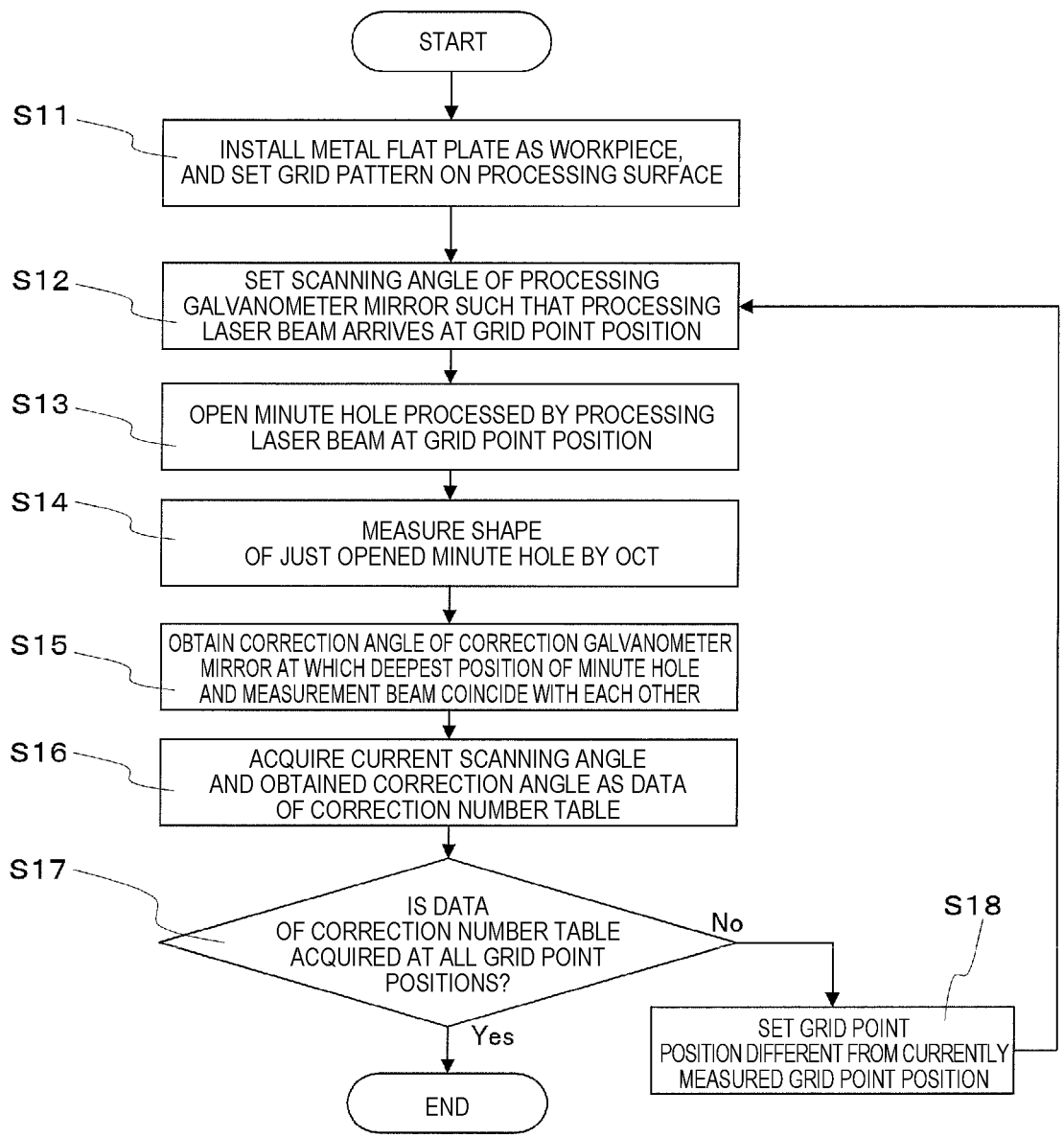

FIG. 7

| DATA NUMBER k | LASER OUTPUT DATA $L_k$ | PROCESSING POINT POSITION x | PROCESSING POINT POSITION y | SCANNING ANGLE $\varphi x_k$ | SCANNING ANGLE $\varphi y_k$ | CORRECTION ANGLE $\psi x_k$ | CORRECTION ANGLE $\psi y_k$ |
|---|---|---|---|---|---|---|---|
| 0 | $L_0$ | $x_0$ | $y_0$ | $\varphi x_0$ | $\varphi y_0$ | $\psi x_0$ | $\psi y_0$ |
| 1 | $L_1$ | $x_1$ | $y_1$ | $\varphi x_1$ | $\varphi y_1$ | $\psi x_1$ | $\psi y_1$ |
| 2 | $L_2$ | $x_2$ | $y_2$ | $\varphi x_2$ | $\varphi y_2$ | $\psi x_2$ | $\psi y_2$ |
| ... | | | | | | | |
| k−1 | $L_{k-1}$ | $x_{k-1}$ | $y_{k-1}$ | $\varphi x_{k-1}$ | $\varphi y_{k-1}$ | $\psi x_{k-1}$ | $\psi y_{k-1}$ |
| k | $L_k$ | $x_k$ | $y_k$ | $\varphi x_k$ | $\varphi y_k$ | $\psi x_k$ | $\psi y_k$ |
| k+1 | $L_{k+1}$ | $x_{k+1}$ | $y_{k+1}$ | $\varphi x_{k+1}$ | $\varphi y_{k+1}$ | $\psi x_{k+1}$ | $\psi y_2$ |
| ... | | | | | | | |

FIG. 26

| DATA NUMBER k | PROCESSING SPEED $V_k$ | SPEED CORRECTION MOVEMENT AMOUNT $Dv_k$ |
|---|---|---|
| 0 | $V_0$ | $Dv_0$ |
| 1 | $V_1$ | $Dv_1$ |
| 2 | $V_2$ | $Dv_2$ |
| ⋮ | ⋮ | ⋮ |
| k−1 | $V_{k-1}$ | $Dv_{k-1}$ |
| k | $V_k$ | $Dv_k$ |
| k+1 | $V_{k+1}$ | $Dv_{k+1}$ |
| ⋮ | ⋮ | ⋮ |

FIG. 27

| DATA NUMBER k | LASER OUTPUT DATA $L_k$ | PROCESSING POINT POSITION $x_k$ | PROCESSING POINT POSITION $y_k$ | PROCESSING SPEED $V_k$ | SCANNING ANGLE $\varphi x_k$ | SCANNING ANGLE $\varphi y_k$ | CORRECTION ANGLE $\psi x_k$ | CORRECTION ANGLE $\psi y_k$ | CORRECTION MOVEMENT AMOUNT $Dx_k$ | CORRECTION MOVEMENT AMOUNT $Dy_k$ |
|---|---|---|---|---|---|---|---|---|---|---|
| 0 | $L_0$ | $x_0$ | $y_0$ | $V_0$ | $\varphi x_0$ | $\varphi y_0$ | $\psi x_0$ | $\psi y_0$ | $Dx_0$ | $Dy_0$ |
| 1 | $L_1$ | $x_1$ | $y_1$ | $V_1$ | $\varphi x_1$ | $\varphi y_1$ | $\psi x_1$ | $\psi y_1$ | $Dx_1$ | $Dy_1$ |
| 2 | $L_2$ | $x_2$ | $y_2$ | $V_2$ | $\varphi x_2$ | $\varphi y_2$ | $\psi x_2$ | $\psi y_2$ | $Dx_2$ | $Dy_2$ |
| ... | ... | ... | ... | ... | ... | ... | ... | ... | ... | ... |
| k−1 | $L_{k-1}$ | $x_{k-1}$ | $y_{k-1}$ | $V_{k-1}$ | $\varphi x_{k-1}$ | $\varphi y_{k-1}$ | $\psi x_{k-1}$ | $\psi y_{k-1}$ | $Dx_{k-1}$ | $Dy_{k-1}$ |
| k | $L_k$ | $x_k$ | $y_k$ | $V_k$ | $\varphi x_k$ | $\varphi y_k$ | $\psi x_k$ | $\psi y_k$ | $Dx_k$ | $Dy_k$ |
| k+1 | $L_{k+1}$ | $x_{k+1}$ | $y_{k+1}$ | $V_{k+1}$ | $\varphi x_{k+1}$ | $\varphi y_{k+1}$ | $\psi x_{k+1}$ | $\psi y_{k+1}$ | $Dx_{k+1}$ | $Dy_{k+1}$ |
| ... | ... | ... | ... | ... | ... | ... | ... | ... | ... | ... |

LASER PROCESSING APPARATUS, LASER PROCESSING METHOD, AND CORRECTION DATA GENERATION METHOD

TECHNICAL FIELD

The present disclosure relates to a laser processing apparatus, a laser processing method, and a correction data generation method used for processing a workpiece.

BACKGROUND

A device that measures the depth of a keyhole generated during metal processing by a laser beam using an optical coherence tomography (OCT) technique that visualizes a structure inside a sample using an optical interferometer has been proposed as a laser processing apparatus according to the prior art (see JP-A-2013-501964). FIG. 38 is a diagram illustrating a configuration of a laser processing apparatus according to the prior art, which is disclosed in JP-A-2013-501964.

In FIG. 38, a processing laser beam 107 and a measurement beam 105 are introduced into a welding head 108. In particular, the measurement beam 105 is arranged to have a coaxial configuration sharing an optical axis with the processing laser beam 107 via a collimator module 106 and a dichroic mirror 110. An OCT optical system using an optical interferometer, which includes an analysis unit 100, an optical fiber 101, a beam splitter 103, an optical fiber 104, a reference arm 102, and a measurement arm 109, is configured as a measurement instrument, and the measurement beam 105 as a measurement beam of the OCT is irradiated through the optical fiber 104.

The processing laser beam 107 and the measurement beam 105 are focused by a condenser lens 111 and are irradiated on an artifact 112, and the artifact 112 is processed by the processing laser beam 107. When the focused processing laser beam 107 is irradiated to a processing portion 113 of the artifact 112, metal constituting the artifact 112 is melted, and the measurement beam 105 is irradiated to the bottom surface of a keyhole formed by a pressure when the molten metal is evaporated, so that the depth of the keyhole can be obtained based on an interference signal generated according to an optical path difference between the measurement beam 105 reflected by the keyhole and a light beam (reference beam) on the reference arm 102 side. Since the keyhole is filled with the surrounding molten metal immediately after being formed, the depth of the keyhole is substantially the same as the depth (penetration depth) of a molten portion of a metal processing portion. Accordingly, the penetration depth of the processing portion 113 is measured.

SUMMARY

In recent years, a configuration in which a galvanometer mirror that is a movable mirror capable of controlling a direction in which a laser beam is reflected in detail and an fθ lens that focuses a laser beam on a processing point on a surface of a workpiece are combined to optically scan a processing laser beam has been widely known as a laser processing apparatus. When a laser processing apparatus configured by a combination of an fθ lens and a galvanometer mirror is applied to a method of measuring a depth of a keyhole, disclosed in JP-A-2013-501964, a deviation may occur between a processing laser beam and a measurement beam on a surface of a workpiece due to chromatic aberration characteristics of the fθ lens due to a difference between wavelengths of a processing laser beam and a measurement beam. Therefore, it is difficult to accurately measure the depth of a keyhole.

In light of these concerns, an objective of the present disclosure is to provide a laser processing apparatus, a control method, and a method of generating corrected data, which can realize accurate measurement of the depth of a keyhole.

In order to solve the above-described problems, a laser processing apparatus is used which includes: a laser oscillator that oscillates a processing laser beam at a processing point to be processed on a surface of a workpiece; an optical interferometer that emits a measurement beam to the processing point and generates an optical interference intensity signal based on interference generated due to an optical path difference between the measurement beam and a reference beam reflected at the processing point; a first mirror that changes traveling directions of the processing laser beam and the measurement beam; a second mirror that changes an incident angle of the measurement beam onto the first mirror; a lens that focuses the processing laser beam and the measurement beam on the processing point; a memory that stores corrected processing data; a control unit that controls the laser oscillator, the first mirror, and the second mirror based on the corrected processing data; and a measurement processing unit that derives a depth of a keyhole generated at the processing point by the processing laser beam, based on the optical interference intensity signal.

Further, a laser processing method is used in which the laser processing method is performed by a laser processing apparatus having: a first mirror that changes traveling directions of a processing laser beam and a measurement beam; a second mirror that changes an incident angle of the measurement beam onto the first mirror; a beam shift mechanism that changes an incident position of the measurement beam onto the first mirror; and a lens that focuses the processing laser beam and the measurement beam on a processing point on a surface of a workpiece, the first mirror, the second mirror, and the beam shift mechanism are controlled based on corrected processing data, the workpiece is irradiated with the processing laser beam and the measurement beam, the depth of a keyhole generated at the processing point by being irradiated with the processing laser beam is measured based on interference caused by an optical path difference between the measurement beam and a reference beam reflected at the processing point, and the corrected processing data is data obtained by correcting processing data generated in advance for processing the workpiece to eliminate a deviation of an arrival position of at least one of the processing laser beam and the measurement beam on the surface of the workpiece, which is caused by chromatic aberration of the lens, and a deviation between an angle of the keyhole and an angle of the measurement beam.

A first corrected data generation method is used in which in a method of generating corrected data, corrected processing data obtained by correcting processing data generated in advance for processing the workpiece to eliminate the deviation of the arrival position of at least one of the processing laser beam and the measurement beam onto the workpiece, which is caused by chromatic aberration of the lens, is generated in a laser processing apparatus having: a first mirror that changes traveling directions of a processing laser beam and a measurement beam; a second mirror that changes an incident angle of the measurement beam onto the first mirror; and a lens that focuses the processing laser beam and the measurement beam on a surface of a workpiece, in order to perform desired laser processing on the workpiece, processing data including an output intensity of the processing laser beam, which is set for each processing point where the surface of the workpiece is to be processed and with which the processing point is irradiated, and a first operation amount by which the first mirror is operated such that the processing laser beam arrives at the processing point is generated, a second operation amount by which the second mirror is operated such that the measurement beam arrives at each desired position on the surface of the workpiece is calculated for the position, and a third operation amount by which the second mirror is operated such that the measurement beam arrives at each processing point is calculated for the processing point based on the second operation amount, and is added to the processing data, so that the corrected processing data is generated.

The first corrected data generation method is used in which when the third operation amount is calculated for each processing point based on the second operation amount, and is added to the processing data, so that the corrected processing data is generated, if the processing point and the position do not coincide with each other, the third operation amount is calculated by performing interpolation processing at a predetermined number of the positions using the second operation amount in an order close to the processing point.

The first corrected data generation method is used in which the position is set in a range of the surface of the workpiece corresponding to a movable range of the first mirror and is set such that the interpolation processing is possible within the range.

Further, a second corrected data generation method is used in which in a method of generating corrected data, the method being performed by a laser processing apparatus having: a first mirror that changes traveling directions of a processing laser beam and a measurement beam; a second mirror that changes an incident angle of the measurement beam to the first mirror; a beam shift mechanism that changes an incident position of the measurement beam to the first mirror; and a lens that focuses the processing laser beam and the measurement beam onto a surface of a workpiece, processing data in which an output intensity of the processing laser beam and an operation amount of the first mirror for causing the processing laser beam to arrive at the processing point are set is generated for each processing point on the surface of the workpiece, a first operation amount that is an operation amount of the second mirror for causing the measurement beam to arrive at each predetermined position on the surface of the workpiece is calculated for the predetermined position, a second operation amount that is an operation amount of the second mirror for causing the measurement beam to arrive at the processing point is calculated for each processing point based on the first operation amount, a third operation amount that is an operation amount of the beam shift mechanism for causing the measurement beam to arrive at each predetermined position on the surface of the workpiece is calculated for the predetermined position and each processing speed, a fourth operation amount that is an operation amount of the beam shift mechanism for causing the measurement beam to arrive at each processing point is calculated at the processing point based on the third operation amount, and corrected processing data corrected to eliminate a deviation of an arrival position of at least one of the processing laser beam and the measurement beam to the workpiece, which is caused by chromatic aberration of the lens, and a deviation between an angle of the keyhole and an angle of the measurement beam is generated by adding the second operation amount and the fourth operation amount to the processing data.

The second corrected data generation method is used in which in calculating the second operation amount, when the processing point and the predetermined position do not coincide with each other, the second operation amount is calculated by performing interpolation processing at a predetermined number of the predetermined positions in an order close to the processing point using the first operation amount.

The second corrected data generation method is used in which in calculating the fourth operation amount, when the processing point and the predetermined position do not coincide with each other, the fourth operation amount is calculated by performing interpolation processing at the predetermined number of the positions in an order close to the processing point using the third operation amount.

The second corrected data generation method is used in which the predetermined position is set in a range of the surface of the workpiece corresponding to a movable range of the first mirror and is set such that the interpolation processing can be executed within the range.

According to the present disclosure, accurate measurement of the depth of a keyhole can be realized.

BRIEF DESCRIPTION OF THE DRAWINGS

FIG. 5 is a flowchart illustrating a first example of a method of creating correction number table data;

FIG. 6 is a flowchart illustrating a second example of the method of creating correction number table data;

FIG. 7 is a diagram illustrating a data configuration of corrected processing data;

FIG. 26 is a diagram illustrating correction number table data of the speed correction movement amount;

FIG. 27 is a diagram illustrating an example of a configuration of the corrected processing data;

DESCRIPTION OF EMBODIMENTS

Hereinafter, embodiments of the present disclosure will be described with reference to the drawings.

Embodiment 1: First Case

Configuration of Laser Processing Apparatus

Figure 1:
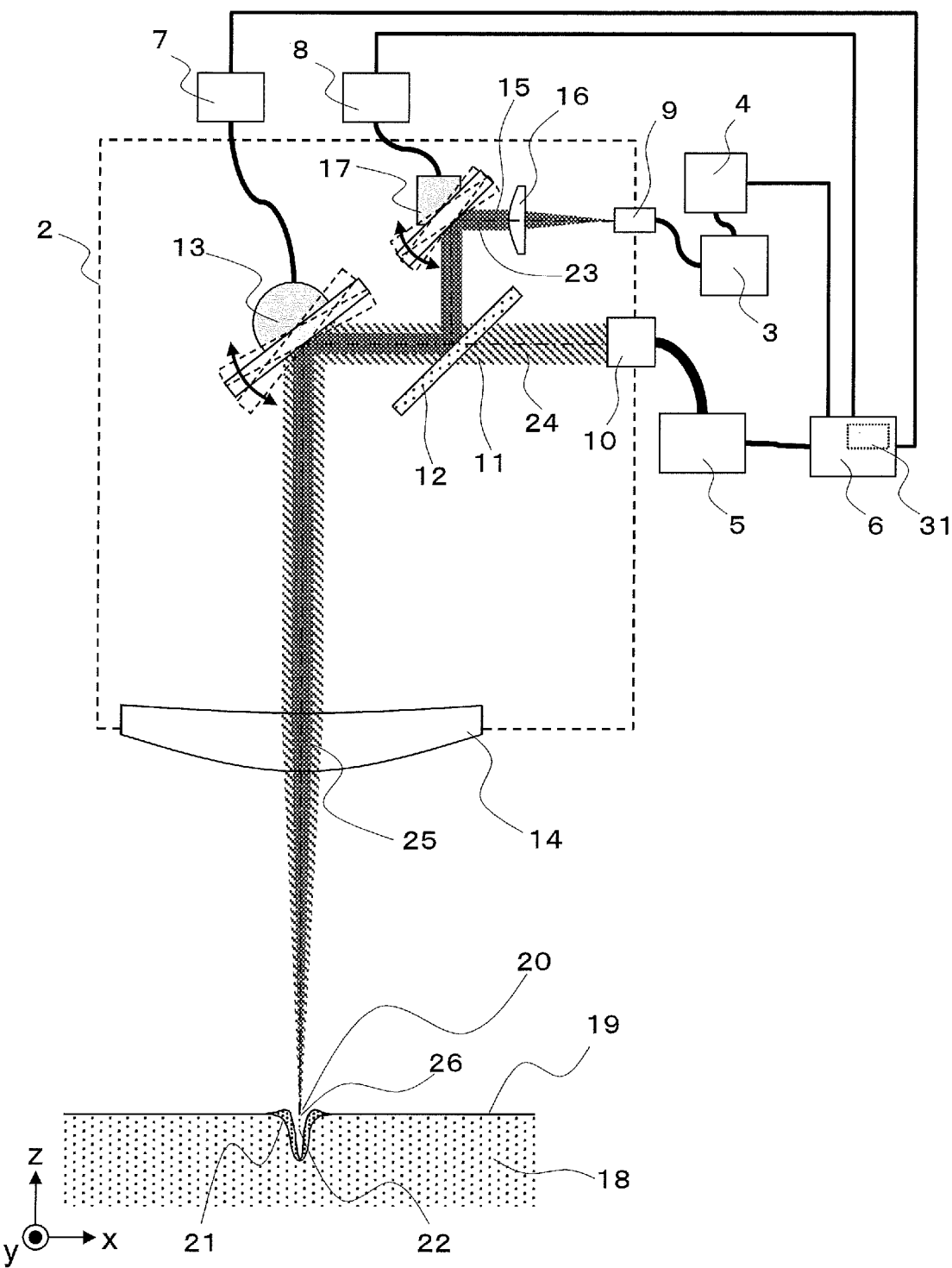
FIG. 1 is a diagram illustrating a configuration of a laser processing apparatus according to an embodiment of the present disclosure.

FIG. 1 is a diagram illustrating a configuration of a laser processing apparatus 1 according to embodiment 1 of the present disclosure. The laser processing apparatus 1 includes a processing head 2, an optical interferometer 3, a measurement processing unit 4, a laser oscillator 5, and a control unit 6. The optical interferometer 3 emits a measurement beam 15 for OCT measurement, and the laser oscillator 5 oscillates a processing laser beam 11 for laser processing. The measurement beam 15 is input to the processing head 2 from a measurement beam inlet 9, and the processing laser beam 11 oscillated by the laser oscillator 5 is input to the processing head 2 from a processing beam inlet 10.

The processing laser beam 11 introduced from the processing beam inlet 10 passes through a dichroic mirror 12, is reflected by a first mirror 13, passes through a lens 14, and is focused on a processing surface 19 on the surface of a workpiece 18. Accordingly, a processing point 20 of the workpiece 18 is laser-processed. At this time, the processing point 20 irradiated with the processing laser beam 11 is melted, and a molten pool 21 is formed. Further, the molten metal is evaporated from the molten pool 21, and a keyhole 22 is formed by the pressure of steam generated during the evaporation.

The measurement beam 15 introduced from the measurement beam inlet 9 is converted into a parallel beam by a collimating lens 16, is reflected by a second mirror 17 and the dichroic mirror 12, is reflected by the first mirror 13, passes through the lens 14, and is focused on the processing point 20 on the surface of the workpiece 18. Then, the measurement beam 15 is reflected by the bottom surface of the keyhole 22, reaches the optical interferometer 3 along a propagation path, and generates an interference signal in the optical interferometer 3 due to optical interference with a reference beam that is not illustrated. The measurement processing unit 4 derives the depth of the keyhole 22, that is, the penetration depth of the processing point 20, from the interference signal. The penetration depth means a distance between the highest point of a melted portion of the workpiece 18 and the processing surface 19.

The wavelength of the processing laser beam 11 and the wavelength of the measurement beam 15 are different from each other. The dichroic mirror 12 has such characteristics that the dichroic mirror 12 transmits a light beam having the wavelength of the processing laser beam 11 and reflects a light beam having the wavelength of the measurement beam 15.

The first mirror 13 and the second mirror 17 are movable mirrors that can be rotated about two or more axes. In the present embodiment, each of the first mirror 13 and the second mirror 17 is a galvanometer mirror. The first mirror 13 and the second mirror 17 are connected to the control unit 6 via a first driver 7 and a second driver 8, respectively, and are operated under control of the control unit 6. The control unit 6 has a built-in memory 31 for holding processing data for performing desired processing on the workpiece 18 and correction data for performing correction, which will be described below.

In an example illustrated in FIG. 1, only rotation of the first mirror 13 and the second mirror 17 about a rotation axis perpendicular to a paper surface is illustrated as indicated by broken lines. However, actually, the first mirror 13 and the second mirror 17 are configured to be rotatable about two or more axes as described above, and for example, can rotate about a rotation axis parallel to the paper surface. In the following description, for simplicity, as illustrated in FIG. 1, a case will be described in which the first mirror 13 and the second mirror 17 perform only a rotation operation about the rotation axis perpendicular to the paper surface. However, the present disclosure is not limited thereto, and the first mirror 13 and the second mirror 17 can also perform a rotation operation about another rotation axis.

When the second mirror 17 is located at an original position, a measurement optical axis 23 of the measurement beam 15 coincides with a processing optical axis 24 of the processing laser beam 11 after being reflected by the dichroic mirror 12.

Further, when the first mirror 13 is located at an original position, if the processing laser beam 11 is reflected by the first mirror 13 and passes through the lens 14, the processing optical axis 24 of the processing laser beam 11 coincides with a lens optical axis 25 that is the center of the lens 14. In the following description, when the processing laser beam 11 and the measurement beam 15 pass through the center of the lens 14, an arrival position (irradiation position) of the processing laser beam 11 and the measurement beam 15 on the processing surface 19 of the workpiece 18 is described as a processing original point 26.

That is, the original positions of the first mirror 13 and the second mirror 17 are positions where the processing laser beam 11 and the measurement beam 15 pass through the center of the lens 14.

The lens 14 is a lens for focusing the processing laser beam 11 and the measurement beam 15 on the processing point 20. In the present embodiment, the lens 14 is an fθ lens.

The first mirror 13 and the lens 14 constitute a general optical scanning system including a galvanometer mirror and an fθ lens. Therefore, by rotating the first mirror 13 from the original position by a predetermined operation amount, a position where the processing laser beam 11 reaches the processing surface 19 can be controlled. The operation amount of the first mirror 13 for irradiating a desired processing point 20 with the processing laser beam 11 can be uniquely set when a positional relationship between optical members constituting the processing head 2 and a distance from the lens 14 to the processing surface 19 are determined.

It is preferable that in the distance from the lens 14 to the processing surface 19, a focal position where the processing laser beam 11 is most focused and the processing surface 19 are arranged to coincide with each other such that the processing by the processing laser beam 11 is performed most efficiently. However, the present disclosure is not limited thereto, and the distance from the lens 14 to the processing surface 19 may be determined to a predetermined distance according to a processing application.

As an operation angle (operation amount) of the first mirror 13 is changed according to a predetermined operation schedule, the position of the processing point 20 on the processing surface 19 can be scanned. Further, as the laser oscillator 5 is switched between an ON state and an OFF state under control of the control unit 6, a predetermined position on the processing surface 19 can be laser-processed in a predetermined pattern within a scannable range of the processing laser beam 11.

Effect of Chromatic Aberration

Figure 2:
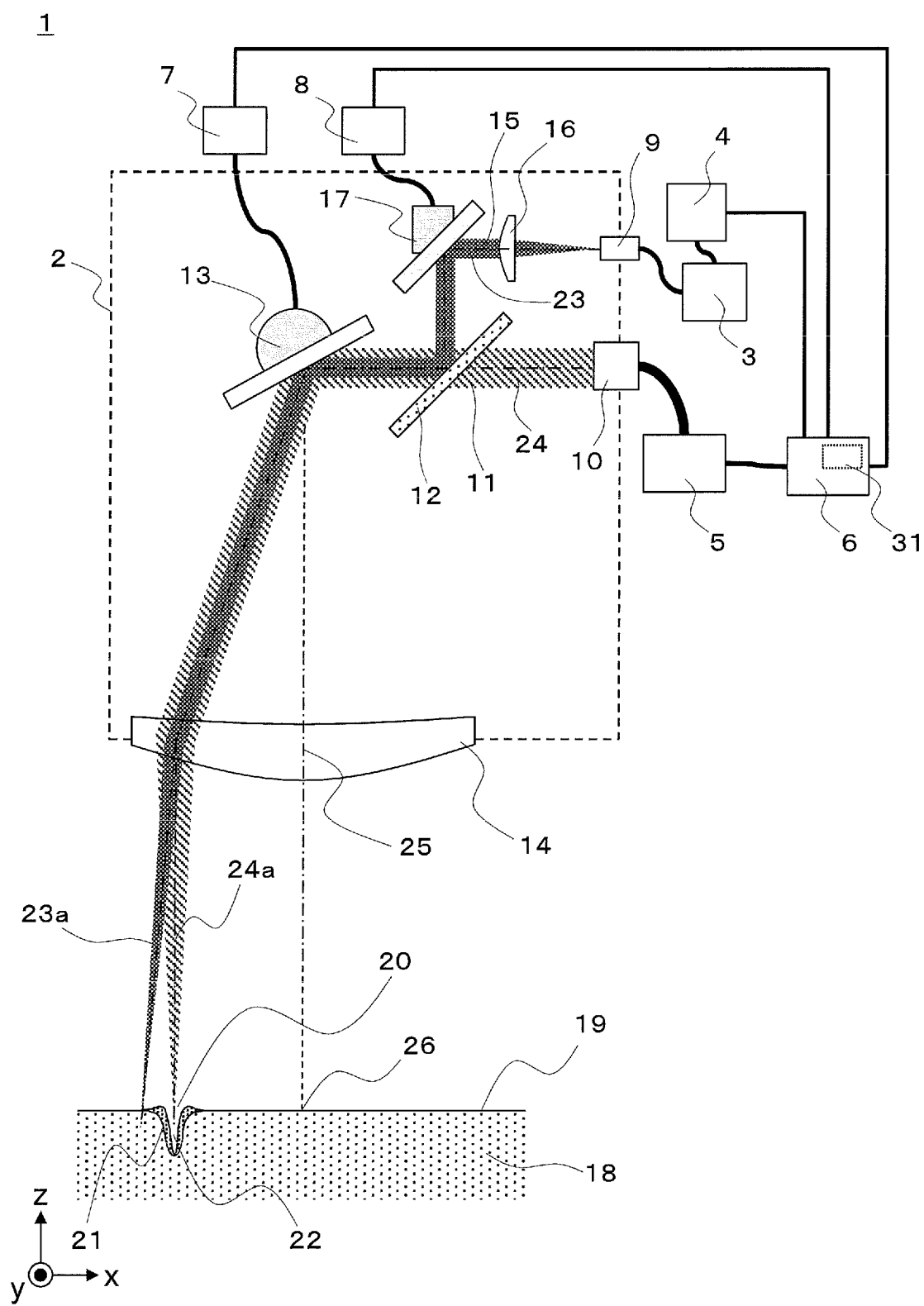
FIG. 2 is a diagram illustrating the laser processing apparatus in a state in which a first mirror is operated from an original position.

FIG. 2 is a diagram illustrating the laser processing apparatus 1 in a state in which a first mirror 13 is operated from the original position. In FIG. 2, it is assumed that the second mirror 17 is at the original position.

In an example illustrated in FIG. 2, the processing laser beam 11 and the measurement beam 15 reflected by the first mirror 13 travel on the same optical axis until the processing laser beam 11 and the measurement beam 15 reach the lens 14. However, after the processing laser beam 11 and the measurement beam 15 pass through the lens 14, as shown in FIG. 2, a deviation occurs in a traveling direction of the processing laser beam 11 and the measurement beam 15, and the measurement beam 15 thus reaches a position different from the processing point 20. In FIG. 2, an optical axis of the processing laser beam 11 is referred to as a processing optical axis 24a, and an optical axis of the measurement beam 15 is referred to as a measurement optical axis 23a.

This is caused by the chromatic aberration of the lens 14. The chromatic aberration is an aberration generated since a general optical material including the lens 14 has a property that the refractive index varies depending on the wavelength of light.

There are two kinds of the chromatic aberration, including an axial chromatic aberration and a chromatic aberration of magnification. The axial chromatic aberration refers to a property that a focal position of a lens varies depending on the wavelength of light, and the chromatic aberration of magnification refers to a property that an image height on a focal plane varies depending on the wavelength of light. In FIG. 2, the deviation in the traveling direction of the processing laser beam 11 and the measurement beam 15 after the processing laser beam 11 and the measurement beam 15 pass through the lens 14 is caused by the chromatic aberration of magnification.

In the laser processing apparatus 1 according to the embodiment of the present disclosure, the axial chromatic aberration also occurs. However, in the deviation between the processing laser beam 11 and the measurement beam 15 due to the axial chromatic aberration, a distance between the collimating lens 16 and the measurement beam inlet 9 is adjusted, and the measurement beam 15 immediately after passing through the collimating lens 16 slightly diverges or converges from a parallel light state, so that it is possible to cope with the deviation.

In FIG. 2, with respect to the processing original point 26, the measurement beam 15 reaches a position on the processing surface 19 which is farther than a position which the processing laser beam 11 reaches. However, this is only an example. The measurement beam 15 may reach a position that is closer to the processing original point 26 than the processing laser beam 11 due to a lens configuration of the lens 14 and a magnitude relationship between the wavelengths of the processing laser beam 11 and the measurement beam 15. In general, a beam having a longer wavelength reaches a position farther from the processing original point 26.

For example, a method of making the lens 14 have properties of an achromatic lens exists as a method of correcting the chromatic aberration of magnification. However, when the lens 14 is to have both the properties of an fθ lens and the properties of an achromatic lens, a very advanced optical design technique is required, and large amounts of time and costs are required for designing the lens 14. Therefore, in the present disclosure, as described below, the chromatic aberration of magnification is corrected with low costs by operating the second mirror 17.

Method of Correcting Chromatic Aberration of Magnification

Figure 3:
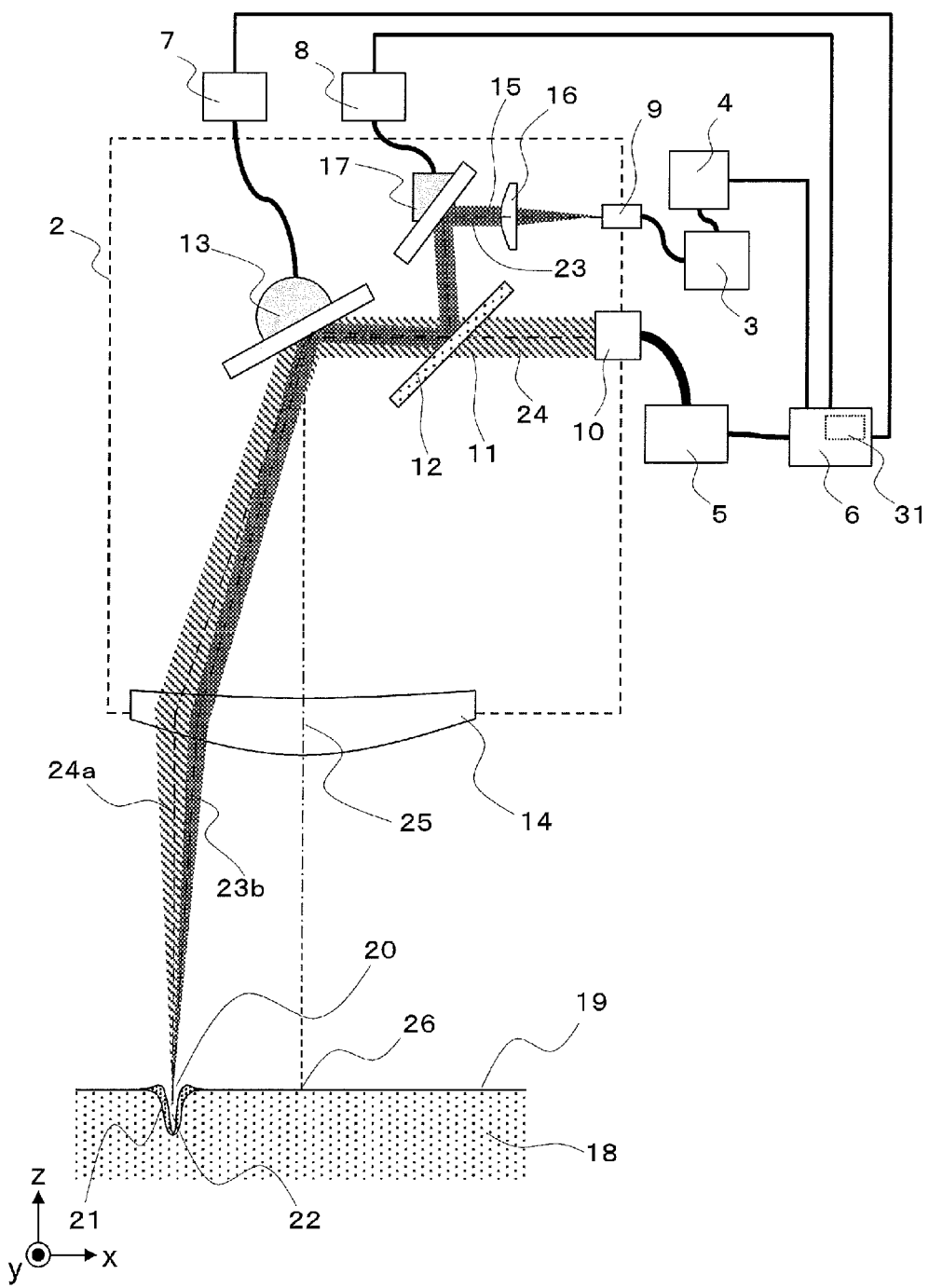
FIG. 3 is a diagram illustrating the laser processing apparatus in a state in which a deviation between arrival positions of a processing laser beam and a measurement beam due to the chromatic aberration of magnification is corrected.

FIG. 3 is a diagram illustrating the laser processing apparatus 1 in a state in which a deviation between arrival positions of the processing laser beam 11 and the measurement beam 15 due to the chromatic aberration of magnification is corrected.

In FIG. 3, the second mirror 17 is operated by a predetermined operation angle (movement amount) from the original position. Accordingly, the processing optical axis 24 of the processing laser beam 11 and the measurement optical axis 23 of the measurement beam 15 are not coaxial from the dichroic mirror 12 to the lens 14. However, after passing through the lens 14, the processing laser beam 11 and the measurement beam 15 reach the same processing point 20 on the processing surface 19. In FIG. 3, the processing optical axis 24a of the processing laser beam 11 passes through the same position as in FIG. 2, and a measurement optical axis 23b of the measurement beam 15 after being corrected by the operation of the second mirror 17 passes through a position different from the measurement optical axis 23a as in FIG. 2.

A predetermined operation amount by which the second mirror 17 is operated from the original position is associated with an operation amount of the first mirror 13 on a one-to-one basis. Since the operation amount of the first mirror 13 is uniquely determined by the position of the processing point 20 at which the processing laser beam 11 (and the measurement beam 15) is irradiated, an operation amount of a second movable mirror is also uniquely determined by the position of the processing point 20 at which the measurement beam 15 is irradiated. The operation amount of the second mirror 17 from the original position is referred to as a correction angle in the following description. Hereinafter, a method of obtaining the correction angle will be described.

Relationship Between Correction Angle and Scanning Angle

In the lens 14 which is an fθ lens, when the focal length of the lens 14 is f, the angle of a light beam incident on the lens 14 from the lens optical axis 25 is θ, and the distance (referred to as an image height) of a light beam passing through the lens 14 from an optical axis on an image plane is h, a relationship $h=f\theta$ is established.

In the present embodiment, as described above, the first mirror 13 has two rotating axes. When the two axes are an x axis and a y axis, if an angle of an x axis component of the light beam reflected by the first mirror 13 from the lens optical axis 25 is $\theta x$ and an angle of a y axis component of the light beam from the same lens optical axis 25 is $\theta y$, when image heights in an x direction and a y direction on the image plane are x and y, respectively, a relationship $x=f\theta x$ and $y=f\theta y$ is established.

Thus, when the position of the processing point where the processing laser beam 11 reaches the processing surface 19 is (x, y), $(x, y)=(f\theta x, f\theta y)$. Further, since an emission angle of the reflected light beam from the mirror when the light beam is incident on a mirror is changed to twice an angle change amount of the mirror, when an operation amount (operation angle) of the first mirror 13 from the original position is ($\varphi x$, $\varphi y$), a relationship $(2\varphi x, 2\varphi y)=(\theta x, \theta y)$ is established. In the following description, the operation angle ($\varphi x$, $\varphi y$) of the first mirror 13 from the original position is referred to as a scanning angle.

As described above, in the laser processing apparatus 1 according to the embodiment of the present disclosure, when the angle amount of the first mirror 13, that is, the scanning angle ($\varphi x$, $\varphi y$), is determined, an arrival position of the processing laser beam 11 on the processing surface 19, that is, the position (x, y) of the processing point 20, is also determined.

As described above, the scanning angle is uniquely determined by the position of the processing point 20, and similarly, the correction angle is uniquely determined by the position of the processing point 20. That is, a relationship between the scanning angle and the correction angle is derived in advance for each position of the processing point 20, and the second mirror 17 is operated only by the correction angle corresponding to the position of the processing point 20 during processing, so that the deviation of the measurement beam 15 due to the chromatic aberration of magnification can be corrected.

Hereinafter, a method of creating correction number table data indicating a correspondence between the scanning angle and the correction angle for each processing point 20 will be described.

Method of Creating Correction Number Table Data

Figure 4:
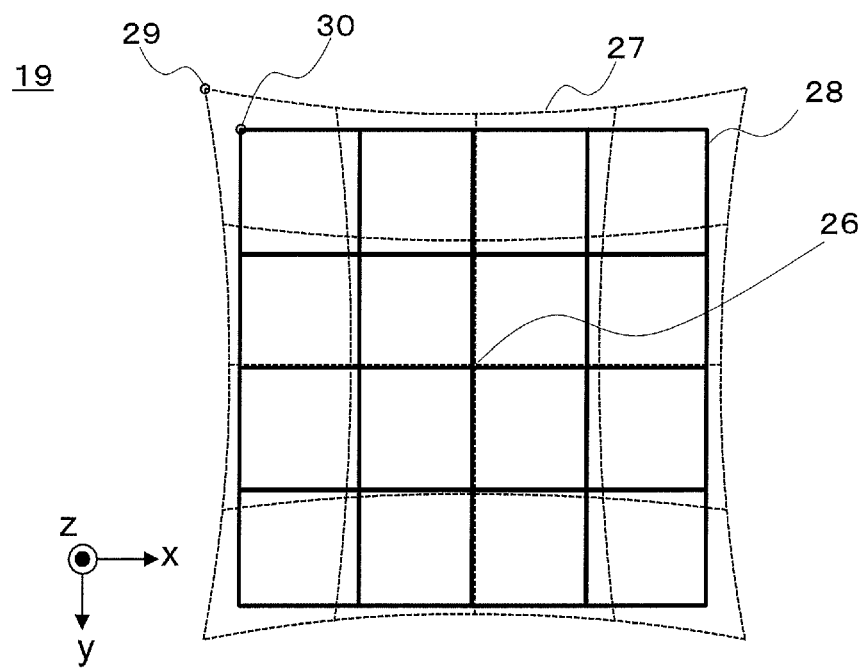
FIG. 4 is a diagram illustrating trajectories of the processing laser beam and the measurement beam on a processing surface when the surface of a workpiece is scanned in a grid shape by operating only a first mirror without operating a second mirror in a state in which the processing surface is viewed from a lens side.

FIG. 4 is a diagram illustrating trajectories of the processing laser beam 11 and the measurement beam 15 on the processing surface 19 when the surface of the workpiece 18 is scanned in a grid shape with operating only the first mirror 13 without operating the second mirror 17 in a state in which the processing surface 19 is viewed from the lens 14 side.

In FIG. 4, a processing beam trajectory 28 which is a trajectory of the processing laser beam 11 is indicated by a solid line, and a measurement beam trajectory 27 which is a trajectory of the measurement beam 15 is indicated by a broken line. In an example illustrated in FIG. 4, the chromatic aberration of magnification is not corrected since the second mirror 17 is not operated. Therefore, although the trajectories of the processing laser beam 11 and the measurement beam 15 coincide with each other in the vicinity of the processing original point 26, the deviation between both trajectories increases as a distance from the processing original point 26 increases. Accordingly, while the processing beam trajectory 28 describes a grid-like pattern without distortion, the measurement beam trajectory 27 describes a distorted pincushion trajectory. The shape of the measurement beam trajectory 27 illustrated in FIG. 4 is an example, and the distortion shape of the measurement beam trajectory 27 can change depending on optical characteristics of the lens 14.

Although FIG. 4 illustrates a grid pattern of 4×4 squares at equal intervals as an example, the present disclosure is not limited thereto. The grid pattern for scanning may be set to a grid having a smaller number of squares, or a grid interval of a region requiring particularly accuracy may be reduced in relation to the chromatic aberration of magnification of the fθ lens. Further, a radial grid pattern may be set. However, in the present embodiment, since the correction angle is set by two axes of the x axis and the y axis, an orthogonal grid pattern as illustrated in FIG. 4 is more preferable.

Comparing the processing beam trajectory 28 and the measurement beam trajectory 27 illustrated in FIG. 4, it can be seen that a deviation occurs at each corresponding grid point of the grid pattern.

In order to create the correction number table data, it is required to determine the correction angle such that a processing beam grid point 30 which is one grid point on the processing beam trajectory 28 and a corresponding measurement beam grid point 29 of the measurement beam trajectory 27 coincide with each other.

Hereinafter, a method for obtaining a correction angle at a certain grid point position will be described.

FIG. 5 is a flowchart illustrating a first example of a method of creating correction number table data.

In step S1, as in the processing beam trajectory 28 illustrated in FIG. 4, a grid pattern in a range in which laser processing is performed on the processing surface 19 is set.

In step S2, a two-dimensional beam profiler (not illustrated) is installed at a position of the grid pattern. At this time, the height position of the detection surface of the two-dimensional beam profiler is set to coincide with the processing surface 19.

In step S3, the scanning angle of the first mirror 13 is set such that the processing laser beam 11 reaches the grid point position.

In step S4, the processing laser beam 11 is irradiated, and the arrival position where the processing laser beam 11 actually reaches the processing surface 19 is obtained using the two-dimensional beam profiler.

In step S5, the measurement beam 15 is irradiated, and the arrival position where the measurement beam 15 actually reaches the processing surface 19 is obtained using the two-dimensional beam profiler.

In step S6, the correction angle of the second mirror 17 is set with reference to the measurement result of the two-dimensional beam profiler such that the arrival position of the processing laser beam 11 obtained in step S4 and the arrival position of the measurement beam 15 coincide with each other.

In step S7, the set scanning angle and the set correction angle are stored in the memory 31 as data of a correction number table.

In step S8, it is determined whether or not the data of the correction number table is acquired at all grid points of the grid pattern set in step S1. If the data is acquired at all the grid points (step S8: Yes), the process is terminated, otherwise (step S8: No), the process proceeds to step S9.

In step S9, different grid point positions are set, and the process returns to step S2.

Next, a second example of a method of creating correction number table data will be described. FIG. 6 is a flowchart illustrating a second example of the method of creating correction number table data.

In step S11, a metal flat plate (hereinafter, referred to as a metal plate) or the like is installed as a temporary workpiece, and as in the processing beam trajectory 28 illustrated in FIG. 4, a grid pattern in a range in which laser processing is performed is set on the processing surface 19.

In step S12, the scanning angle of the first mirror 13 is set such that the processing laser beam 11 reaches the grid point position.

In step S13, the processing laser beam 11 is irradiated to make a minute hole in the surface of the metal plate. At this time, the output intensity and the irradiation time of the processing laser beam 11 are adjusted such that the workpiece 18 is penetrated. It is preferable that the diameter of the minute hole is about two to three times as large as a measurement resolution of the optical interferometer 3.

In step S14, the shape of the made minute hole is measured by the optical interferometer 3. At this time, by operating the second mirror 17 to some extent from an angular position and scanning the measurement beam 15, it is possible to measure a three-dimensional shape near the minute hole.

In step S15, a correction angle at which the measurement beam 15 reaches the deepest part of the minute hole is obtained using the shape measurement data measured in step S14.

In step S16, the correction angle obtained in step S15, the scanning angle at this time, and the correction number table data are stored in the memory 31.

In step S17, it is determined whether or not the data of the correction number table is acquired at all the grid points of the grid pattern set in step S10. If the data is acquired at all the grid points (step S17: Yes), the process is terminated, otherwise (step S17: No), the process proceeds to step S18.

In step S18, different grid point positions are set, and the process returns to step S12.

The correction number table data is obtained by the method described above. In the example illustrated in FIG. 4, only the correction number table data at 16 grid points on the 4×4 grid pattern can be created. However, actually, it is preferable that the grid pattern is made finer, so that the correction number table data at more grid points is acquired. However, even when the very fine grid pattern data is used to create the correction number table data, the operation angle (scanning angle) of the first mirror 13 can be set to any value as long as the value belongs to an operation range of a mechanism, and thus the scanning angle may not coincide with the correction number table data. In such a case, it is necessary to obtain the correction angle by interpolating the correction number table data. A method of obtaining the correction angle by interpolating the correction number table data will be described below.

Processing Data Creation Method

Next, flow of a method of creating processing data for processing the workpiece 18 will be described.

Conventionally, in a laser processing apparatus having an fθ lens and a galvanometer mirror, a control unit controls the laser oscillator and the galvanometer mirror by using processing data in which an output indication value to a laser oscillator and a scanning angle data item are set for each processing point. The processing data is arranged in a chronological order, and the laser processing of the entire workpiece is performed by processing all the processing points on the surface of the workpiece in a chronological order.

In the laser processing apparatus 1 according to the embodiment of the present disclosure, the correction angle is added as a data item of the processing data in addition to the output indication value to the laser oscillator, the position of the processing point, and the scanning angle. In the following description, the processed data to which the correction angle is added as the data item in this manner is referred to as corrected processing data.

FIG. 7 is a diagram illustrating a data configuration of the corrected processing data. As illustrated in FIG. 7, the corrected processing data includes: as a set of data items, a data number k indicating an order of the processing data; a processing point position $x_k$ in the x direction; a processing point position $y_k$ in the y direction; laser output data $L_k$ indicating the output indication value to the laser oscillator; a scanning angle $\varphi x_k$ of the first mirror 13 responsible for scanning in the x direction; a scanning angle $\varphi y_k$ of the first mirror 13 responsible for scanning in the y direction; a correction angle $\psi x_k$ of the second mirror 17 responsible for correction of a measurement beam in the x direction; and a correction angle $\psi y_k$ of the second mirror 17 responsible for correction of a measurement beam in the y direction. The suffix k of each data item other than the data number k indicates that the data item corresponds to the data number k. The scanning angle in the corrected processed data is an example of a first indication value of the present disclosure, and the correction angle in the corrected processed data is an example of a second indication value of the present disclosure.

Figure 8:
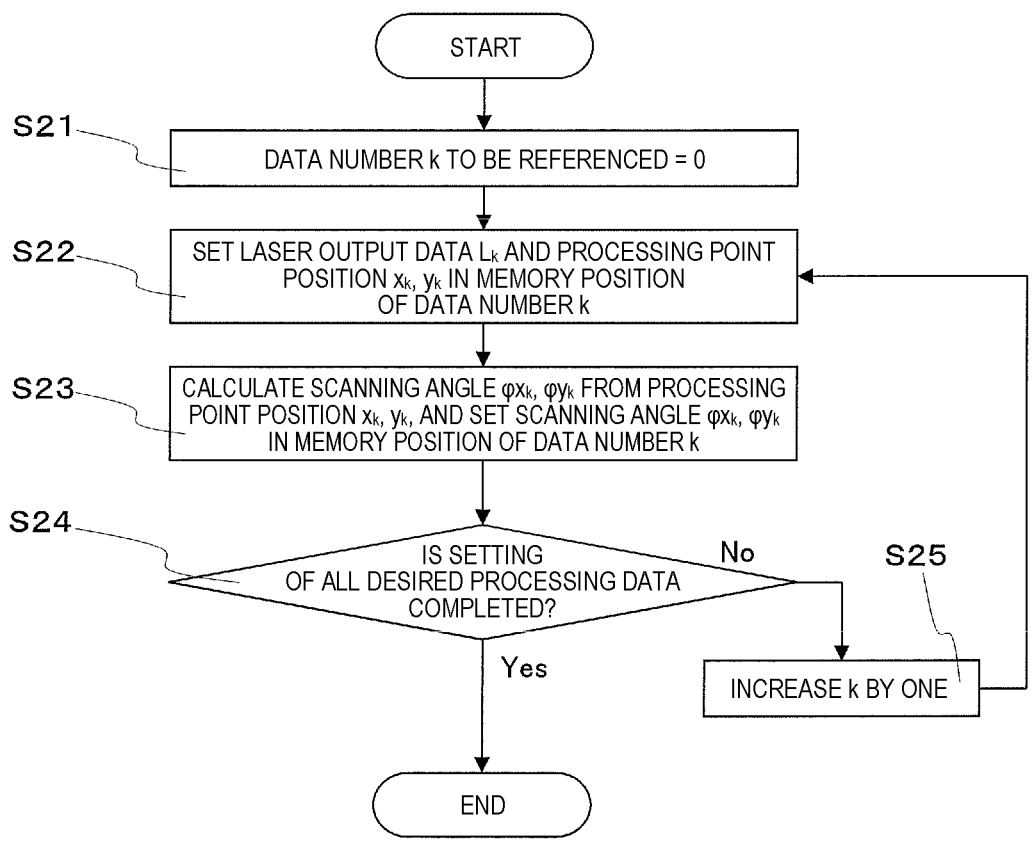
FIG. 8 is a flowchart for illustrating a process of creating the corrected processing data.

FIG. 8 is a flowchart for illustrating a process of creating the corrected processing data.

In step S21, the data number k attached to the area in the memory 31 where the processing data is stored is set to 0.

In step S22, the laser output data $L_k$ and the processing point positions $x_k$ and $y_k$ are stored in the area of the data number k in the memory 31. These values are set values set by a user of the laser processing apparatus 1 using a manipulation unit (a keyboard, a mouse, a touch panel, or the like) that is not illustrated, in order to realize desired laser processing.

In step S23, the scanning angles $\varphi x_k$ and $\varphi y_k$ of the first mirror 13 are calculated from the processing point positions $x_k$ and $y_k$ stored in step S22, and are stored in the area of the data number k in the memory 31. When the focal length of the lens 14 is f, a relationship of $(x_k, y_k)=(2f \cdot \varphi x_k, 2f \cdot \varphi y_k)$ between the processing point position and the scanning angle is established, and thus the scanning angle is automatically determined from the processing point position. A relational expression between the processing point position and the scanning angle, a correspondence number table, and the like may be set by the user in advance, and in this case, the scanning angle may be determined using the set items.

In step S24, it is determined whether or not all the settings of the corrected processing data are completed. When all the settings of the corrected processing data are completed (step S24: Yes), the process is terminated, otherwise (step S24: No), the process proceeds to step S25.

In step S25, the data number k to be referenced is increased by one, and the process returns to step S22. Accordingly, the corrected processing data is set for all the data numbers k.

Correction Angle Setting Method

Next, a method of determining a correction angle for each processing point position in the corrected processing data will be described.

Figure 9:
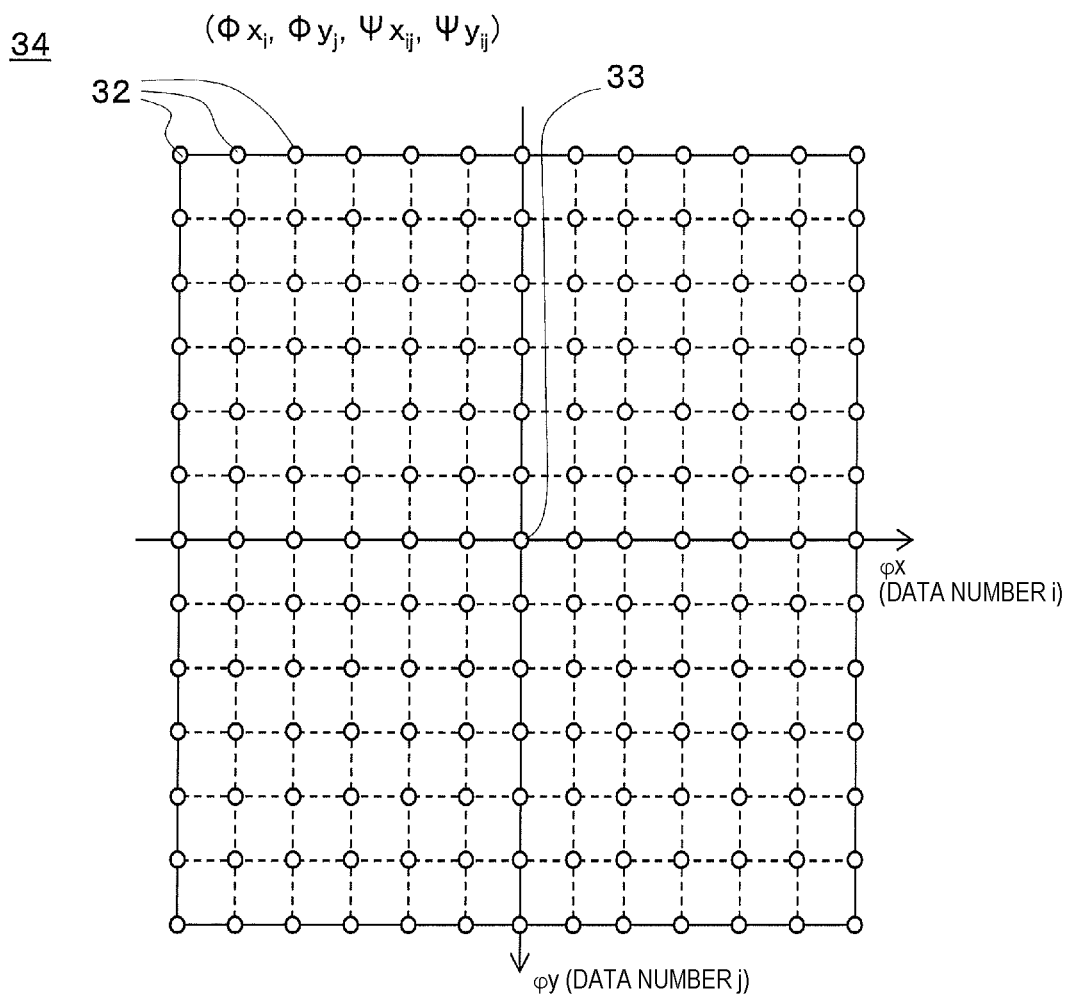
FIG. 9 is a diagram for illustrating a correction number table schematically illustrating a data configuration of correction number table data.

FIG. 9 is a diagram for illustrating a correction number table 34 schematically illustrating a data configuration of correction number table data. FIG. 9 is a diagram schematically illustrating data set for each grid point as a data point 32 at a grid point in the processing surface 19. As described above, each data point 32 in FIG. 9 includes the position on the processing surface (processing point position), the scanning angle, and the correction angle. A correction data point 33 is a point corresponding to the processing original point 26 on the processing surface 19.

In the following description, the position of each data point in the correction number table 34 is indicated by a scanning angle ($\varphi x$, $\varphi y$) for convenience. A data number in a direction corresponding to the scanning angle $\varphi x$ is i, and the data number in a direction corresponding to the scanning angle $\varphi y$ is j. Using the data numbers i and j, the data point 32 holds ($\Phi x_i$, $\Phi y_j$, $\Psi x_{ij}$, $\Psi y_{ij}$) which is a set of a correction number table scanning angle ($\Phi x_i$, $\Phi y_j$) and a correction number table correction angle ($\Psi x_{ij}$, $\Psi y_{ij}$).

Figure 10:
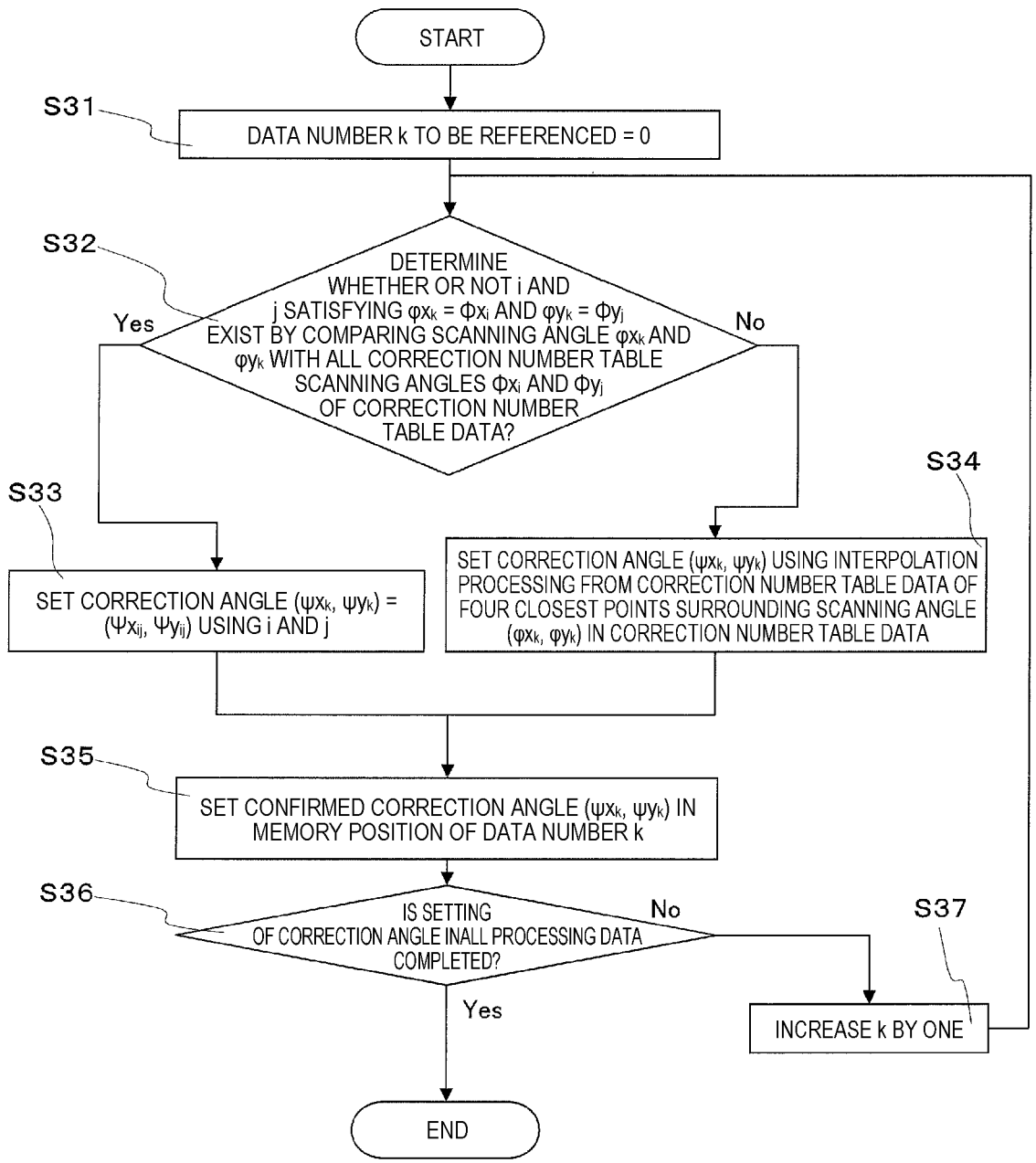
FIG. 10 is a flowchart illustrating a correction angle setting process.

FIG. 10 is a flowchart illustrating a correction angle setting process.

In step S31, the data number k is set to "0".

In step S32, it is determined whether the data numbers i and j satisfying $\varphi x_k = \Phi x_i$ and $\varphi y_k = \Phi y_j$ exist by comparing the scanning angle $\varphi x_k$ and $\varphi y_k$ stored in the area of the data number k in the memory 31 with all the correction number table scanning angles $\Phi x_i$ and $\Phi y_j$ in the correction number table 34. When the data numbers i and j satisfying $\varphi x_k = \Phi x_i$ and $\varphi y_k = \Phi y_j$ exist (step S32: Yes), the process proceeds to step S33; otherwise (step S33: No), the process proceeds to step S34. In the present step S32, it is determined whether or not a data item including the same scanning angle as the correction angle set by the user exists in the correction number table 34.

In step S33, the correction angle is set such that ($\psi x_k$, $\psi y_k$) = ($\Psi x_{ij}$, $\Psi y_{ij}$) using the data numbers i and j that satisfy $\varphi x_k = \Phi x_i$ and $\varphi y_k = \Phi y_j$.

That is, in step S33, since a data item including the scanning angle which is exactly the same as the correction angle set by the user exists, the corresponding correction number table correction angle is set as the correction angle as it is.

In step S34, the correction angle ($\psi x_k$, $\psi y_k$) is set by performing interpolation processing using data of four closest points in the correction number table data with respect to the scanning angle ($\varphi x_k$, $\varphi y_k$) set by the user. Details of step S34 will be described below.

In step S35, the correction angle ($\psi x_k$, $\psi y_k$) set in step S33 or step S34 is stored in the area of the data number k of the processing data in the memory 31.

In step S36, it is determined whether or not the correction angles are set for all of the processing data stored in the memory 31. When the settings are completed for all of the processing data (Step S36: Yes), the process is terminated, otherwise (Step S36: No), the process proceeds to step S37.

In step S37, the data number k to be referenced is increased by one, and the process returns to step S32. Accordingly, the corrected processing data is set for all the data numbers k.

Details of Interpolation Processing

Step S34 (interpolation processing) in FIG. 10 will be described in detail. In step S34, the scanning angle ($\varphi x_k$, $\varphi y_k$) set by the user does not coincide with any of the correction number table scanning angle ($\Phi x_i$, $\Phi y_j$) in the data point 32.

Figure 11:
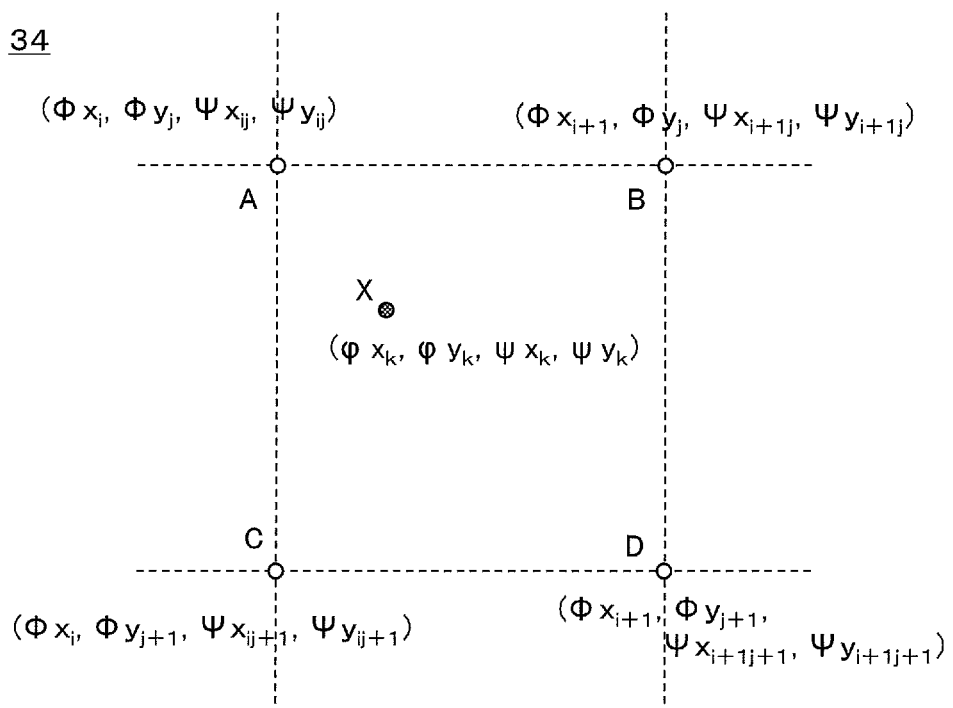
FIG. 11 is a diagram illustrating a relationship between a scanning angle X ($\varphi x_k$, $\varphi y_k$) and a surrounding correction data point when the scanning angle X ($\varphi x_k$, $\varphi y_k$) set as processing data by a user does not coincide with a correction number table scanning angle at any data point on the correction number table.

FIG. 11 is a diagram illustrating a relationship between a scanning angle X ($\varphi x_k$, $\varphi y_k$) and a surrounding correction data point when the scanning angle X ($\varphi x_k$, $\varphi y_k$) set as processing data by the user does not coincide with the correction number table scanning angle at any data point 32 on the correction number table 34. The point corresponding to the scanning angle X ($\varphi x_k$, $\varphi y_k$) is located in a grid formed by four points including the correction data point A (($\varphi x_i$, $\varphi y_j$, $\psi x_{ij}$, $\psi y_{ij}$), the correction data point B ($\Phi x_{i+1}$, $\Phi y_j$, $\Psi x_{i+1j}$, $\Psi y_{i+1j}$), the correction data point C ($\Phi x_i$, $\Phi y_{j+1}$, $\Psi x_{ij+1}$, $\Psi y_{ij+1}$), and the correction data point D ($\Phi x_{i+1}$, $\Phi y_{j+1}$, $\Psi x_{i+1j+1}$, $\Psi y_{i+1j+1}$). A relationship $\Phi x_i \leq \varphi x_k \leq \Phi x_{i+1}$ (equal signs are not simultaneously established) and a relationship $\Phi y_j \leq \varphi y_k \leq \Phi y_{j+1}$ (equal signs are not simultaneously established) are established. At this time, the correction angle ($\psi x_k$, $\psi y_k$) is obtained from Equations (1) and (2) by using the value of the scanning angle X ($\varphi x_k$, $\varphi y$) and the values of the correction data points A, B, C, and D.

$$\Psi x_k=(E\Psi x_{ij}+F\Psi x_{i+1j}+G\Psi x_{ij+1}+H\Psi x_{i+1j+1})/J \quad (1)$$

$$\psi y_k=(E\Psi y_{ij}+F\Psi y_{i+1j}+G\Psi y_{ij+1}+H\Psi y_{i+1j+1})/J \quad (2)$$

E, F, G, H, and J in Equations (1) and (2) are obtained by Equations (3) to (7).

$$E=(\varphi x_k-\varphi x_i)(\varphi y_k-\varphi y_j) \quad (3)$$

$$F=(\Phi x_{i+1}-\varphi x_k)((\varphi y_k-\Phi y_j) \quad (4)$$

$$G=(\varphi x_k-\varphi x_i)(\varphi y_{j+1}-\varphi y_k) \quad (5)$$

$$H=(\Phi x_{i+1}-\varphi x_k)(\Phi y_{j+1}-\Phi y_k) \quad (6)$$

$$J=(\Phi x_{i+1}-\Phi x_i)(\Phi y_{j+1}-\Phi y_j) \quad (7)$$

According to such a method, the correction angle can be derived by the interpolation processing based on the scanning angle set by the user. The correction angle after the interpolation processing is an example of a third operation amount according to the present disclosure.

In the above-described interpolation processing, a linear interpolation method is used as an interpolation method. However, other known two-dimensional interpolation methods (spline interpolation, quadratic surface approximation, and the like) may be used. Further, a high-order approximate continuous curved surface for the correction angle with respect to the scanning angle may be calculated in advance from the correction number table correction angle ($\Psi x_{ij}$, $\Psi y_{ij}$) on the correction number table 34, and the correction angle corresponding to the scanning angle may be derived.

Laser Processing Method

Figure 12:
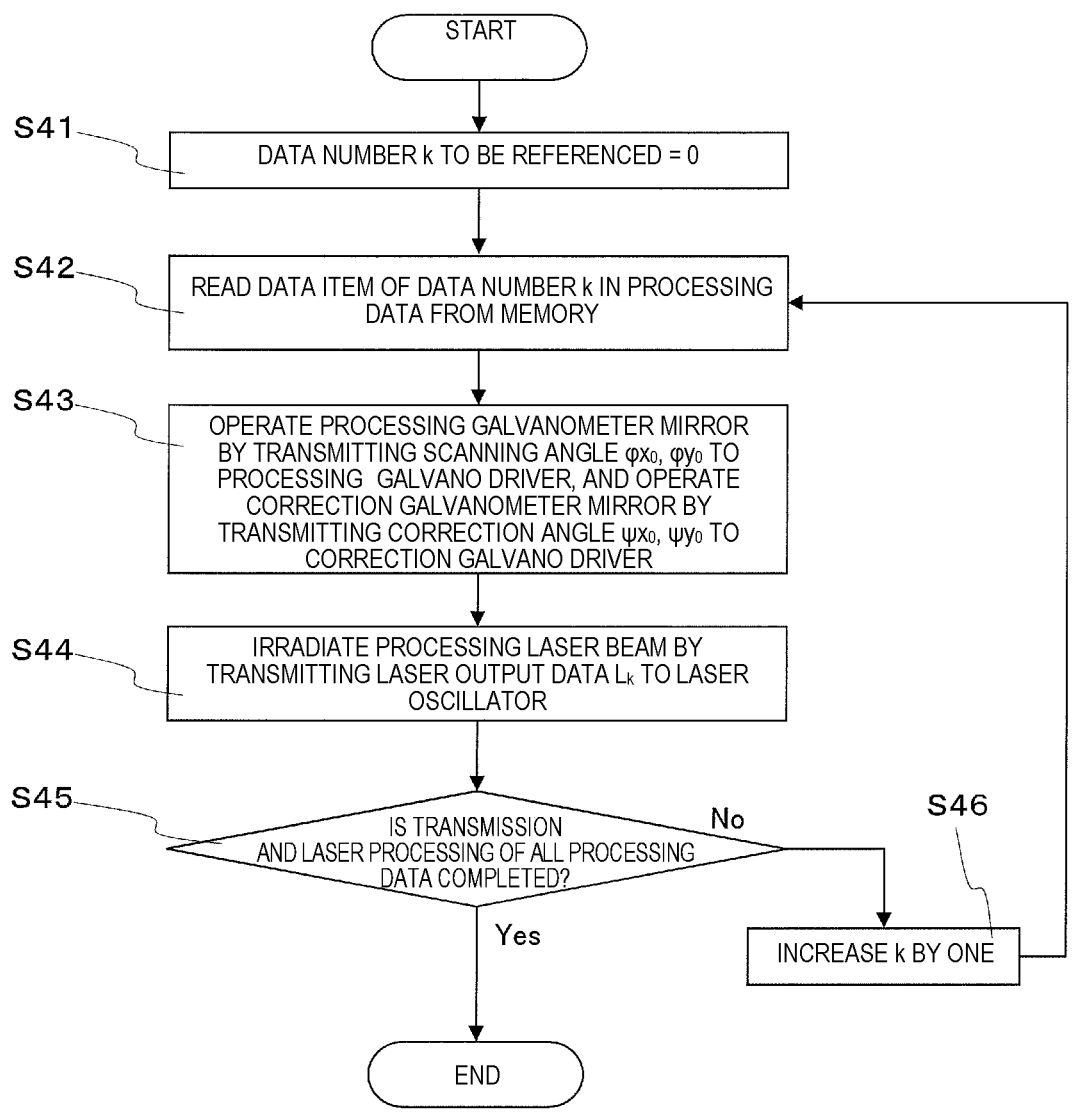
FIG. 12 is a flowchart illustrating a laser processing process.

Next, a laser processing method by the laser processing apparatus 1 will be described. FIG. 12 is a flowchart illustrating the laser processing process.

In step S41, the data number k is set to 0.

In step S42, the laser output data $L_k$, the scanning angle $\varphi x_k$, $\varphi y_k$, and the correction angles $\psi x_k$, $\psi y_k$ corresponding to the data number k are read.

In step S43, the control unit 6 operates the first mirror 13 via the first driver 7 using the scanning angle $\varphi x_k$ and $\varphi y_k$ as an operation amount, and operates the second mirror 17 via the second driver 8 using the correction angle $\psi x_k$ and $\psi y_k$ as an operation amount.

In step S44, the control unit 6 transmits the laser output data $L_k$ as a laser output value to the laser oscillator 5 and causes the processing laser beam 11 to oscillate.

In step S45, it is determined whether or not the laser processing corresponding to all the data numbers k stored in the memory 31 is completed. When laser processing corresponding to all the data numbers k is completed (step S45: Yes), the process is terminated, otherwise (step S45: No), the process proceeds to step S46.

In step S46, the data number k to be referenced is increased by one, and the process returns to step S42. Accordingly, the processing is performed for all the data numbers k.

Keyhole Depth Measurement Method

Next, a method of measuring the depth of the keyhole 22 during the laser processing will be described.

Figure 13:
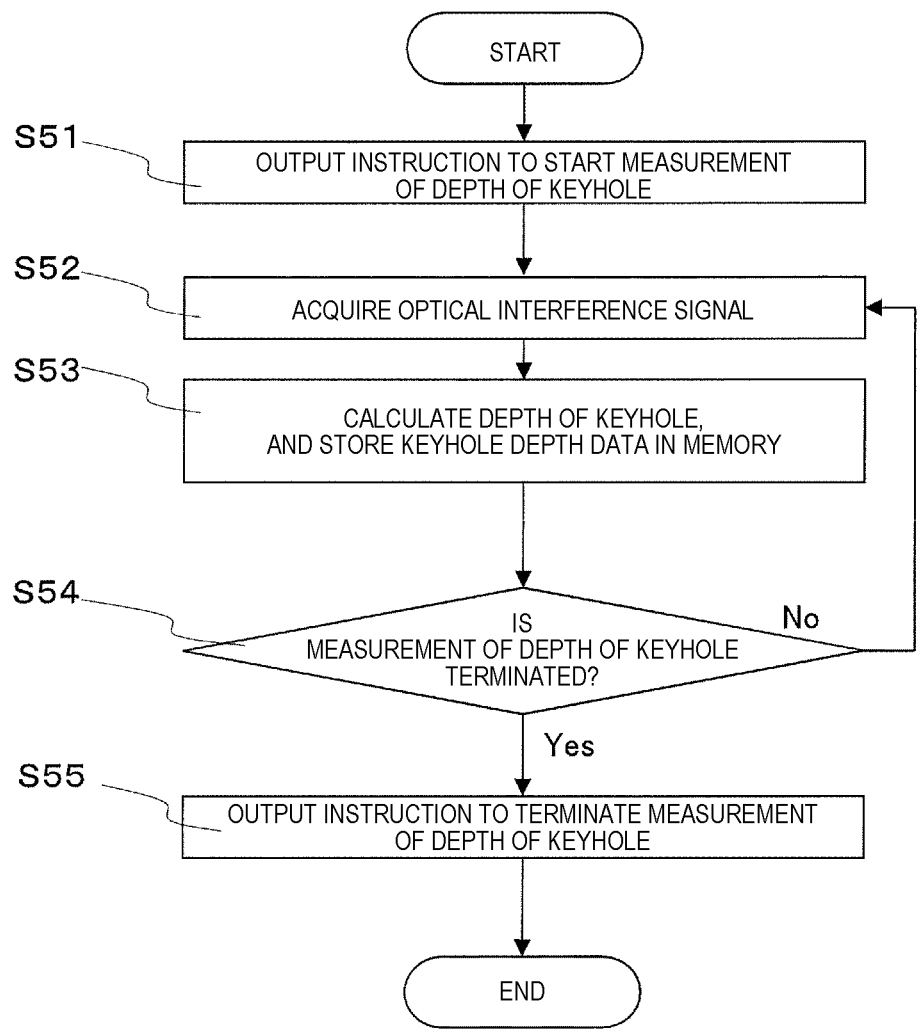
FIG. 13 is a flowchart illustrating a keyhole depth measurement process.

FIG. 13 is a flowchart illustrating a keyhole depth measurement process.

In step S51, before the laser processing process described with reference to FIG. 12 starts, position data of the processing surface 19 of the unprocessed workpiece 18 is obtained.

When the laser processing process starts as described with reference to FIG. 12, in step S52, the measurement processing unit 4 generates an optical interference signal corresponding to an optical path difference between the reference beam and the measurement beam 15 reflected back from the keyhole 22 in the optical interferometer 3.

In step S53, the measurement processing unit 4 derives the depth (penetration depth) of the keyhole 22 using the optical interference signal. The derived depth of the keyhole 22 is stored in the memory 31.

In step S54, it is determined whether or not to terminate the keyhole depth measurement process. When the process is terminated (Step S54: Yes), the process proceeds to step S55; otherwise (Step S54: No), the process returns to step S52.

In step S55, the control unit 6 outputs, to the measurement processing unit 4, an instruction to terminate the keyhole depth measurement process.

Instructions to start the keyhole depth measurement process and terminate the keyhole depth measurement process may not be performed by the control unit 6, but may be performed by using the manipulation unit or the like, which is not illustrated, of the user.

Effect

As described above, the laser processing apparatus 1 according to the embodiment of the present disclosure has: the laser oscillator 5 that oscillates the processing laser beam at the processing point where the workpiece is to be processed; an optical interferometer 3 that emits the measurement beam to the processing point and generates an optical interference intensity signal based on interference caused by an optical path difference between the measurement beam and the reference beam reflected at the processing point; a first mirror 13 that changes the traveling directions of the processing laser beam and the measurement beam; the second mirror 17 that changes an incident angle of the measurement beam to the first mirror 13; a lens 14 that focuses the processing laser beam and the measurement beam on the processing point; a memory 31 that stores the corrected processing data corrected in advance to eliminate a deviation between irradiation positions of the processing laser beam and the measurement beam caused by chromatic aberration of the lens on the surface of the workpiece, the corrected processing data being for processing the workpiece; the control unit that controls the laser oscillator 5, the first mirror 13, and the second mirror 17 based on the corrected processing data; and the measurement processing unit 4 that derives the depth of a keyhole generated at the processing point by the processing laser beam, based on the optical interference intensity signal.

Figure 14:
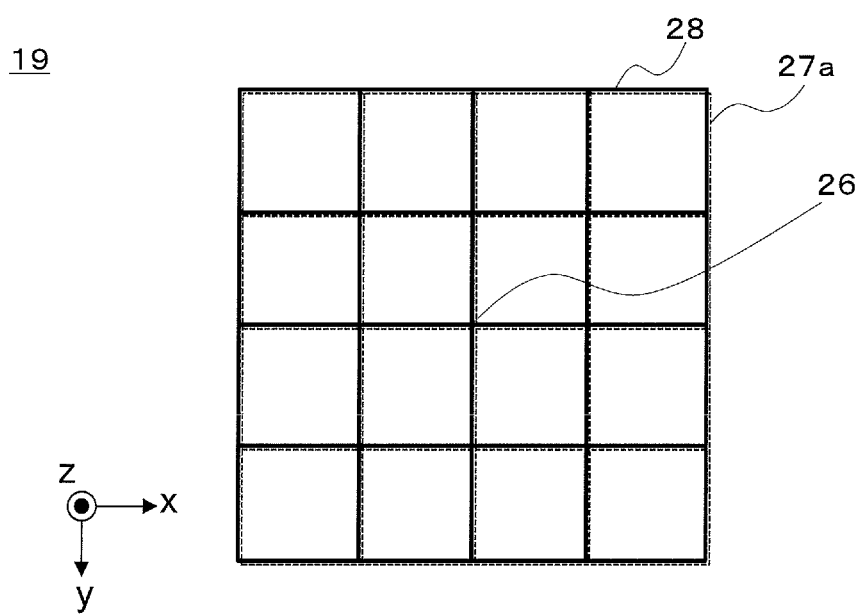
FIG. 14 is a diagram illustrating the trajectories of the processing laser beam and the measurement beam on the processing surface in a state in which influence of the chromatic aberration of magnification is corrected due to operation of the second mirror.

With this configuration, it is possible to correct the deviation between the arrival positions of the processing laser beam 11 and the measurement beam 15 on the processing surface 19 after the processing laser beam 11 and the measurement beam 15 passes through the lens 14, the deviation being caused by the chromatic aberration of magnification of the lens 14. Accordingly, the depth of the keyhole 22 by the OCT can be suitably measured. FIG. 14 is a diagram illustrating the trajectories of the processing laser beam 11 and the measurement beam 15 on the processing surface 19 in a state in which influence of the chromatic aberration of magnification is corrected due to operation of the second mirror 17. According to FIG. 14, unlike FIG. 4, it can be seen that the processing beam trajectory 28, which is a trajectory of the processing laser beam 11, the measurement beam trajectory 27a, which is a trajectory of the measurement beam 15, and the respective grid points coincide with each other.

In the above-described embodiment, the second mirror 17 which is a galvanometer mirror is used to change an optical axis direction of the measurement beam 15, but the present disclosure is not limited thereto. For example, a configuration may be adopted which is installed between the measurement beam inlet 9 and the dichroic mirror 12 and can change an optical axis direction of the measurement beam 15 based on control of the control unit 6.

Figure 15:
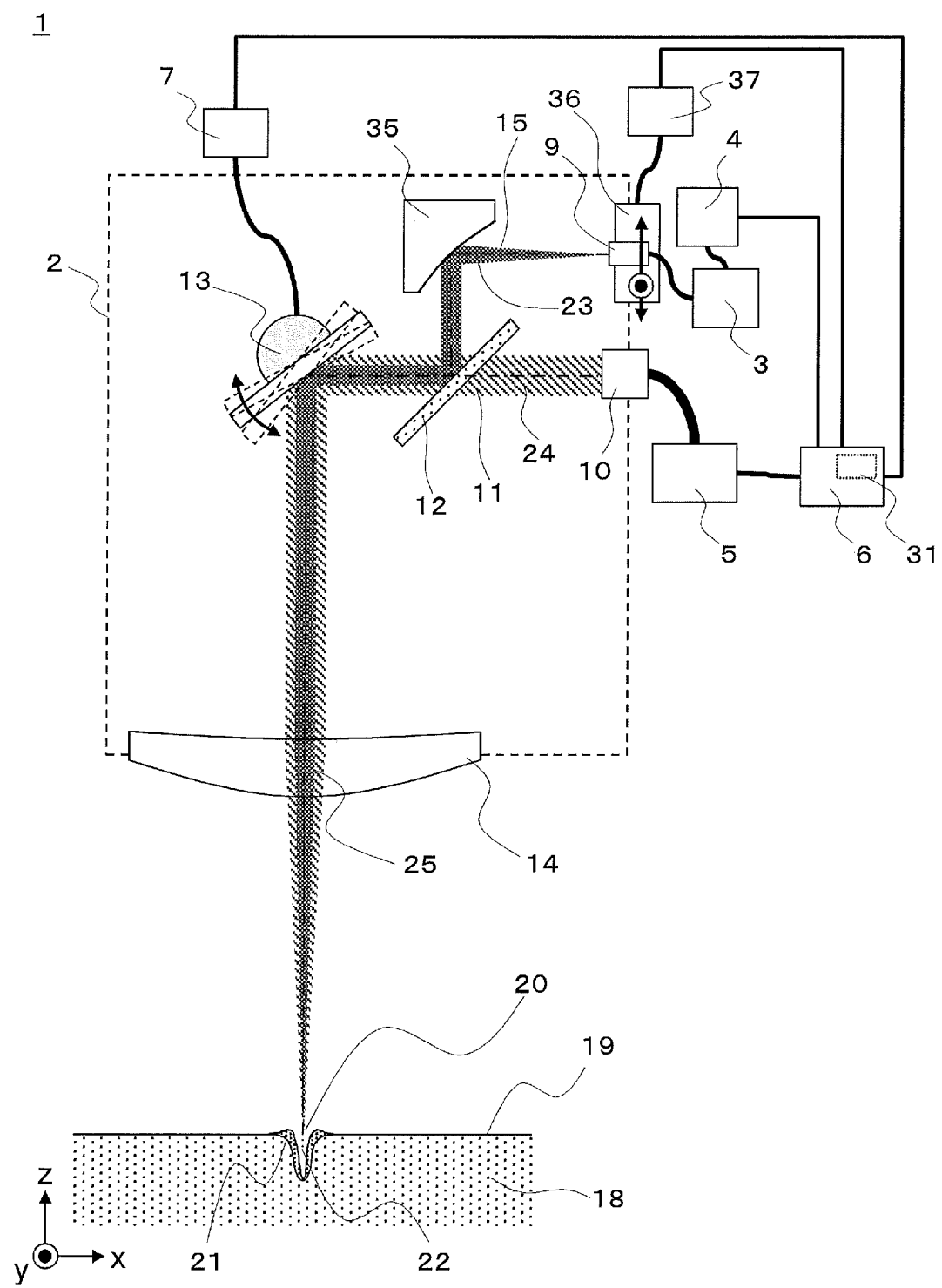
FIG. 15 is a diagram illustrating a modification of the second mirror.

A specific example of such a configuration includes a configuration illustrated in FIG. 15. FIG. 15 is a diagram illustrating a modification of the second mirror 17. In FIG. 15, an example is illustrated in which a second mirror 35 as the second mirror 17 is fixed between the measurement beam inlet 9 and the dichroic mirror 12 and the measurement beam inlet 9 is provided with a movable stage 36 for moving a measurement beam emission end. The measurement beam emission end of the measurement beam inlet 9 is disposed be located at a focal point of the second mirror 35, becomes a parallel beam after being reflected by the second mirror 35, and travels toward the dichroic mirror 12. The movable stage 36 is operated based on control of the control unit 6 via a stage driver 37. An operation direction of the movable stage 36 is a two-axis direction perpendicular to the measurement optical axis 23. As the angle of the measurement optical axis 23 from the second mirror 35 to the dichroic mirror 12 is changed by operating the movable stage 36, in the above-described embodiment, the same effect as the second mirror 17 employing the galvanometer mirror can be obtained. Further, a microelectromechanical systems (MEMS) mirror or the like may be employed as the second mirror 17.

The laser processing apparatus and the laser processing method of the present disclosure can be applied to a laser processing apparatus that performs laser processing on automobiles, electronic components, and the like.

Embodiment 2: Second Case

Hereinafter, embodiments of the present disclosure will be described with reference to the drawings. The same reference numerals are given to the same components in each drawing, and description thereof will be omitted as appropriate. Items not described are the same as that in embodiment 1.

Configuration of Laser Processing Apparatus

A configuration of the laser processing apparatus 1 according to the embodiment of the present disclosure will be described with reference to FIG. 16.

Figure 16:
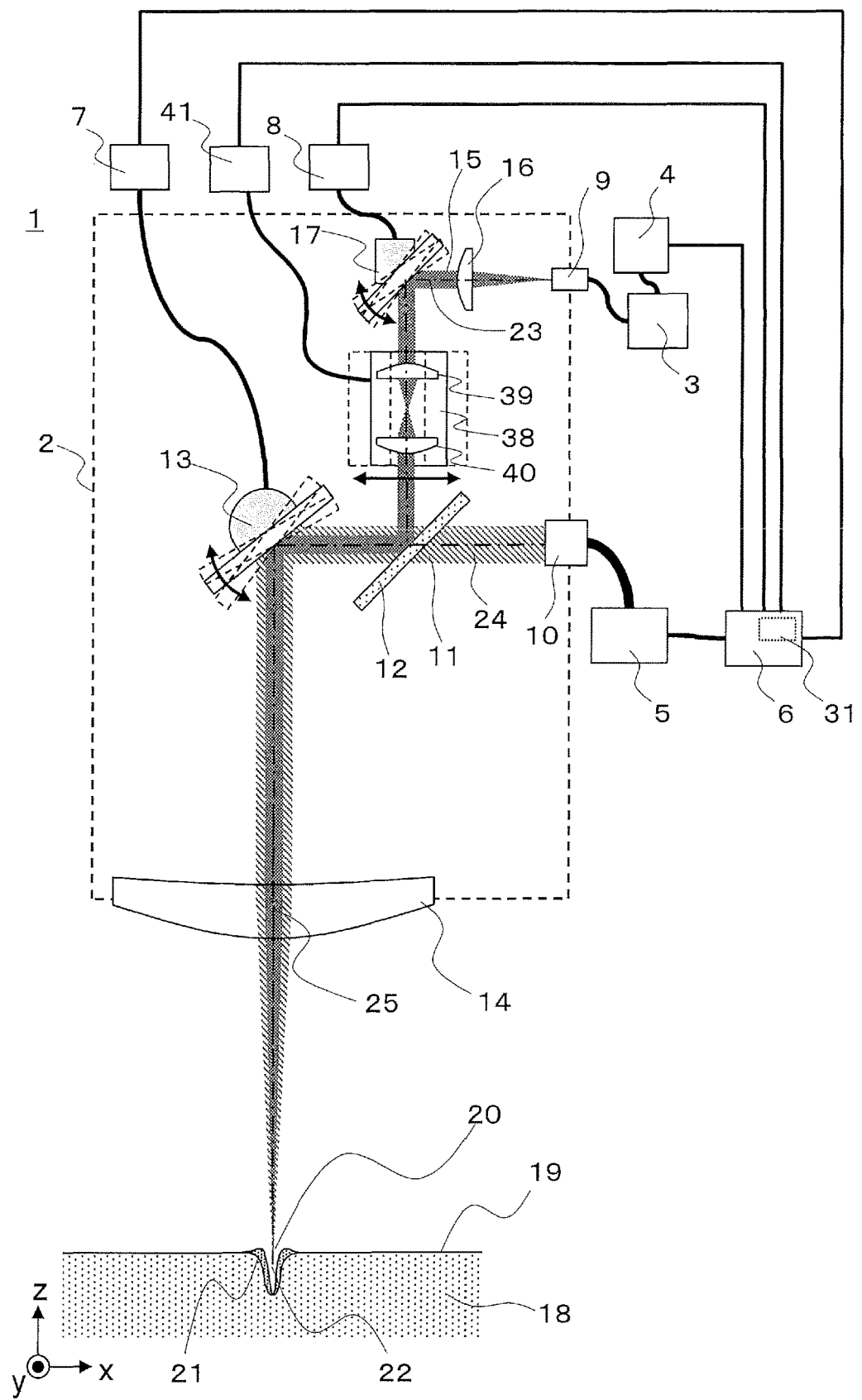
FIG. 16 is a diagram schematically illustrating a configuration of the laser processing apparatus according to an embodiment of the present disclosure.

FIG. 16 is a diagram schematically illustrating a configuration of the laser processing apparatus 1 according to the present embodiment.

The laser processing apparatus 1 includes a processing head 2, an optical interferometer 3, a measurement processing unit 4, a laser oscillator 5, a control unit 6, a first driver 7, a second driver 8, and a third driver 41.

The optical interferometer 3 emits the measurement beam 15 for OCT measurement. The emitted measurement beam 15 is input to the processing head 2 from the measurement beam inlet 9. The measurement beam inlet 9 is installed on the second mirror 17.

The laser oscillator 5 oscillates the processing laser beam 11 for laser processing. The oscillated processing laser beam 11 is input to the processing head 2 from the processing beam inlet 10.

The processing laser beam 11 input to the processing head 2 passes through the dichroic mirror 12, is reflected by the first mirror 13, passes through the lens 14, and is focused on the processing surface 19 on the surface of the workpiece 18. Accordingly, a processing point 20 of the workpiece 18 is laser-processed. At this time, the processing point 20 irradiated with the processing laser beam 11 is melted, and a molten pool 21 is formed. Further, the molten metal is evaporated from the molten pool 21, and a keyhole 22 is formed by the pressure of steam generated during the evaporation.

The measurement beam 15 input to the processing head 2 is converted into a parallel beam by the collimating lens 16, is reflected by the second mirror 17, and then passes through a beam shift mechanism 38. Thereafter, the measurement beam 15 is reflected by the dichroic mirror 12, is reflected by the first mirror 13, passes through the lens 14, and is then focused on the processing point 20 on the surface of the workpiece 18. Then, the measurement beam 15 is reflected by the bottom surface of the keyhole 22, reaches the optical interferometer 3 along a propagation path, and generates an interference signal in the optical interferometer 3 due to optical interference with a reference beam that is not illustrated.

The measurement processing unit 4 measures the depth of the keyhole 22, that is, the penetration depth of the processing point 20, from the interference signal. The penetration depth means a distance between the processing surface 19 and the highest point of the melted portion of the workpiece 18.

The wavelength of the processing laser beam 11 and the wavelength of the measurement beam 15 are different from each other. The dichroic mirror 12 has a property of transmitting a beam having the wavelength of the processing laser beam 11 and reflecting a beam having the wavelength of the measurement beam 15.

For example, when a YAG laser or a fiber laser is used as the processing laser beam 11, the wavelength of the processing laser beam 11 is 1064 nm. For example, when an OCT light source is used as the measurement beam 15, the wavelength of the measurement beam 15 is 1300 nm.

The first mirror 13 and the second mirror 17 are movable mirrors that can rotate about two or more axes. The first mirror 13 and the second mirror 17 are, for example, galvanometer mirrors.

The first mirror 13 and the second mirror 17 are connected to the control unit 6 via the first driver 7 and the second driver 8, respectively, and are operated under the control of the control unit 6. The first driver 7 operates the first mirror 13 based on an instruction from the control unit 6. The second driver 8 operates the second mirror 17 based on the instruction from the control unit 6.

The control unit 6 has a memory 31. The memory 31 stores processing data for performing desired processing on the workpiece 18 and correction data for performing correction which will be described below.

FIG. 16 illustrates, as an example, only rotation of each of the first mirror 13 and the second mirror 17 about a rotation axis in the y direction (see a dotted line and a two-way arrow in the drawing).

However, actually, each of the first mirror 13 and the second mirror 17 is configured to be rotatable about two or more axes as described above. Therefore, each of the first mirror 13 and the second mirror 17 can also perform a rotation operation about, for example, a rotation axis in the x direction.

Hereinafter, for simplicity, only a case will be described in which each of the first mirror 13 and the second mirror 17 performs a rotation operation about the rotation axis in the y direction.

When the second mirror 17 is located at the original position, the measurement optical axis 23 of the measurement beam 15 coincides with the processing optical axis 24 of the processing laser beam 11 after the measurement beam 15 is reflected by the dichroic mirror 12.

Further, when the first mirror 13 is located at the original position, the processing optical axis 24 of the processing laser beam 11 coincides with the lens optical axis 25 that is the center of the lens 14 when the processing laser beam 11 passes through the lens 14 after being reflected by the first mirror 13.

In the following description, the positions (referred to as an irradiation position) at which the processing laser beam 11 and the measurement beam 15 having passed through the center of the lens 14 reach the processing surface 19 of the workpiece 18 are referred to as a "processing original point 26 (see FIG. 17)." That is, the original positions of the first mirror 13 and the second mirror 17 are positions at which the processing laser beam 11 and the measurement beam 15 pass through the center of the lens 14.

The lens 14 is a lens for focusing the processing laser beam 11 and the measurement beam 15 on the processing point 20. The lens 14 is, for example, an fθ lens.

The first mirror 13 and the lens 14 constitute a general optical scanning system including a galvanometer mirror and an fθ lens. Therefore, as the first mirror 13 is rotated by a predetermined angle from the original position, the position where the processing laser beam 11 reaches the processing surface 19 can be controlled. Hereinafter, an angle by which the first mirror 13 is rotated from the original position thereof is referred to as an "operation amount of the first mirror 13". The operation amount of the first mirror 13 for irradiating a desired processing point 20 with the processing laser beam 11 can be uniquely set when a positional relationship between optical members constituting the processing head 2 and a distance from the lens 14 to the processing surface 19 are determined.

It is preferable that the distance from the lens 14 to the processing surface 19 is a distance in which the focal position where the processing laser beam 11 is most focused coincides with the processing surface 19 such that the processing with the processing laser beam 11 is performed most efficiently. However, the present disclosure is not limited thereto, and the distance from the lens 14 to the processing surface 19 may be determined as a predetermined distance according to a processing application.

As the operation amount of the first mirror 13 is changed according to a predetermined operation schedule, the position of the processing point 20 can be scanned on the processing surface 19. Further, as the laser oscillator 5 is turned on and off under the control of the control unit 6, a predetermined position on the processing surface 19 can be laser-processed in a predetermined pattern within a scannable range of the processing laser beam 11.

The beam shift mechanism 38 is a mechanism for parallel translation of the measurement optical axis 23 of the measurement beam 15 in two or more axes. For example, the beam shift mechanism 38 is a parallel translation stage. The beam shift mechanism 38 is configured to perform the parallel translation in two or more axes in a direction (see the xy axis and a linear two-way arrow in the drawing) perpendicular to the measurement optical axis 23 of the measurement beam 15 when the second mirror 17 is located at the original position.

The beam shift mechanism 38 is connected to the control unit 6 via the third driver 41, and is operated based on the control of the control unit 6. The third driver 41 operates the beam shift mechanism 38 based on an instruction from the control unit 6.

Further, the beam shift mechanism 38 is provided with a first lens 39 and a second lens 40. A distance between a principal point of the first lens 39 and a principal point of the second lens 40 is set to a distance obtained by adding the focal lengths of the two lenses.

Further, in the present embodiment, it is assumed that the focal length of the first lens 39 and the focal length of the second lens 40 are the same.

Further, when the beam shift mechanism 38 is located at an original position and the second mirror 17 is located at the original position, the measurement optical axis 23 of the measurement beam 15 coincides with the processing optical axis 24 of the processing laser beam 11 after the measurement beam 15 reflected by the dichroic mirror 12.

Effect of Chromatic Aberration

Figure 17:
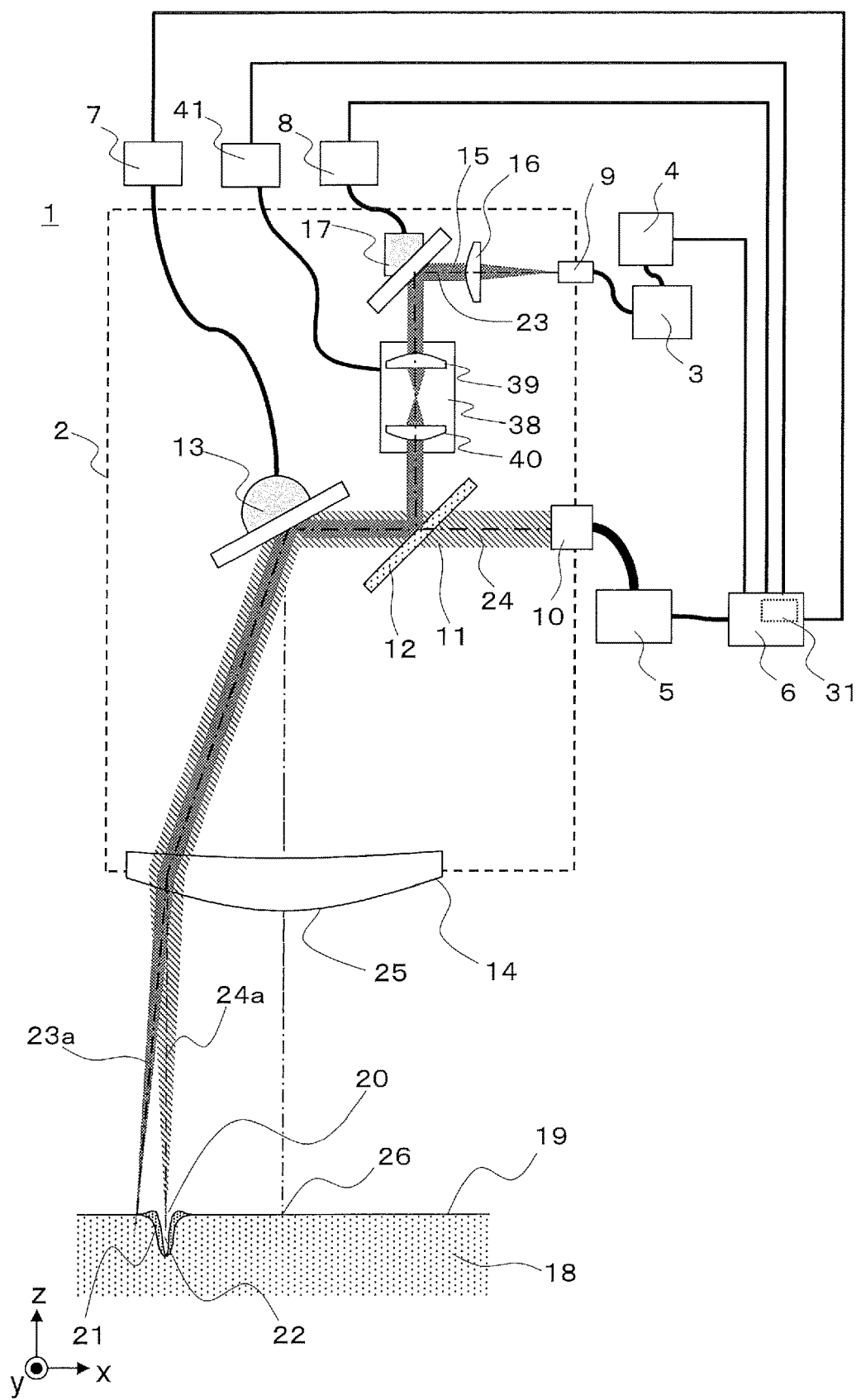
FIG. 17 is a diagram schematically illustrating the laser processing apparatus in a state in which the first mirror is operated from an original position.

Next, the effect of chromatic aberration will be described with reference to FIG. 17. FIG. 17 is a diagram schematically illustrating the laser processing apparatus 1 in a state in which the first mirror 13 is operated from the original position. In FIG. 17, it is assumed that the second mirror 17 is located at the original position.

As illustrated in FIG. 17, the processing laser beam 11 and the measurement beam 15 reflected by the first mirror 13 travel on the same optical axis until the processing laser beam 11 and the measurement beam 15 reach the lens 14. However, after the processing laser beam 11 and the measurement beam 15 passes through the lens 14, a deviation occurs in the traveling direction of the processing laser beam 11 and the measurement beam 15. That is, as illustrated in FIG. 17, the processing optical axis 24a, which is an optical axis of the processing laser beam 11, and the measurement optical axis 23a, which is an optical axis of the measurement beam 15, are shifted. Therefore, the measurement beam 15 reaches a position different from the processing point 20.

This is due to the chromatic aberration of the lens 14. The chromatic aberration is an aberration generated since a general optical material including the lens 14 has a property that the refractive index varies depending on the wavelength of light.

There are two kinds of the chromatic aberration, including an axial chromatic aberration and a chromatic aberration of magnification. The axial chromatic aberration refers to a property that the focal position of a lens differs depending on the wavelength of light. On the other hand, the chromatic aberration of magnification refers to a property that the image height on the focal plane varies depending on the wavelength of light. As illustrated in FIG. 17, the deviation the processing laser beam 11 (the processing optical axis 24a) and the measurement beam 15 (the measurement optical axis 23a) in the traveling direction after the processing laser beam 11 and the measurement beam 15 pass through the lens 14 is caused by the chromatic aberration of magnification.

In the laser processing apparatus 1 according to the present embodiment, the axial chromatic aberration also occurs at the same time. However, in the deviation between the processing laser beam 11 and the measurement beam 15 due to the axial chromatic aberration, a distance between the collimating lens 16 and the measurement beam inlet 9 is adjusted, and the measurement beam 15 immediately after passing through the collimating lens 16 slightly diverges or converges from a parallel light state, so that it is possible to cope with the deviation.

In FIG. 17, when viewed from the processing original point 26, a position where the measurement beam 15 reaches the processing surface 19 is farther than a position where the processing laser beam 11 reaches the processing surface 19. However, this is only an example. The measurement beam 15 may reach a position that is closer to the processing original point 26 than the processing laser beam 11 due to a lens configuration of the lens 14 and a magnitude relationship between the wavelengths of the processing laser beam 11 and the measurement beam 15. In general, a beam having a longer wavelength reaches a position farther from the processing original point 26.

For example, a method of making the lens 14 have a property of an achromatic lens exists as a method of correcting the chromatic aberration of magnification. However, when the lens 14 is to have both the properties of an fθ lens and the properties of an achromatic lens, a very advanced optical design technique is required, and large amounts of time and costs are required for designing the lens 14. Therefore, in the present embodiment, as described below, the chromatic aberration of magnification is corrected at a low cost by operating the second mirror 17.

Method of Correcting Chromatic Aberration of Magnification

Figure 18:
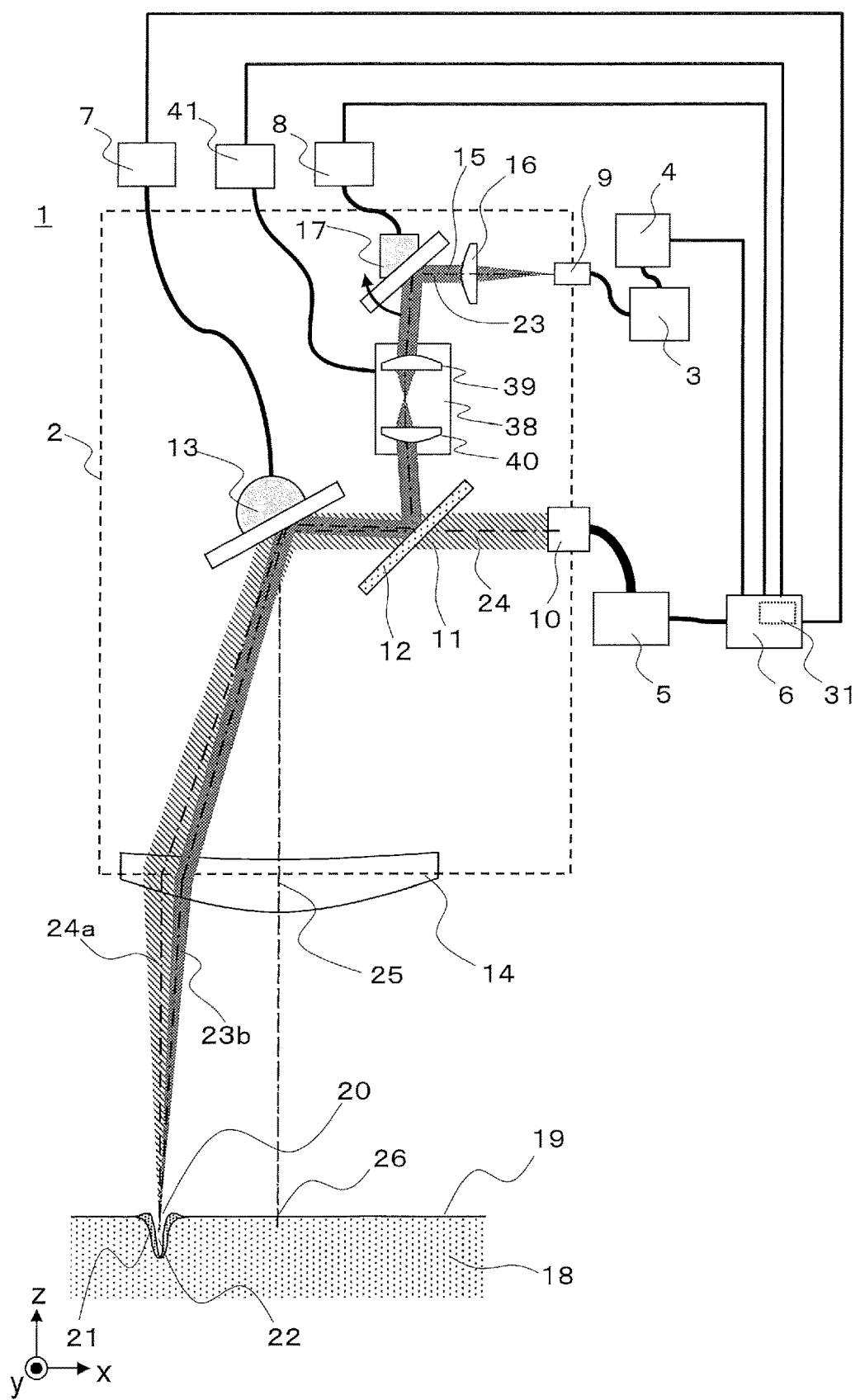
FIG. 18 is a diagram schematically illustrating the laser processing apparatus in a state in which the difference between the arrival positions of the processing laser beam and the measurement beam due to the chromatic aberration of magnification is corrected.

Next, a method of correcting a chromatic aberration of magnification will be described with reference to FIG. 18. FIG. 18 is a diagram schematically illustrating the laser processing apparatus 1 in a state in which the deviation between the arrival positions of the processing laser beam 11 and the measurement beam 15 due to the chromatic aberration of magnification is corrected.

In FIG. 18, the second mirror 17 is operated from the original position by a predetermined operation amount (referred to as an operation angle). Accordingly, as illustrated in FIG. 18, while the processing laser beam 11 and the measurement beam 15 move from the dichroic mirror 12 to the lens 14, the processing optical axis 24 of the processing laser beam 11 and the measurement optical axis 23 of the measurement beam 15 are not coaxial. However, after passing through the lens 14, the processing laser beam 11 and the measurement beam 15 reach the same position on the processing surface 19, that is, the processing point 20.

In FIG. 18, the processing optical axis 24a of the processing laser beam 11 passes through the same position as the processing optical axis 24a illustrated in FIG. 17. On the other hand, in FIG. 18, the measurement optical axis 23b of the measurement beam 15 corrected by operating the second mirror 17 passes through a position different from the measurement optical axis 23a illustrated in FIG. 17.

The operation amount (that is, an angle by which the second mirror 17 is rotated from the original position thereof) of the second mirror 17 is associated with the operation amount of the first mirror 13 on a one-to-one basis. Since the operation amount of the first mirror 13 is uniquely determined by the position of the processing point 20 at which the processing laser beam 11 (and the measurement beam 15) is irradiated, the operation amount of the second mirror 17 is also uniquely determined by the position of the processing point 20 at which the measurement beam 15 is irradiated. Hereinafter, the operation amount of the second mirror 17 is also described as a "correction angle", and a method of obtaining the correction angle will be described.

Relationship Between Correction Angle and Scanning Angle

Next, a relationship between the correction angle and the scanning angle will be described. In the lens 14 which is an fθ lens, when the focal length of the lens 14 is f, an angle of light incident on the lens 14 from the lens optical axis 25 is θ, and a distance of a light beam passing through the lens 14 from the optical axis on the image plane is h, a relationship of $h=f\theta$ is established.

As described above, the first mirror 13 has two rotating axes. These two axes are set to an x axis and a y axis, an angle of the light beam reflected by the first mirror 13 in an x axis component from the lens optical axis 25 is set to $\theta x$, and an angle of the light beam in a y axis component from the same lens optical axis 25 is set to $\theta y$. Then, when the image heights in the x direction and the y direction on the image plane are set to x and y, respectively, a relationship of $x=f\theta x$ and $y=f\theta y$ is established.

Therefore, when the position of the processing point where the processing laser beam 11 reaches the processing surface 19 is (x, y), $(x, y)=(f\theta x, f\theta y)$. Further, when a light beam is incident on the mirror, an emission angle of the reflected light from the mirror changes by twice an angle amount. Therefore, when the operation amount of the first mirror 13 is set to $(\varphi x, \varphi y)$, the relationship of $(2\varphi x, 2\varphi y)=(\theta x, \theta y)$ is established. In the following description, the operation amount $(\varphi x, \varphi y)$ of the first mirror 13 is described as a "scanning angle."

As described above, in the laser processing apparatus 1 of the present embodiment, when the scanning angle $(\varphi x, \varphi y)$ of the first mirror 13 is determined, the arrival position of the processing laser beam 11 on the processing surface 19, that is, the position (x, y) of the processing point 20, is also determined.

As described above, the scanning angle is uniquely determined by the position of the processing point 20, and similarly, the correction amount is also uniquely determined by the position of the processing point 20. That is, a relationship between the scanning angle and the correction amount is calculated in advance for each position of a certain processing point 20, and the second mirror 17 is operated by the correction amount corresponding to the position of the processing point 20 during processing, so that the deviation of the measurement beam 15 due to the chromatic aberration of magnification can be corrected.

Effect of Keyhole Angle

On the other hand, as illustrated in FIG. 18, even in a state in which the deviation between the arrival positions of the processing laser beam 11 and the measurement beam 15 due to the chromatic aberration of magnification is corrected, the processing optical axis 24a of the processing laser beam 11 and the measurement optical axis 23b of the measurement beam 15 do not coincide with each other.

When the scanning speed (hereinafter, referred to as a processing speed) of the processing laser beam 11 is low, a direction in which the keyhole 22 is formed coincides with the processing optical axis 24a of the processing laser beam 11, and thus the measurement beam 15 is incident obliquely to the direction in which the keyhole 22 is formed. Accordingly, a case occurs in which the measurement beam 15 cannot reach the bottom of the keyhole 22. As a result, measurement accuracy of the depth of the keyhole 22 deteriorates.

Figure 19:
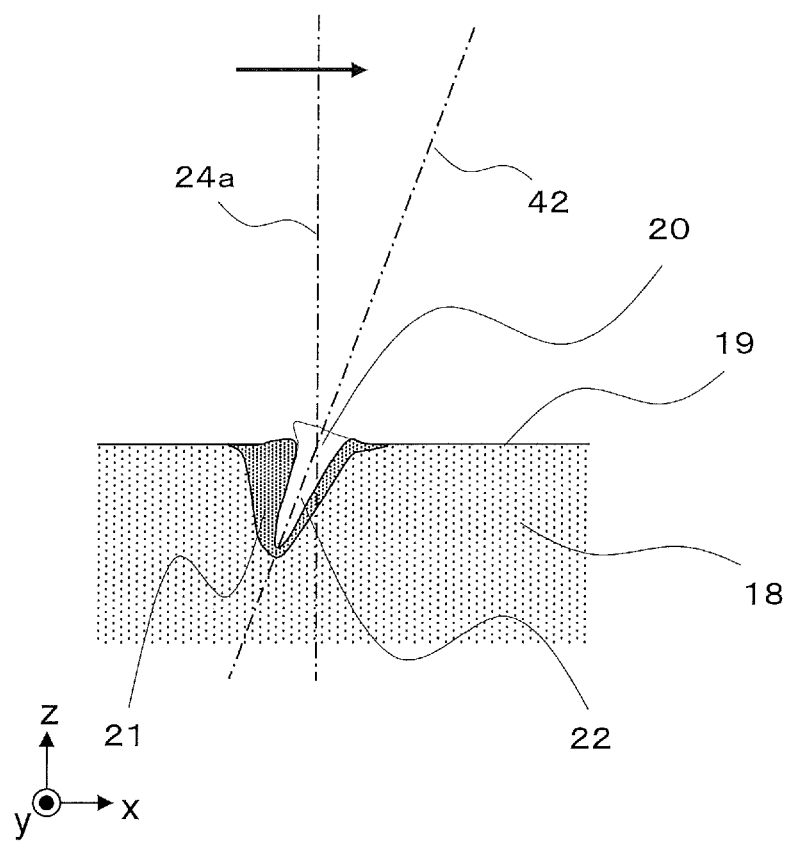
FIG. 19 is a diagram schematically illustrating an example of a state in which a keyhole is formed when a processing speed is high.

FIG. 19 schematically illustrates an example of a state in which the keyhole 22 is formed when the processing speed is high. When the processing optical axis 24a of the processing laser beam 11 moves in a positive direction of the x axis, the keyhole 22 is formed in a state in which a keyhole forming axis 42 is inclined in a processing direction (the positive direction of the x axis) with the processing point 20 as a starting point. Therefore, even in a state in which the deviation between the arrival positions of the processing laser beam 11 and the measurement beam 15 due to the chromatic aberration of magnification is corrected, a case may occur in which the measurement beam 15 does not reach the bottom of the keyhole 22. As a result, measurement accuracy of the depth of the keyhole 22 deteriorates.

In particular, when a beam mode of the laser oscillator 5 is a single mode, the spot diameter of the processing laser beam 11 at the processing point 20 is reduced to, for example, 50 μm or less. Therefore, the diameter of the generated keyhole 22 is also reduced, and the deviation between an angle of the keyhole forming axis 42 of the keyhole 22 and an angle of the measurement optical axis 23b of the measurement beam 15 is a factor that causes great deterioration of measurement accuracy of the depth of the keyhole 22.

Therefore, in the present embodiment, as described below, by operating the beam shift mechanism 38, the angle of the measurement optical axis 23b of the measurement beam 15 is corrected, so that the measurement optical axis 23b and the keyhole forming axis 42 coincide with each other.

Method of Correcting Angle of Measurement Optical Axis

Figure 20:
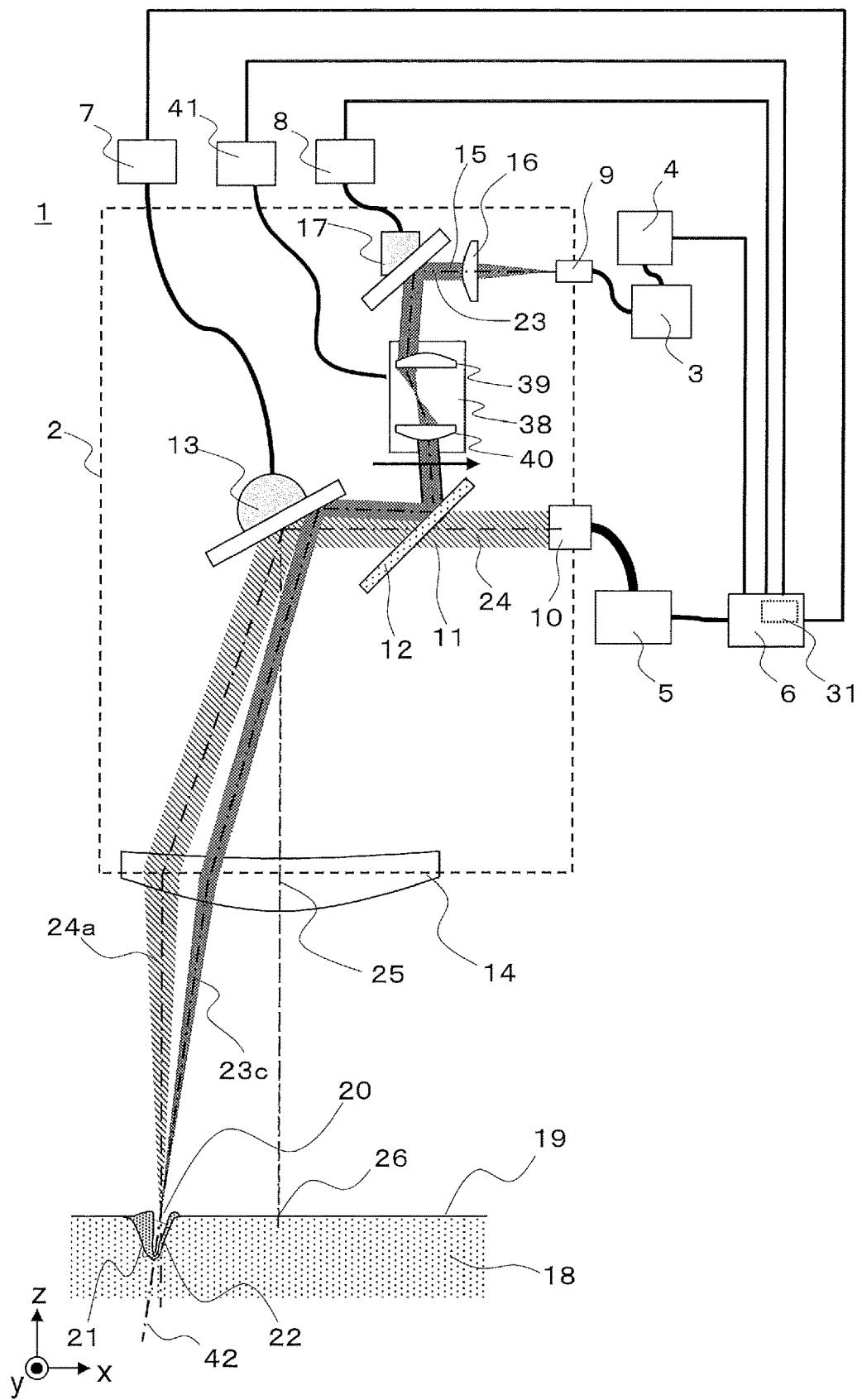
FIG. 20 is a diagram schematically illustrating the laser processing apparatus in a state in which an angle difference between a keyhole forming axis and a measurement optical axis of the measurement beam is corrected.

Next, a method of correcting an angle of a measurement optical axis will be described with reference to FIG. 20. FIG. 20 is a diagram schematically illustrating the laser processing apparatus 1 in a state in which the angle deviation between the keyhole forming axis 42 and the measurement optical axis 23b of the measurement beam 15 illustrated in FIG. 18 is corrected.

In FIG. 20, the beam shift mechanism 38 is operated from an original position by a predetermined operation amount (which may be referred to as an operation distance). Accordingly, while the measurement beam 15 and the processing laser beam 11 move from the dichroic mirror 12 to the lens 14, the measurement optical axis 23 of the measurement beam 15 is shifted in parallel to the processing optical axis 24 of the processing laser beam 11. However, after passing through the lens 14, the processing laser beam 11 and the measurement beam 15 reach the same processing point 20 on the processing surface 19.

In FIG. 20, the processing optical axis 24a of the processing laser beam 11 passes through the same position as the processing optical axis 24a illustrated in FIG. 18. Further, in FIG. 20, a measurement optical axis 23c is obtained by correcting the measurement optical axis 23b illustrated in FIG. 18 by operating the beam shift mechanism 38. An angle of the measurement optical axis 23c illustrated in FIG. 20 is different from the angle of the measurement optical axis 23b illustrated in FIG. 18, and coincides with an angle of the keyhole forming axis 42 of the keyhole 22.

A predetermined operation amount (hereinafter, referred to as a correction movement amount) for operating the beam shift mechanism 38 from the original position is associated with the operation amount and the processing speed of the first mirror 13. Since the operation amount and the processing speed of the first mirror 13 are uniquely determined by the position of the processing point 20 where the processing laser beam 11 (and the measurement beam 15) is irradiated, the correction movement amount is also uniquely determined by the position of the processing point 20 where the measurement beam 15 is irradiated. That is, a relationship between the scanning angle and the correction movement amount is calculated in advance for each position of the processing point 20, and the beam shift mechanism 38 is operated by the correction movement amount corresponding to the position of the processing point 20 during the processing, so that the angle deviation between the keyhole forming axis 42 and the measurement optical axis 23b illustrated in FIG. 18 can be corrected.

Method of Creating First Correction Number Table Data

A method of creating a first correction number table data will be described. The first correction number table data is data indicating a correspondence between the scanning angle and the correction angle for each processing point 20. The first correction number table data may be referred to as correction number table data for a correction angle.

Figure 21:
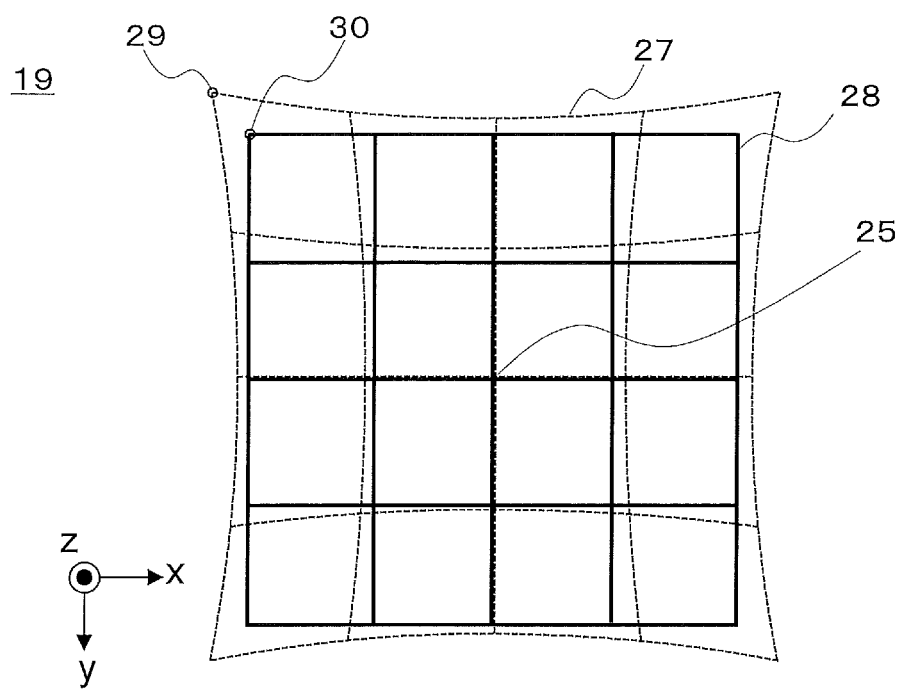
FIG. 21 is a diagram schematically illustrating the trajectories of the processing laser beam and the measurement beam on the processing surface when the surface of the workpiece is scanned in a grid shape by operating only the first mirror.

First, trajectories of the processing laser beam 11 and the measurement beam 15 on the processing surface 19 will be described with reference to FIG. 21. FIG. 21 is a diagram schematically illustrating the trajectories of the processing laser beam 11 and the measurement beam 15 on the processing surface 19 when the surface (that is, the processing surface 19) of the workpiece 18 is scanned in a grid pattern by operating only the first mirror 13 without operating the second mirror 17. FIG. 21 illustrates a state in which the processing surface 19 is viewed from the lens 14 side.

In FIG. 21, the processing beam trajectory 28, which is a trajectory of the processing laser beam 11, is indicated by a solid line, and the measurement beam trajectory 27, which a trajectory of the measurement beam 15, is illustrated by a dotted line. In an example illustrated in FIG. 21, since the second mirror 17 is not operated, the chromatic aberration of magnification is not corrected. Therefore, although the trajectories of the processing laser beam 11 and the measurement beam 15 coincide with each other in the vicinity of the processing original point 26, the deviation therebetween increases as a distance from the processing original point 26 increases. Accordingly, while the processing beam trajectory 28 describes a grid-like pattern without distortion, the measurement beam trajectory 27 describes a distorted pincushion trajectory. The shape of the measurement beam trajectory 27 illustrated in FIG. 21 is an example, and the distortion shape of the measurement beam trajectory 27 can change depending on optical characteristics of the lens 14.

Further, similarly, the amount of deviation between the positions corresponding to the processing beam trajectory 28 and the measurement beam trajectory 27 also depends on optical characteristics and an optical design of the lens 14. As a general example, in a commercially available fθ lens having a focal length of 250 mm and a processing surface area of about 200 mm in diameter, a deviation of 0.2 mm to 0.4 mm occurs near the outermost periphery of the processing surface area.

On the other hand, the diameter of the keyhole 22 (for example, see FIG. 16) generated by irradiating the processing point 20 with the processing laser beam 11 is as small as about 0.03 mm to 0.2 mm depending on power and quality of the processing laser beam. For this reason, the measurement beam 15 does not reach the bottom surface of the keyhole 22 due to a positional deviation between the processing laser beam 11 and the measurement beam 15 caused by the chromatic aberration of the lens 14, and thus a correct penetration depth cannot be measured.

Although FIG. 21 illustrates a grid pattern of 4×4 squares at equal intervals as an example, the present disclosure is not limited thereto. The grid pattern for scanning may be set to a grid having a finer square count or may have a reduced grid interval of a region requiring particularly high accuracy in relation to the chromatic aberration of magnification of the fθ lens. Further, a radial grid pattern may be set. However, in the present embodiment, since the correction angle is set by two axes of the x axis and the y axis, the orthogonal grid pattern illustrated in FIG. 21 is more preferable.

Comparing the processing beam trajectory 28 and the measurement beam trajectory 27 illustrated in FIG. 21, it can be seen that the deviation occurs at each corresponding grid point of the grid pattern.

In order to create the correction number table data, it is required to determine the correction amount such that a processing beam grid point 30 which is one grid point on the processing beam trajectory 28 and a corresponding measurement beam grid point 29 of the measurement beam trajectory 27 coincide with each other.

Next, flow of the method of creating the first correction number table data will be described.

Figure 22:
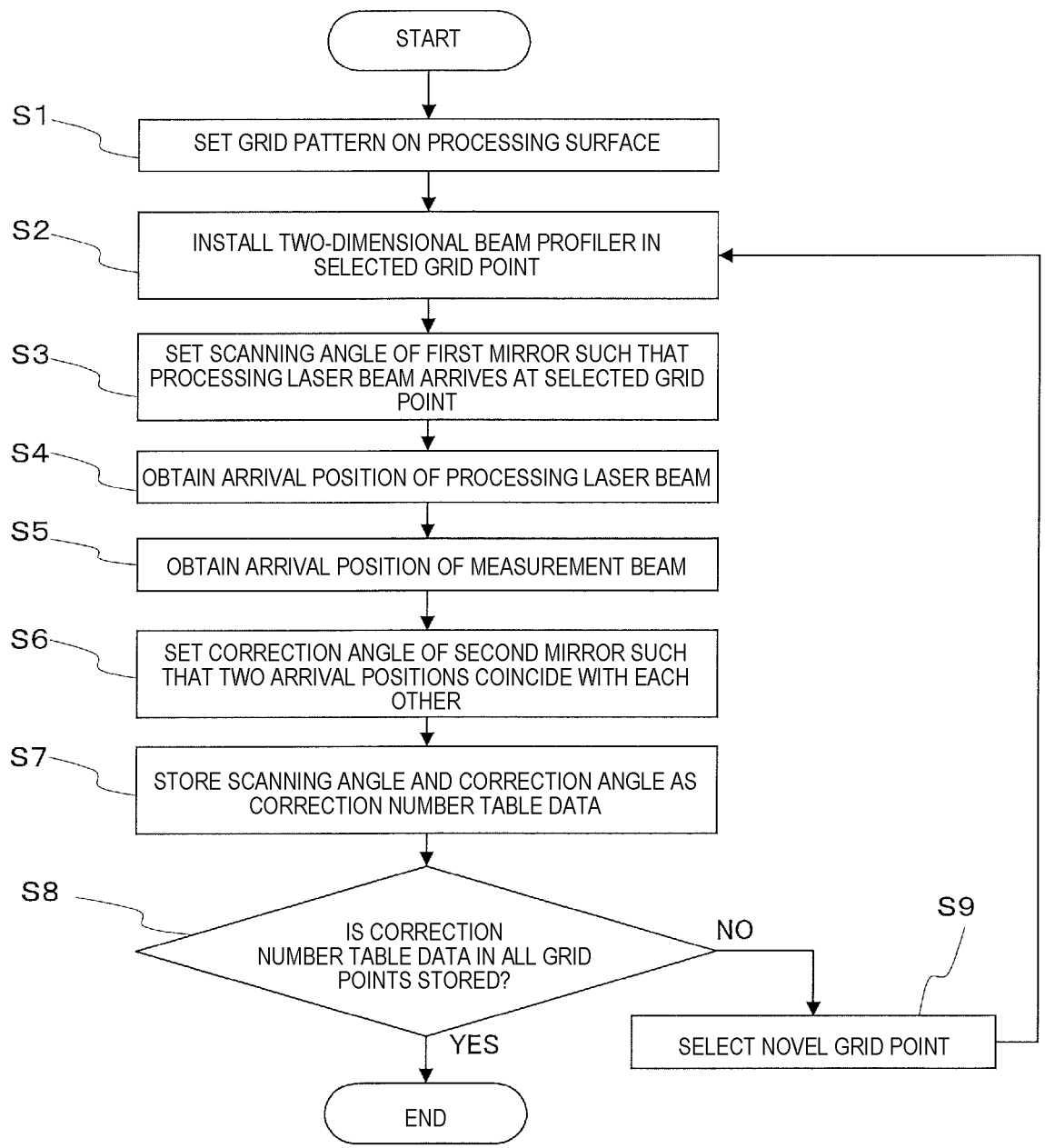
FIG. 22 is a flowchart illustrating a first example of a method of creating first correction number table data.

First, a first example of the method of creating the first correction number table data will be described with reference to FIG. 22. FIG. 22 is a flowchart illustrating the first example of the method of creating the first correction number table data.

In step S1, the control unit 6 sets a grid pattern (for example, the processing beam trajectory 28 illustrated in FIG. 21) in a range in which the laser processing is performed on the processing surface 19 of the workpiece 18. Further, the control unit 6 selects one grid point from a plurality of grid points included in the grid pattern.

In step S2, the control unit 6 sets a two-dimensional beam profiler (not illustrated) at the selected grid point. At this time, the height position of a detection surface of the two-dimensional beam profiler is set to coincide with the processing surface 19.

In step S3, the control unit 6 sets the scanning angle of the first mirror 13 such that the processing laser beam 11 reaches the selected grid point.

In step S4, The control unit 6 obtains a position (hereinafter, referred to as an arrival position of the processing laser beam 11) where the processing laser beam 11 actually reaches the processing surface 19, by irradiating the processing laser beam 11 and using the two-dimensional beam profiler.

In step S5, the control unit 6 obtains a position (hereinafter, referred to as an arrival position of the measurement beam 15) where the measurement beam 15 actually reaches the processing surface 19, by irradiating the measurement beam 15 and using the two-dimensional beam profiler.

In step S6, the control unit 6 sets the correction angle of the second mirror 17 with reference to the measurement result of the two-dimensional beam profiler such that the arrival position of the processing laser beam 11 coincides with the arrival position of the measurement beam 15.

In step S7, the control unit 6 stores, in the memory 31, the scanning angle set in step S3 and the correction angle set in step S6 as the correction number table data.

In step S8, the control unit 6 determines whether or not the correction number table data is stored at all the grid points of the grid pattern. When the correction number table data is stored at all the grid points (step S8: YES), the flow is terminated. On the other hand, when the correction number table data is not stored at all the grid points (step S8: NO), the flow proceeds to step S9.

In step S9, the control unit 6 selects one new grid point (that is, a grid point at which the correction number table data is not stored). Thereafter, the flow returns to step S2.

Hereinabove, the first example of the method of creating the first correction number table data has been described above.

Next, a second example of a method of creating the first correction number table data will be described with reference to FIG. 23.

Figure 23:
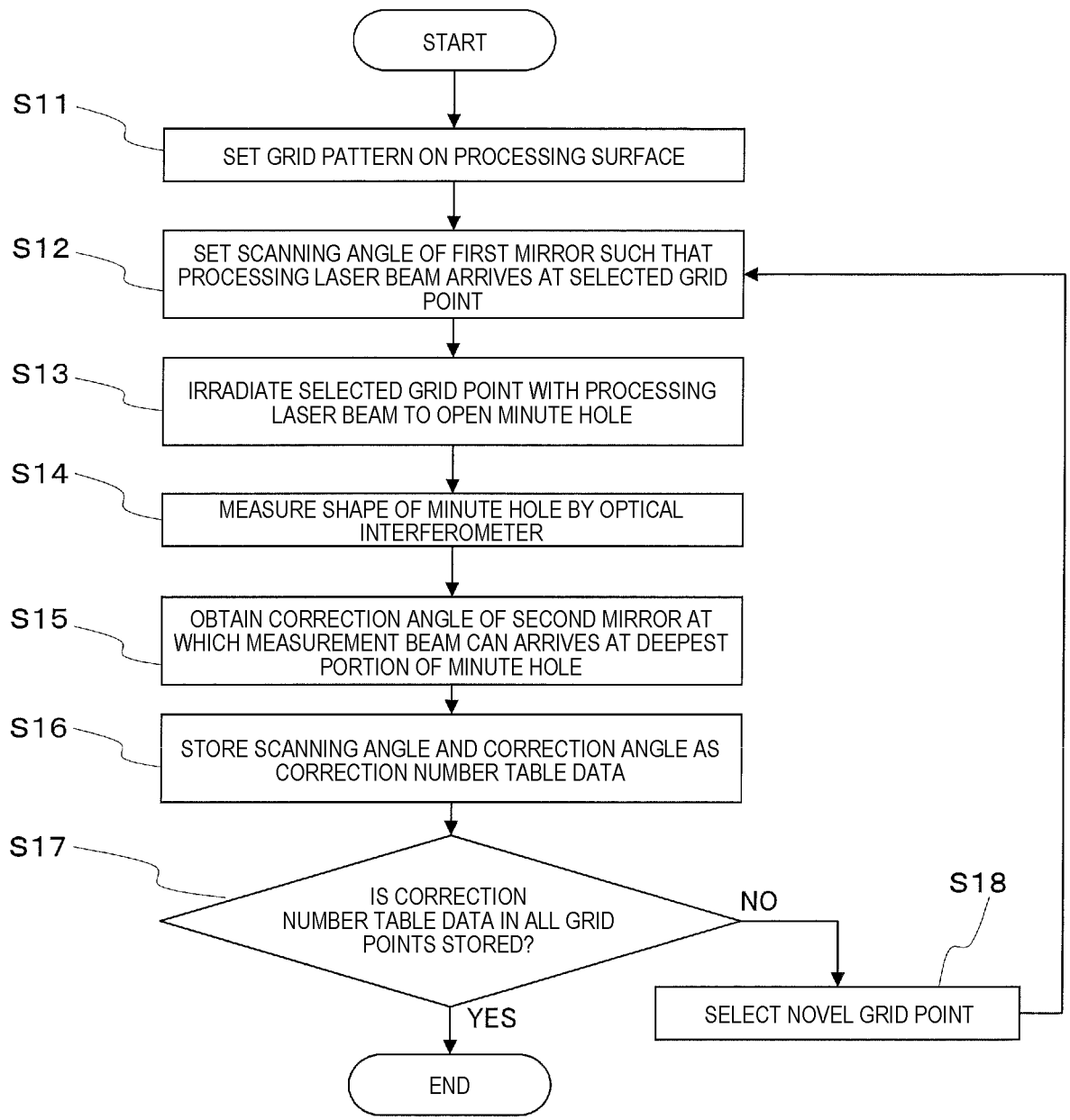
FIG. 23 is a flowchart illustrating a second example of the method of creating first correction number table data.

FIG. 23 is a flowchart illustrating the second example of the method of creating the first correction number table data.

In the present example, for example, a metal flat plate (hereinafter, referred to as a metal plate) is used as a temporary workpiece.

In step S11, the control unit 6 sets a grid pattern (for example, the processing beam trajectory 28 illustrated in FIG. 21) in a range in which the laser processing is performed on the processing surface 19 of the metal plate. Further, the control unit 6 selects one grid point from a plurality of grid points included in the grid pattern.

In step S12, the control unit 6 sets the scanning angle of the first mirror 13 such that the processing laser beam 11 reaches the selected grid point.

In step S13, the control unit 6 irradiates the selected grid point with the processing laser beam 11, and makes a minute hole in the surface of the metal plate. At this time, the output intensity and the irradiation time of the processing laser beam 11 are adjusted such that the processing laser beam 11 passes through the metal plate. Further, it is preferable that the diameter of the minute hole formed herein is about two to three times as large as the measurement resolution of the optical interferometer 3.

In step S14, the control unit 6 causes the optical interferometer 3 to measure the shape of the formed minute hole. At this time, a three-dimensional shape near the minute hole can be measured by operating the second mirror 17 from the original position to some extent and scanning the measurement beam 15.

In step S15, the control unit 6 obtains the correction angle of the second mirror 17 at which the measurement beam 15 can reach the deepest part of the minute hole, by using data indicating the result measured in step S14.

In step S16, the control unit 6 stores, in the memory 31, the scanning angle set in step S12 and the correction angle obtained in step S15 as the correction number table data.

In step S17, the control unit 6 determines whether or not the correction number table data is stored at all the grid points of the grid pattern. When the correction number table data is stored at all the grid points (step S17: YES), the flow is terminated. On the other hand, when the correction number table data is not stored at all the grid points (step S17: NO), the flow proceeds to step S18.

In step S18, the control unit 6 selects one new grid point (that is, a grid point at which correction number table data is not stored). Thereafter, the flow returns to step S12.

Hereinabove, the second example of the method of creating the first correction number table data has been described.

According to the first example or the second example described above, the first correction number table data is obtained. When the grid pattern set in step S1 or step S11 is the 4×4 grid pattern illustrated in FIG. 21, only correction number table data at 16 grid points cannot be created. Therefore, it is preferable that more correction number table data is created by setting a grid-like pattern including 16 or more grid points.

However, even when more correction number table data is created, the scanning angle of the first mirror 13 can be set to any value within an operation range of a mechanism, and thus the scanning angle may not coincide with the correction number table data. In such a case, it is necessary to obtain the correction angle by interpolating the correction number table data. A method of obtaining a correction angle by interpolating the correction number table data will be described below.

Method of Creating Second Correction Number Table Data

A method of creating a second correction number table data will be described. The second correction number table data is data indicating a correspondence between the scanning angle and the correction movement amount. As described above, the correction movement amount corresponds to the position (hereinafter, referred to as a processing position) and the processing speed of the processing point 20.

The second correction number table data is created after the above-described first correction number table data is created.

Further, the second correction number table data is created separately for the processing position and the processing speed. Hereinafter, the correction movement amount related to the processing position is referred to as a "position correction movement amount", and the correction movement amount related to the processing speed is referred to as a "speed correction movement amount". In the present embodiment, correction number table data of the position correction movement amount and correction number table data of the speed correction movement amount are created as the second correction number table data.

Figure 24:
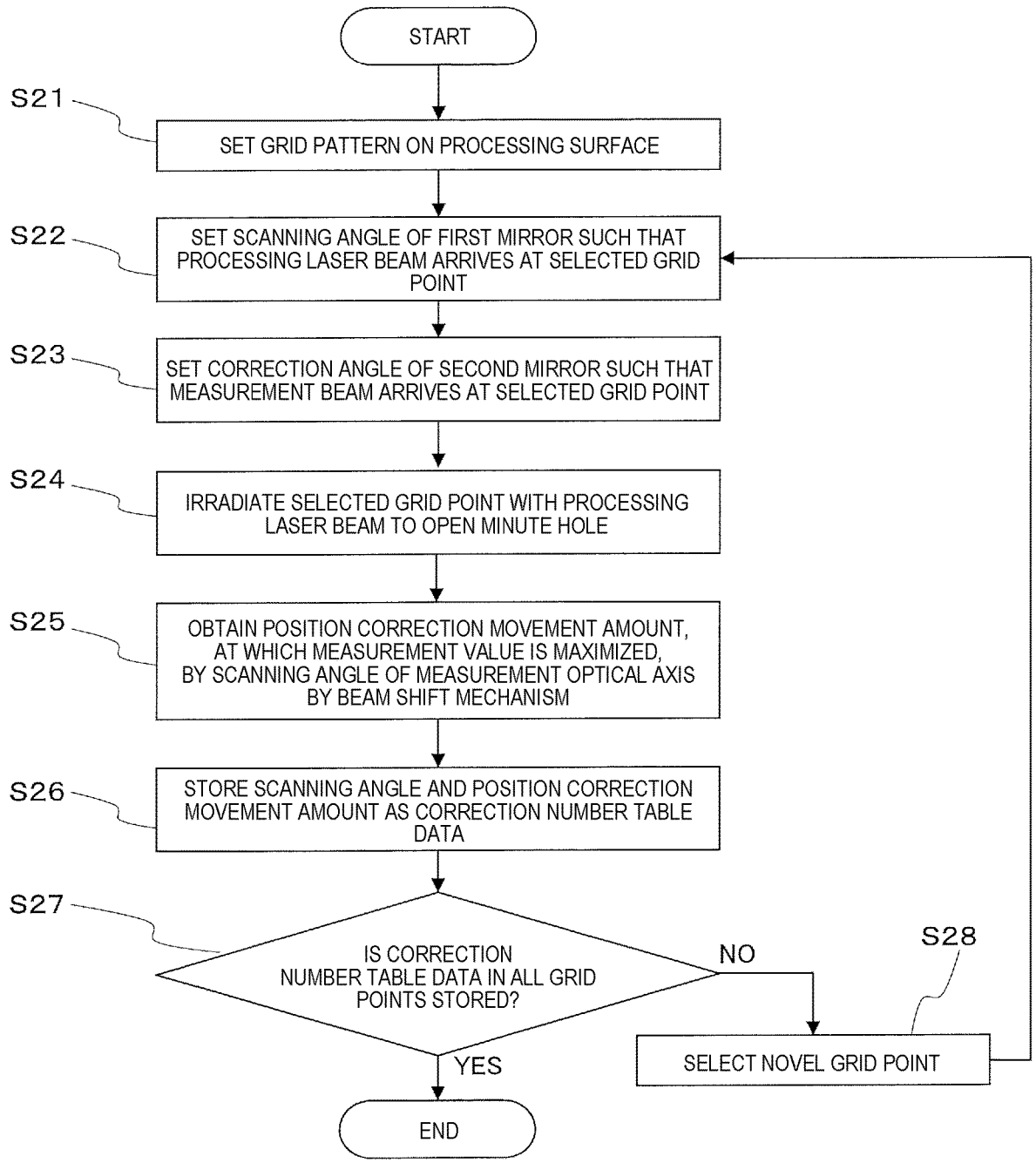
FIG. 24 is a flowchart illustrating a method for creating correction number table data of a position correction movement amount.

First, flow of a method of creating the correction number table data of the position correction movement amount will be described with reference to FIG. 24. FIG. 24 is a flowchart illustrating an example of the method of creating the correction number table data of the position correction movement amount.

In the present example, for example, a metal flat plate (hereinafter, referred to as a metal plate) is used as a temporary workpiece.

In step S21, the control unit 6 sets a grid pattern (for example, the processing beam trajectory 28 illustrated in FIG. 21) in a range in which the laser processing is performed on the processing surface 19 of the metal plate. Further, the control unit 6 selects one grid point from a plurality of grid points included in the grid pattern.

In step S22, the control unit 6 sets the scanning angle of the first mirror 13 such that the processing laser beam 11 reaches the selected grid point.

In step S23, the control unit 6 sets the correction angle of the second mirror 17 such that the measurement beam 15 reaches the selected grid point. Here, the correction angle is a value stored as the above-described first correction number table data.

In step S24, the control unit 6 makes a minute hole in the surface of the metal plate by irradiating the selected grid point with the processing laser beam 11. At this time, the output intensity and the irradiation time of the processing laser beam 11 are adjusted such that the processing laser beam 11 passes through the metal plate. Further, it is preferable that the diameter of the minute hole formed herein is about two to three times as large as the measurement resolution of the optical interferometer 3.

In step S25, the control unit 6 obtains the position correction movement amount, at which the depth of the keyhole 22 is maximized, by scanning an angle of the measurement optical axis 23 to the beam shift mechanism 38.

In step S26, the control unit 6 stores, in the memory 31, the scanning angle set in step S22 and the position correction movement amount obtained in step S25 in the memory 31 as the correction number table data.

In step S27, the control unit 6 determines whether or not the correction number table data is stored at all the grid points of the grid pattern. When the correction number table data is stored at all the grid points (step S27: YES), the flow is terminated. On the other hand, when the correction number table data is not stored at all the grid points (step S27: NO), the flow proceeds to step S28.

In step S28, the control unit 6 selects one new grid point (that is, a grid point at which the correction number table data is not stored). Thereafter, the flow returns to step S22.

With the above-described method, the correction number table data for the position correction movement amount is obtained. The grid pattern set in step S21 is the same as the grid pattern set in the above-described method of creating the first correction number table data. Therefore, when the scanning angle does not coincide with the correction number table data, the position correction movement amount can be obtained by interpolating the correction number table data in the same manner as that described in the method of creating the first correction number table data.

In the present embodiment, the correction number table data for the position correction movement amount and the first correction number table data (the correction number table data for the correction angle) are set as a correction number table of the processing position.

Figure 25:
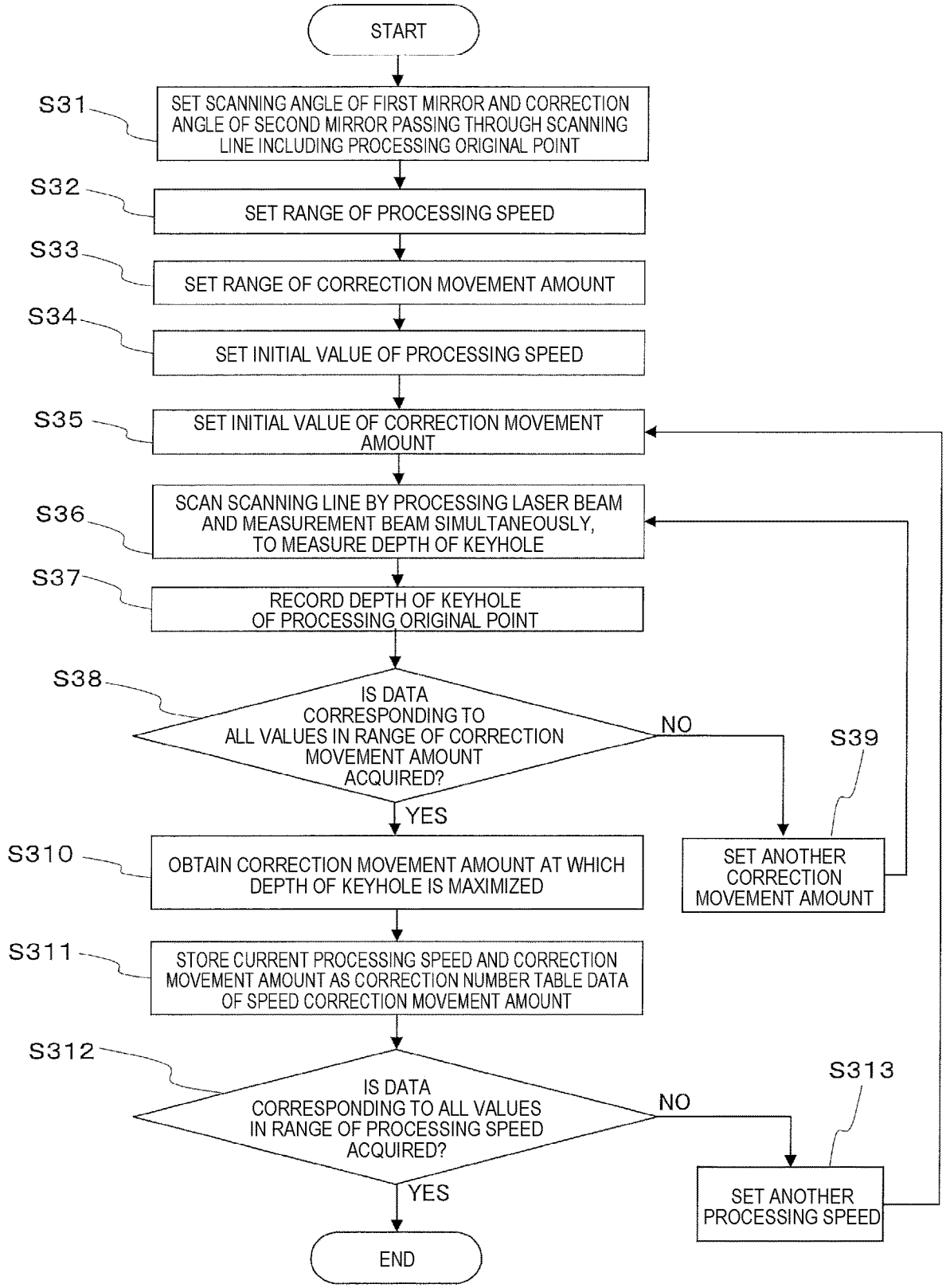
FIG. 25 is a flowchart illustrating a method of creating correction number table data of a speed correction movement amount.

Next, flow of a method of creating the correction number table data of the speed correction movement amount will be described with reference to FIG. 25. FIG. 25 is a flowchart illustrating an example of the method of creating the correction number table data of the speed correction movement amount.

In this example, a metal plate is used as a temporary workpiece.

In step S31, the control unit 6 sets the scanning angle of the first mirror and the correction angle of the second mirror passing through a scanning line including the processing original point 26 (see FIGS. 17 and 18). For example, a line on the x axis passing through the processing original point 26 is used as the scanning line, and values stored as the first correction number table data are used as the scanning angle and the correction angle.

In step S32, the control unit 6 sets a range of the processing speed. For example, the control unit 6 sets a range from the maximum value to the minimum value of the processing speed included in the processing data for processing the workpiece 18 to a range of the processing speed.

In step S33, the control unit 6 sets a range of the correction movement amount. For example, the control unit 6 sets a range in which the angle of the measurement optical axis 23 of the measurement beam 15 incident on the processing point 20 is ±10 deg in the scanning direction to a range of the correction movement amount.

In step S34, the control unit 6 sets an initial value of the processing speed. For example, the minimum value of the range of the processing speed is set as the initial value of the processing speed.

In step S35, the control unit 6 sets an initial value of the correction movement amount. For example, the minimum value of the range of the correction movement amount is set as the initial value of the correction movement amount.

In step S36, the control unit 6 simultaneously scans the scanning line with the processing laser beam 11 and the measurement beam 15 at the set processing speed, and measures the depth of the keyhole 22.

In step S37, the control unit 6 records the depth of the keyhole 22 at the position of the processing original point 26 among the depths of the keyhole 22 measured in step S36.

In step S38, the control unit 6 determines whether or not data corresponding to all values included in the range of the correction movement amount set in step S33 is acquired. The data referred to here is data indicating the depth of the keyhole 22 at the position of the processing original point 26.

When the data corresponding to all the values in the range of the correction movement amount is acquired (step S38: YES), the flow proceeds to step S310. On the other hand, when the data corresponding to all the values in the range of the correction movement amount is not acquired (step S38: NO), the flow proceeds to step S39.

In step S39, the control unit 6 sets another correction movement amount. Thereafter, the flow returns to step S36.

In step S310, the control unit 6 obtains a correction movement amount at which the depth of the keyhole 22 is maximized, based on the depth of the keyhole 22 recorded in step S37.

In step S311, the control unit 6 stores, in the memory 31, a current processing speed and the correction movement amount, at which the depth of the keyhole 22 obtained in step S310 is maximized, as the correction number table data of the speed correction movement amount.

In step S312, the control unit 6 determines whether or not the data corresponding to all the values included in the range of the processing speed set in step S32 is acquired. The data referred to here is the correction number table data indicating the current processing speed and the correction movement amount at which the depth of the keyhole 22 is maximized.

When the data corresponding to all the values included in the range of the processing speed is acquired (step S312: YES), the flow is terminated. On the other hand, when the data corresponding to all the values included in the range of the processing speed is not acquired (step S312: NO), the flow proceeds to step S313.

In step S313, the control unit 6 sets another processing speed. Thereafter, the flow returns to step S35.

By the above-described method, the correction number table data for the speed correction movement amount is obtained.

FIG. 26 illustrates an example of the correction number table data for the speed correction movement amount. As illustrated in FIG. 26, in the correction number table data for the speed correction movement amount, the processing speed $V_k$ and the m speed correction movement amount $|D_{Vk}|$ are associated with each other. In FIG. 26, the speed correction movement amount $|D_{Vk}|$ is recorded as the magnitude of inclination in the scanning direction.

Figure 32:
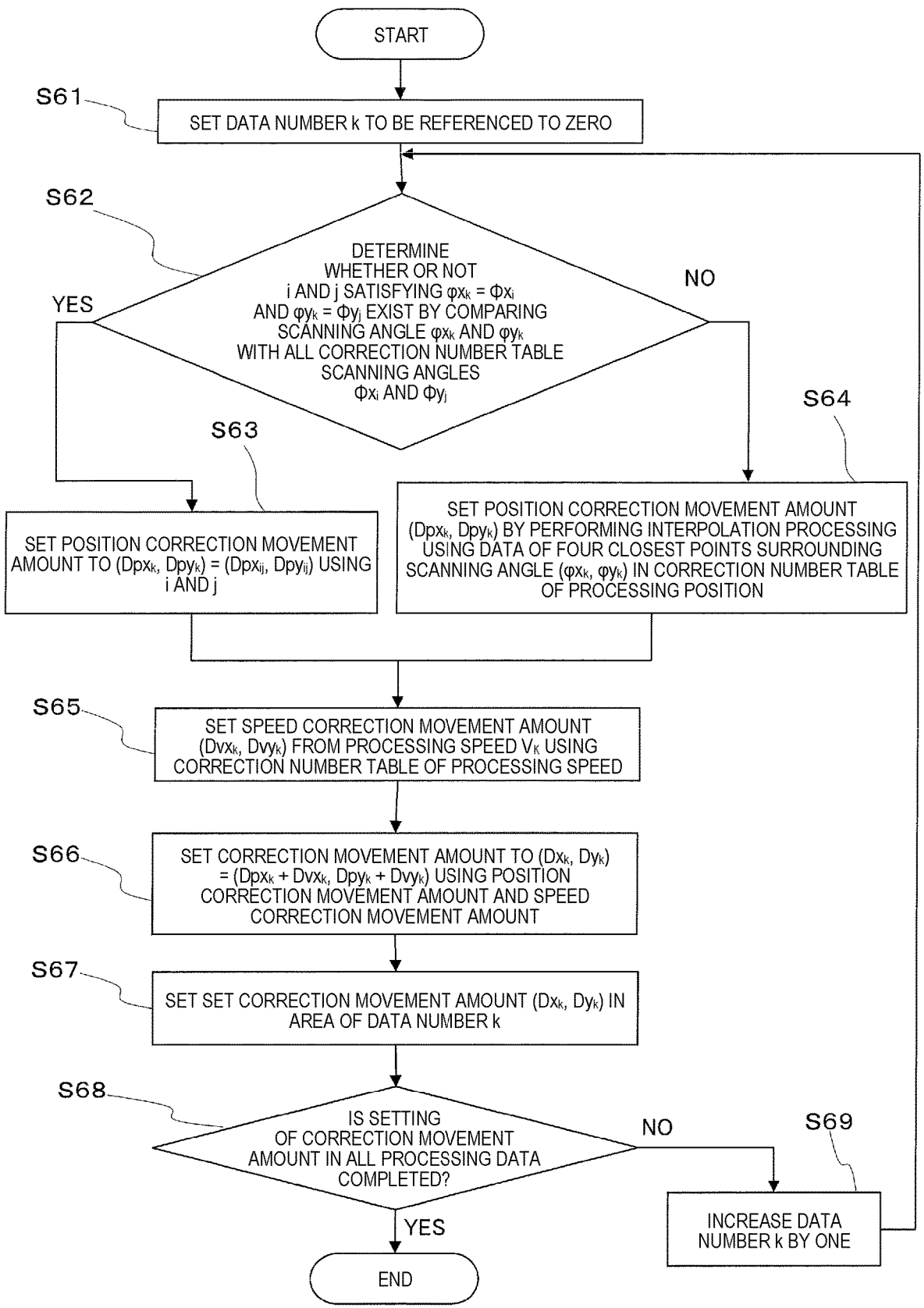
FIG. 32 is a flowchart illustrating a method of setting a correction movement amount.

In the present embodiment, the correction number table data for the speed correction movement amount illustrated in FIG. 26 is used as a correction number table for the processing speed (see FIG. 32 described below).

Method of Creating Processing Data

Next, a method of creating processing data for processing the workpiece 18 will be described.

Conventionally, in a laser processing apparatus having an fθ lens and a galvanometer mirror, a control unit controls a laser oscillator and a galvanometer mirror using a plurality of pieces of processing data (for example, data in which an output indication value to the laser oscillator and data items of a scanning angle and a processing speed are set for each processing point) set in a time series. Accordingly, each processing point on the surface of the workpiece is processed in time series.

In the present embodiment, the data items of the processing data used by the laser processing apparatus 1 further include the correction angle and the correction movement amount in addition to the output indication value (also referred to as laser output data) to the laser oscillator 5, the position (also referred to as a processing point position) of the processing point 20, the processing speed, and the scanning angle. In the following description, the processing data to which the correction angle and the correction movement amount are added as data items will be referred to as "corrected processing data".

Here, an example of the corrected processed data will be described with reference to FIG. 27. FIG. 27 is a diagram illustrating an example of a configuration of the corrected processing data.

As illustrated in FIG. 27, the corrected processed data includes, as a set of data items, the data number k, the laser output data $L_k$, the processing point position $x_k$, the processing point position $y_k$, the processing speed $V_k$, the scanning angle $\varphi x_k$, the scanning angle $\varphi y_k$, the correction angle $\psi x_k$, the correction angle $\psi y_k$, the correction movement amount $Dx_k$, and the correction movement amount $Dy_k$.

The data number k indicates the order of the processed data. The laser output data $L_k$ indicates the output indication value to the laser oscillator 5. The processing point position $x_k$ indicates the position of the processing point 20 in the x direction. The processing point position $y_k$ indicates the position of the processing point 20 in the y direction. The processing speed $V_k$ indicates the scanning speed of the processing laser beam 11. The scanning angle $\varphi x_k$ indicates the scanning angle of the first mirror 13 responsible for the scanning in the x direction. The scanning angle $\varphi y_k$ indicates the scanning angle of the first mirror 13 responsible for the scanning in the y direction. The correction angle $\psi x_k$ indicates the correction angle of the second mirror 17 responsible for correcting the position of the measurement beam 15 in the x direction. The correction angle $\psi y_k$ indicates the correction angle of the second mirror 17 responsible for correcting the position of the measurement beam 15 in the y direction.

In FIG. 27, the suffix k added to each data item other than the data number k indicates that the data item corresponds to the data number k. The scanning angle in the corrected processed data is an example of a "first indication value". Further, the correction angle in the corrected processed data is an example of a "second indication value". Further, the correction movement amount in the corrected processed data is an example of a "third indication value".

The example of the corrected processed data has been described above.

Figure 28:
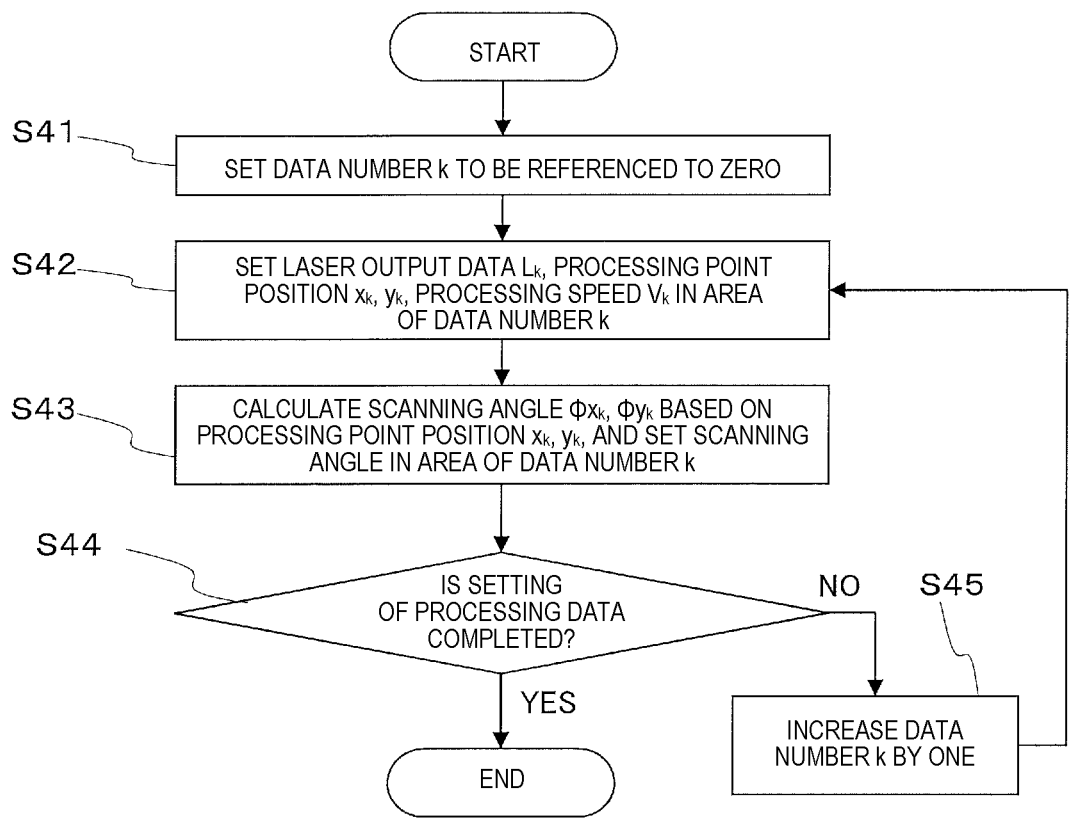
FIG. 28 is a flowchart illustrating a method for creating processing data.

Next, flow of a method of creating processing data will be described with reference to FIG. 28. FIG. 28 is a flowchart illustrating the method for creating processing data.

In step S41, the control unit 6 sets the data number k to be referenced to zero. The data number k is assigned to an area in the memory 31 in which the processing data is stored.

In step S42, the control unit 6 sets (which may be referred to as "stores") the laser output data $L_k$, the processing point positions $x_k$ and $y_k$, and the processing speed $V_k$ in the area of the data number k in the memory 31 (which may be referred to as a memory position). These values are set values set by the user of the laser processing apparatus 1 using a manipulation unit (for example, a keyboard, a mouse, a touch panel, or the like) that is not illustrated, in order to realize desired laser processing.

In step S43, the control unit 6 calculates the scanning angles $\varphi x_k$ and $\varphi y_k$ of the first mirror 13 on the basis of the processing point positions $x_k$ and $y_k$ set in step S42, and stores the scanning angles $\varphi x_k$ and $\varphi y_k$ in the area of the data number k in the memory 31. When the focal length of the lens 14 is f, a relationship of $(x_k, y_k)=(2f\cdot\varphi x_k, 2f\cdot\varphi y_k)$ between the processing point position and the scanning angle is established, and thus the scanning angle from the processing point position is automatically determined. Note that a relational expression between the processing point position and the scanning angle, a correspondence table, and the like may be set in advance by the user. In this case, the control unit 6 may determine the scanning angles $\varphi x_k$ and $\varphi y_k$ of the first mirror 13 using a relational expression between the processing point position and the scanning angle, a correspondence number table, and the like.

In step S44, the control unit 6 determines whether or not the processing data is completely set for all the data numbers k. When the processing data is completely set for all the data numbers k (step S44: YES), the flow is terminated. On the other hand, when the processing data is not completely set for all the data numbers k (step S44: NO), the flow proceeds to step S45.

In step S45, the data number k to be referenced is increased by one. Thereafter, the flow returns to step S42.

According to the above-described flow, the processing data is set for all the data numbers k.

Method of Setting Correction Angle

Next, a method of setting a correction angle for each processing point position for each processing data set according to the flow of FIG. 28 will be described.

Figure 29:
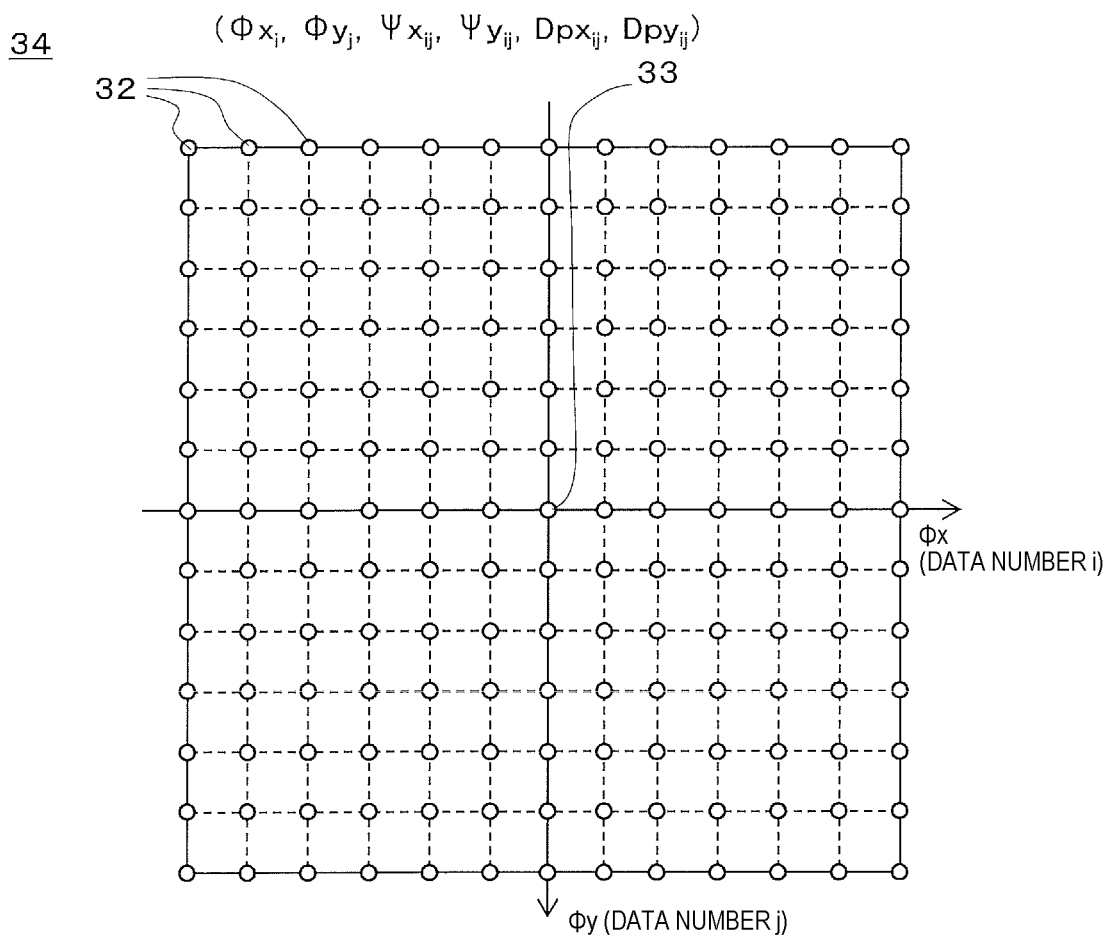
FIG. 29 is a diagram illustrating the correction number table schematically representing a configuration of the correction number table data.

First, a configuration of the correction number table data of the processing position will be described with reference to FIG. 29. FIG. 29 is a diagram illustrating a correction number table 34 for a processing position, which schematically represents a configuration of the correction number table data for a processing position.

FIG. 29 schematically illustrates, as the data point 32, the corrected processing data set for each grid point on the processing surface 19. As described above, each of the data points 32 as the corrected processing data includes the position (that is, the processing point position) on the processing surface 19, the scanning angle, the correction angle, and the position correction movement amount. A correction data point 33 is a point corresponding to the processing original point 26 on the processing surface 19.

In the following description, for convenience, the position of each data point 32 in the correction number table 34 for a processing position is indicated by the scanning angle ($\varphi x$, $\varphi y$). The data number in a direction corresponding to the scanning angle $\varphi x$ is i, and the data number in a direction corresponding to the scanning angle $\varphi y$ is j. The data point 32 holds a set ($\Phi x_i$, $\Phi y_j$, $\Psi x_{ij}$, $\Psi y_{ij}$, $Dpx_{ij}$, $Dpy_{ij}$) of the correction number table scanning angle ($\Phi x_i$, $\Phi y_j$), the correction number table correction angle ($\Psi x_{ij}$, $\Psi y_{ij}$), and the correction number table position correction movement amount ($Dpx_{ij}$, $Dpy_{ij}$). The correction number table scanning angle ($\Phi x_i$, $\Phi y_j$) has an element of the scanning angle ($\varphi x$, $\varphi y$).

Figure 30:
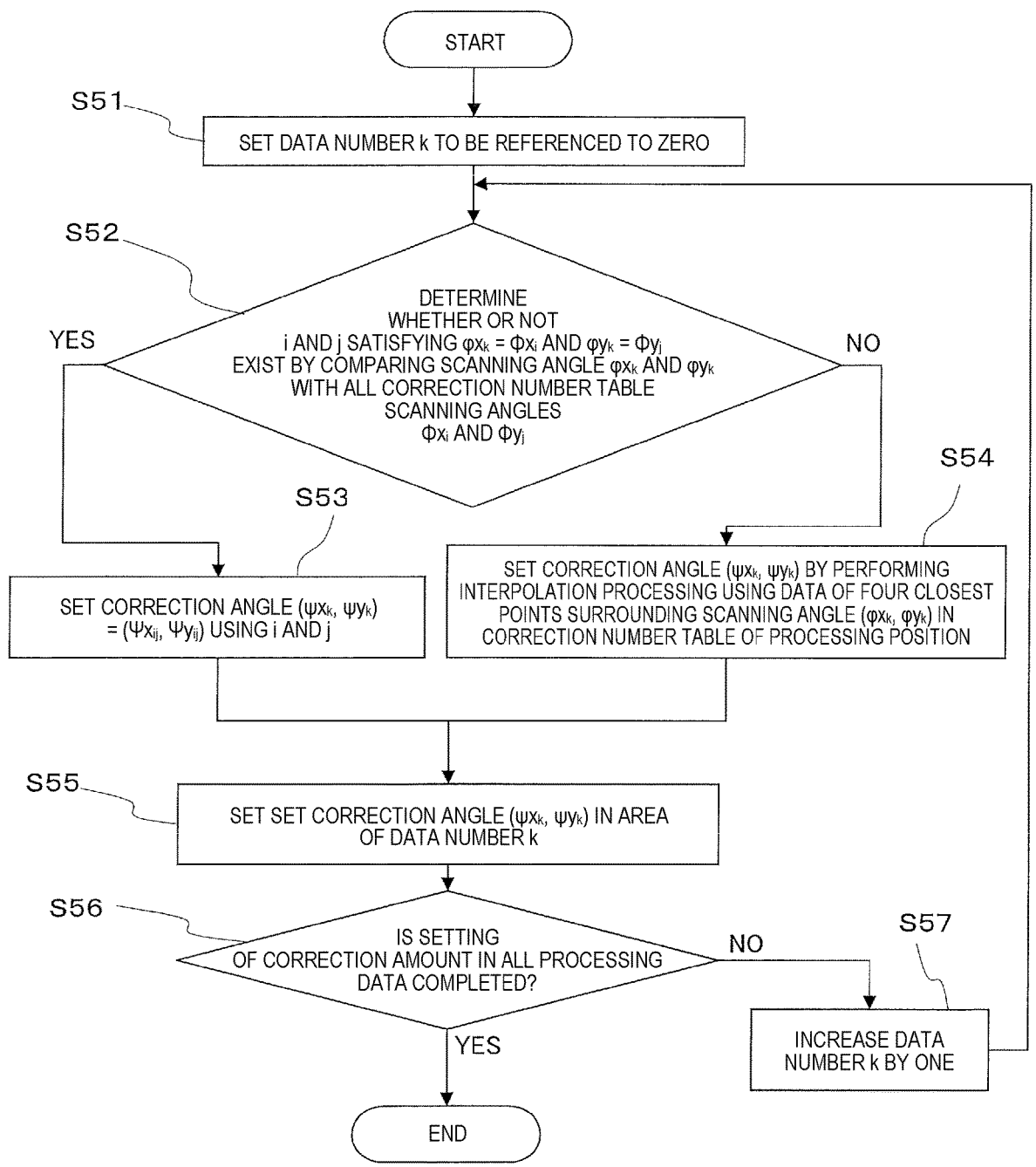
FIG. 30 is a flowchart illustrating a method of setting a correction angle.

Next, flow of the method of setting a correction angle will be described with reference to FIG. 30. FIG. 30 is a flowchart illustrating the method of setting a correction angle.

In step S51, the control unit 6 sets the data number k to be referenced to zero.

In step S52, the control unit 6 determines whether or not the data numbers i and j exist in which $\varphi x_k=\Phi x_i$ and $\varphi y_k=\Phi y_j$, by comparing the scanning angle ($\varphi x_k$, $\varphi y_k$) stored in the area of the data number k of the memory 31 with all the correction number table scanning angles ($\Phi x_i$, $\Phi y_j$) in the correction number table 34 of the processing position. In this step S52, the control unit 6 determines whether or not a data item including the same scanning angle as the scanning angle set by the user exists in the correction number table 34 for the processing position.

When the data numbers i and j satisfying $\varphi x_k=\Phi x_i$ and $\varphi y_k=\Phi y_j$ exist (step S52: YES), the flow proceeds to step S53. On the other hand, when the data numbers i and j satisfying $\varphi x_k=\Phi x_i$ and $\varphi y_k=\Phi y_j$ do not exist (step S52: NO), the flow proceeds to step S54.

In step S53, the control unit 6 sets the correction angle to ($\psi x_k$, $\psi y_k$)=($\Psi x_{ij}$, $\Psi y_{ij}$) using the data numbers i and j satisfying $\varphi x_k=\Phi x_i$ and $\varphi y_k=\Phi y_j$. That is, in step S53, since the data item including the same scanning angle as the scanning angle set by the user exists, the control unit 6 sets the corresponding correction number table correction angle.

In step S54, the control unit 6 sets the correction angle ($\psi x_k$, $\psi y_k$) by performing the interpolation processing using the data of the four closest points surrounding the scanning angle ($\varphi x_k$, $\varphi y_k$) set by the user in the correction number table 34.

Details of step S54 will be described below.

In step S55, the control unit 6 sets (stores) the correction angle ($\psi x_k$, $\psi y_k$) set in step S53 or step S54 in the area of the data number k of the processing data in the memory 31.

In step S56, the control unit 6 determines whether or not the correction angle is completely set for all the processing data stored in the memory 31. When the correction angle is completely set for all the processing data (step S56: YES), the flow is terminated. On the other hand, when the correction angle is not completely set for all the processing data (step S56: NO), the flow proceeds to step S57.

In step S57, the control unit 6 increases, by one, the data number k to be referenced. Thereafter, the flow returns to step S52.

According to the above flow, the correction angles are set for all the data numbers k in the processing data set by the flow of FIG. 28.

Details of Interpolation Processing

Next, step S54 (interpolation processing) illustrated in FIG. 30 will be described in detail. The interpolation processing in step S54 is performed when the scanning angle ($\varphi x_k$, $\varphi y_k$) set by the user does not coincide with any of the correction number table scanning angle ($\Phi x_i$, $\Phi y_j$) in the data point 32.

Figure 31:
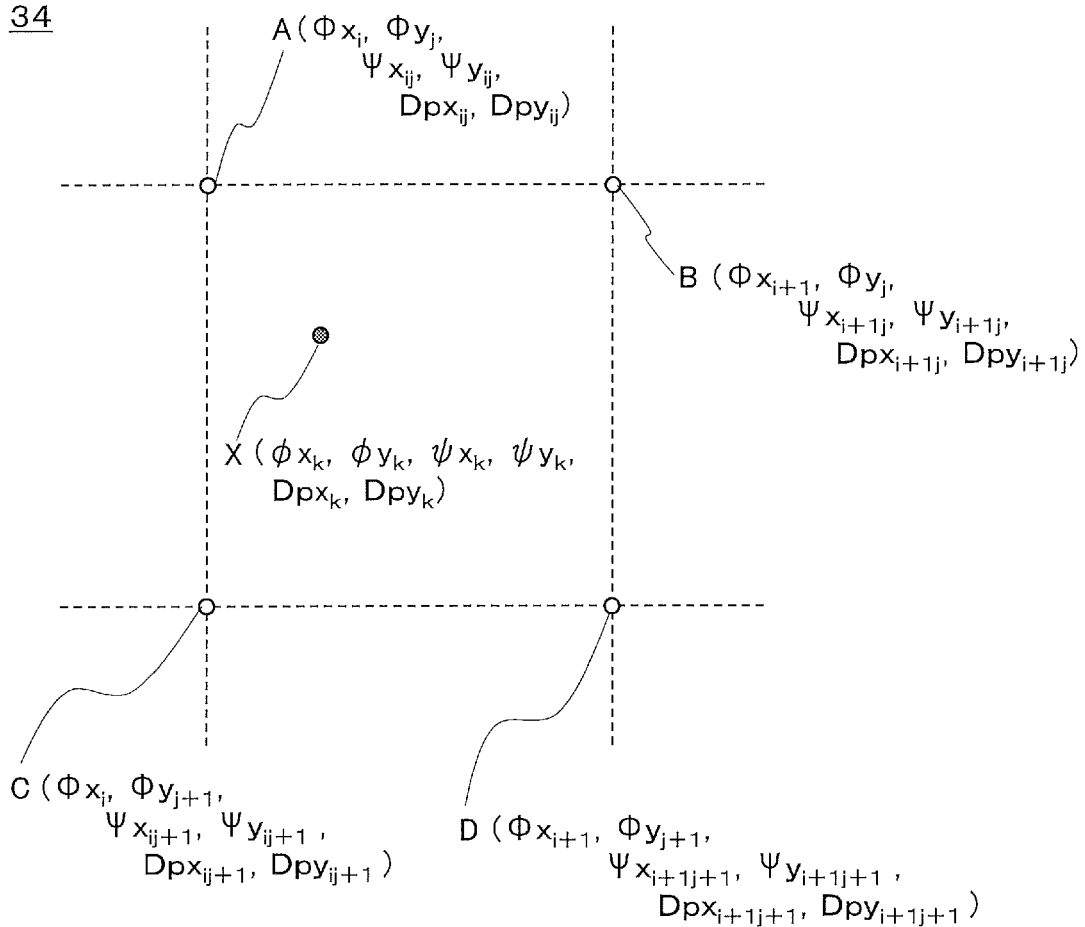
FIG. 31 is a diagram illustrating a relationship between the scanning angle X and the surrounding correction data point when the scanning angle X set by the user does not coincide with the correction number table scanning angle at any data point on the correction number table.

FIG. 31 is a diagram illustrating a relationship between the scanning angle X ($\varphi x_k$, $\varphi y_k$) and the surrounding correction data point when the scanning angle X ($\varphi x_k$, $\varphi y_k$) set as the processing data by the user does not coincide with the correction number table scanning angle ($\Phi x_i$, $\Phi y_j$) of the data point 32 of any of the correction number table 34 for a processing position illustrated in FIG. 29.

As illustrated in FIG. 31, points corresponding to the scanning angle X ($\varphi x_k$, $\varphi y_k$, $\psi x_k$, $\psi y_k$, $Dpx_k$, $Dpy_k$) are located in a grid made by four points including the correction data point A ($\Phi x_i$, $\Phi y_j$, $\Psi x_{ij}$, $\Psi y_{ij}$, $Dpx_{ij}$, $Dpy_{ij}$), the correction data point B ($\Phi x_{i+1}$, $\Phi y_j$, $\Psi x_{i+1j}$, $\Psi x_{i+1j}$, $Dpx_{i+1j}$, $Dpy_{i+1j}$), the correction data point C ($\Phi x_i$, $\Phi y_{j+1}$, $\Psi x_{ij+1}$, $\Psi y_{ij+1}$, $Dpx_{ij+1}$, $Dpy_{ij+1}$), and the correction data point D ($\Phi x_{i+1}$, $\Phi y_{j+1}$, $\Psi x_{i+1j+1}$, $\Psi y_{i+1j+1}$, $Dpx_{i+1j+1}$, $Dpy_{i+1j+1}$). A relationship of $\Phi x_i \leq \varphi x_k \leq \Phi x_{i+1}$ (equal signs are not simultaneously established) and a relationship of $\Phi y_j \leq \varphi y_k \leq \Phi y_{j+1}$ (equal signs are not simultaneously established) are established. At this time, the correction angle ($\psi x_k$, $\psi y_k$) is obtained by using a value of the scanning angle X ($\varphi x_k$, $\varphi y_k$) and values of the correction data points A, B, C, and D, by Equations (1) and (2).

$$\psi x_k = (E\Psi x_{ij} + F\Psi x_{i+1j} + G\Psi x_{ij+1} + H\Psi x_{i+1j+1})/J \quad (1)$$

$$\psi y_k = (E\Psi y_{ij} + F\Psi y_{i+1j} + G\Psi y_{ij+1} + H\Psi y_{i+1j+1})/J \quad (2)$$

E, F, G, H, and J in Equations (1) and (2) are obtained by Equations (3) to (7).

$$E=(\varphi x_k-\Phi x_i)(\varphi y_k-\Phi y_j) \quad (3)$$

$$F=(\Phi x_{i+1}-\varphi x_k)(\varphi y_k-\Phi y_j) \quad (4)$$

$$G=(\varphi x_k-\varphi x_i)(\varphi y_{j+1}-\varphi y_k) \quad (5)$$

$$H=(\Phi x_{i+1}-\varphi x_k)(\Phi y_{i+1}-\varphi y_k) \quad (6)$$

$$J=(\Phi x_{i+1}-\Phi x_i)(\Phi y_{j+1}-\Phi y_j) \quad (7)$$

With the above-described interpolation processing, the correction angle can be calculated based on the scanning angle set by the user.

In the above-described interpolation processing, the linear interpolation method is used as an example. However, other known two-dimensional interpolation methods (spline interpolation, quadratic surface approximation, and the like) may be used. Further, a high-order approximate continuous curved surface for the correction angle with respect to the scanning angle may be calculated in advance from the correction number table correction angle ($\Psi x_{ij}$, $\Psi y_{ij}$) on the correction number table 34, and the correction angle corresponding to the scanning angle may be calculated.

Method of Setting Correction Movement Amount

Next, a method of setting a correction movement amount for each processing point position for each processing data set according to the flow of FIG. 28 will be described. In the present embodiment, a position correction movement amount and a speed correction movement amount are set as the correction movement amount.

Next, flow of a method of setting the correction movement amount will be described with reference to FIG. 32. FIG. 32 is a flowchart illustrating the method of setting a correction movement amount.

In step S61, the control unit 6 sets the data number k to be referenced to zero.

In step S62, the control unit 6 determines whether or not the data numbers i and j exist in which $\varphi x_k=\Phi x_i$ and $\varphi y_k=\Phi y_j$, by comparing the scanning angle ($\varphi x_k$, $\varphi y_k$) stored in the area of the data number k of the memory 31 with all the correction number table scanning angles ($\Phi x_i$, $\Phi y_j$) in the correction number table 34 of the processing position. In the present step S62, the control unit 6 determines whether or not there is a data item including the scanning angle exactly the same as the scanning angle set by the user in the processing position correction number table 34.

When the data numbers i and j satisfying $\varphi x_k=\Phi x_i$ and $\varphi y_k=\Phi y_j$ exist (step S62: YES), the flow proceeds to step S63. On the other hand, when the data numbers i and j satisfying $\varphi x_k=\Phi x_i$ and $\varphi y_k=\Phi y_j$ do not exist (step S62: NO), the flow proceeds to step S64.

In step S63, the control unit 6 sets the position correction movement amount to (Dpx$_k$, Dpy$_k$)=(Dpx$_{ij}$, Dpy$_{ij}$) using the data numbers i and j satisfying $\varphi x_k=\Phi x_i$ and $\varphi y_k=\Phi y_j$. That is, in step S63, the control unit 6 sets the corresponding correction number table position correction movement amount as the position correction movement amount as it is since the data item including the scanning angle exactly the same as the scanning angle set by the user exists.

In step S64, the control unit 6 sets the position correction movement amount (Dpx$_k$, Dpy$_k$) by performing the interpolation processing using the data of the four closest points surrounding the scanning angle ($\varphi x_k$, $\varphi y_k$) set by the user in the correction number table 34 for a processing position. The interpolation processing in step S64 can be performed in the same manner as the above-described interpolation processing in step S54 of FIG. 30.

In step S65, the control unit 6 sets the speed correction movement amount (Dvx$_k$, Dvy$_k$) from the processing speed V$_k$ using the processing speed correction number table.

In detail, first, the control unit 6 obtains the magnitude Dv of the speed correction movement amount corresponding to the processing speed V$_k$ from the processing speed correction number table illustrated in FIG. 26. Next, the control unit 6 obtains the speed correction movement amount (Dvx$_k$, Dvy$_k$) from the processing point position (x$_k$, y$_k$) of the current data number k and the processing point position (x$_{k+1}$, y$_{k+1}$) of a next data number k+1 using Equations (8) to (10).

$$Dvx_k=Dv\times(x_{k+1}-x_k)/R \quad (8)$$

$$Dvy_k=Dv\times(y_{k+1}-y_k)/R \quad (9)$$

$$R=\sqrt{((x_{k+1}-x_k)^2+(y_{k+1}-y_k)^2)} \quad (10)$$

In step S66, the control unit 6 sets the correction movement amount (Dx$_k$, Dy$_k$) to (Dx$_k$, Dy$_k$)=(Dpx$_k$+Dvx$_k$, Dpy$_k$+Dvy$_k$) using the position correction movement amount and the speed correction movement amount.

In step S67, the control unit 6 sets (stores) the correction movement amount (Dx$_k$, Dy$_k$) set in step S66 in the area of the data number k of the processing data in the memory 31.

In step S68, the control unit 6 determines whether or not the correction movement amount is completely set for all the processing data stored in the memory 31. When the correction movement amount is completely set all the processing data (step S68: YES), the flow is terminated.

On the other hand, when the correction movement amount is not completely set for all the processing data (step S68: NO), the flow proceeds to step S69.

In step S69, the control unit 6 increases the data number k to be referenced by one. Thereafter, the flow returns to step S62.

According to the above flow, in the processing data set by the flow of FIG. 28, the correction movement amount is set for all the data numbers k.

Laser Processing Method

Figure 33:
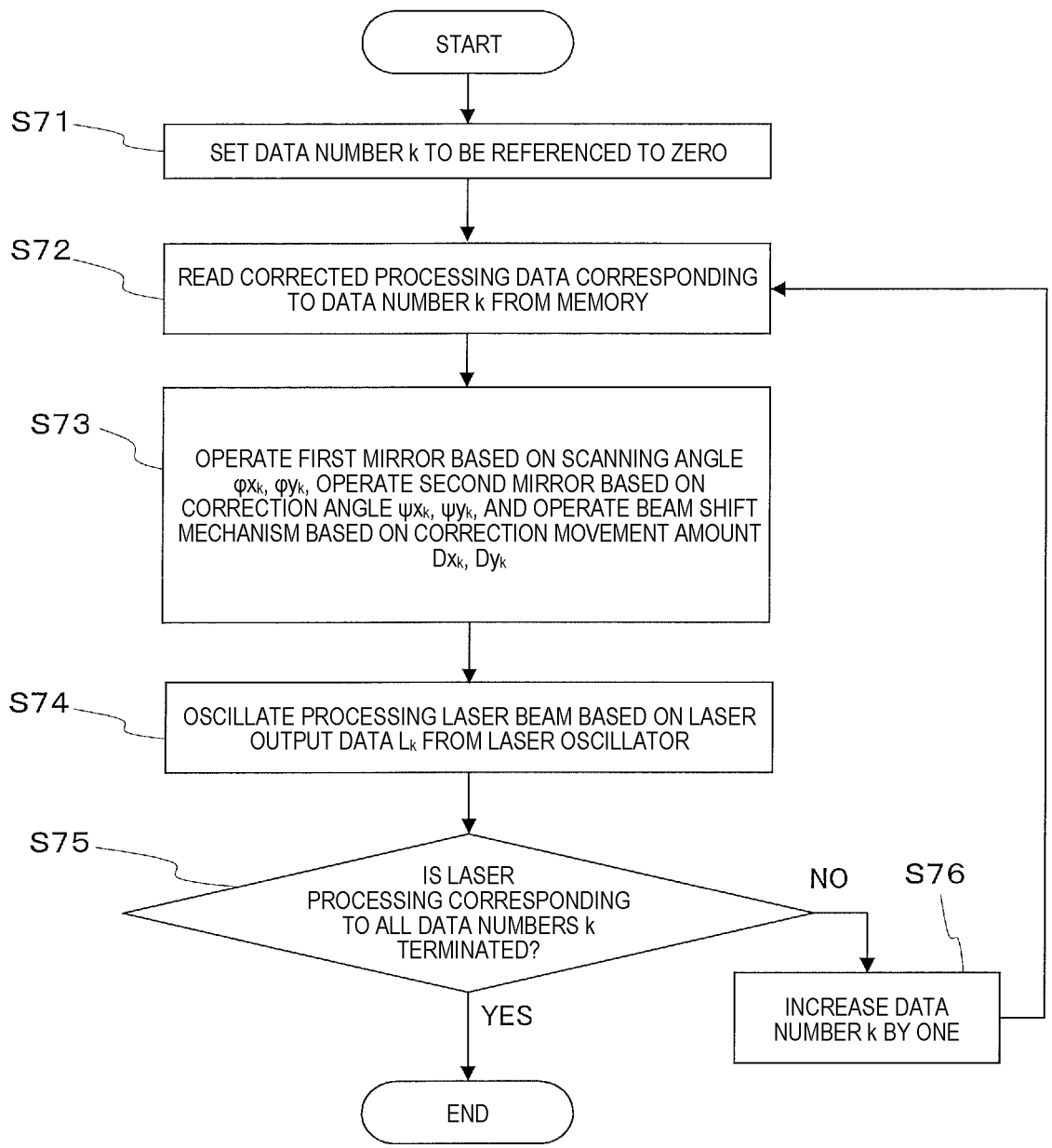
FIG. 33 is a flowchart illustrating a laser processing method.

Next, flow of a laser processing method by the laser processing apparatus 1 will be described with reference to FIG. 33. FIG. 33 is a flowchart illustrating the laser processing method.

In step S71, the control unit 6 sets the data number k to be reference to zero.

In step S72, the control unit 6 reads out, from the memory 31, the corrected processed data (the laser output data L$_k$, the scanning angle $\varphi x_k$, $\varphi y_k$, the correction angle $\psi x_k$, $\psi y_k$, and the correction movement amount Dx$_k$, Dy$_k$) corresponding to the data number k.

In step S73, the control unit 6 operates the first mirror 13 based on the scanning angle ($\varphi x_k$, $\varphi y_k$), operates the second mirror 17 based on the correction angle ($\psi x_k$, $\psi y_k$), and operates the beam shift mechanism 38 based on the correction movement amount (Dx$_k$, Dy$_k$).

In detail, the control unit 6 notifies the first driver 7 of the scanning angle ($\varphi x_k$, $\varphi y_k$). Accordingly, the first driver 7 operates the first mirror 13 based on the scanning angle ($\varphi x_k$, $\varphi y_k$). Further, the control unit 6 notifies the second driver 8 of the correction angle ($\psi x_k$, $\psi y_k$). Accordingly, the second driver 8 operates the second mirror 17 based on the correction angle ($\psi x_k$, $\psi y_k$). Further, the control unit 6 notifies the third driver 41 of the correction movement amount (Dx$_k$, $Dy_k$). Accordingly, the second driver 8 operates the beam shift mechanism 38 based on the correction movement amount ($Dx_k$, $Dy_k$).

In step S74, the control unit 6 transmits the laser output data $L_k$ as a laser output value to the laser oscillator 5, and causes the laser oscillator 5 to oscillate the processing laser beam 11 based on the laser output data $L_k$.

In step S75, the control unit 6 determines whether or not the laser processing corresponding to all the data numbers k stored in the memory 31 is completed. When the laser processing corresponding to all the data numbers k is completed (step S75: YES), the flow is terminated. On the other hand, when the laser processing corresponding to all the data numbers k is not completed (step S75: NO), the flow proceeds to step S76.

In step S76, the control unit 6 increases the data number k to be referenced, by one. Thereafter, the flow returns to step S72.

According to the above flow, the laser processing is executed for all the data numbers k.

Method of Measuring Keyhole Depth

Figure 34:
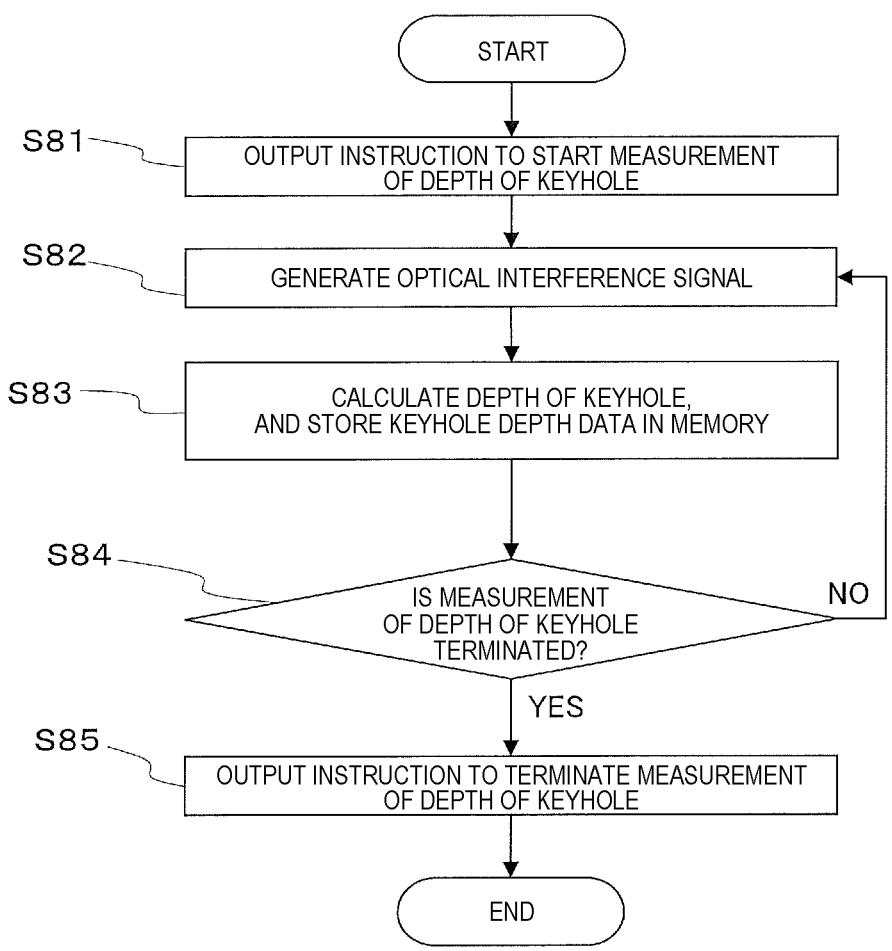
FIG. 34 is a flowchart illustrating a method of measuring the depth of a keyhole.

Next, flow of a method of measuring the depth of the keyhole 22 (for example, see FIG. 16) when the above-described laser processing method is executed will be described with reference to FIG. 34. FIG. 34 is a flowchart illustrating the method of measuring the depth of the keyhole 22.

In step S81, before starting the laser processing method described with reference to FIG. 33, the control unit 6 acquires the position data of the processing surface 19 of the unprocessed workpiece 18. Here, the position data is data indicating the height of the unprocessed processing surface 19 (in other words, the position of the processing surface 19 in the Z-axis direction illustrated in FIG. 16 and the like). Further, the control unit 6 issues an instruction to start measuring the depth of the keyhole 22 to the measurement processing unit 4.

When the laser processing method illustrated in FIG. 33 starts, the measurement processing unit 4 causes the optical interferometer 3 to emit the measurement beam 15 in step S82. Then, the measurement processing unit 4 generates an optical interference signal according to an optical path difference between the measurement beam 15 reflected and returned from the keyhole 22 and the reference beam.

In step S83, the measurement processing unit 4 calculates the depth (that is, the penetration depth) of the keyhole 22 using the position data and the optical interference signal. Then, the control unit 6 stores data (hereinafter, referred to as keyhole depth data) indicating the calculated depth of the keyhole 22 in the memory 31.

In step S84, the control unit 6 determines whether or not the measurement of the depth of keyhole 22 is completed. When the measurement is completed (step S84: YES), the flow proceeds to step S85. On the other hand, when the measurement is not completed (Step S84: NO), the flow returns to Step S82.

In step S85, after the laser processing method illustrated in FIG. 33 is terminated, the control unit 6 issues an instruction to terminate the measurement of the depth of the keyhole 22 to the measurement processing unit 4.

The instruction to start the measurement of the depth of the keyhole 22 and the instruction to terminate the measurement of the depth of the keyhole 22 are issued not by the control unit 6 but by the user using a manipulation unit or the like that is not illustrated.

Effect

As described above, the laser processing apparatus 1 according to the present embodiment has: the laser oscillator 5 that oscillates the processing laser beam 11 to the processing point 20 to be processed on the surface (processing surface 19) of the workpiece 18; the optical interferometer 3 that emits the measurement beam 15 to the processing point 20 and generates an optical interference intensity signal based on interference caused by an optical path difference between the measurement beam 15 and the reference beam reflected at the processing point 20; the first mirror 13 that changes the traveling directions of the processing laser beam 11 and the measurement beam 15; the second mirror 17 that changes the incident angle of the measurement beam 15 to the first mirror 13; the beam shift mechanism 38 that changes an incident position of the measurement beam 15 to the first mirror 13; the lens 14 that focuses the processing laser beam 11 and the measurement beam 15 on the processing point; the memory 31 that stores the corrected processing data corrected in advance to eliminate the deviation of the arrival position of at least one of the processing laser beam 11 and the measurement beam 15 on the surface of the workpiece 18, which is caused by chromatic aberration of the lens 14 and the deviation between the angle of the keyhole 22 and the angle of the measurement beam 15, which is generated at the processing point 20, the corrected processing data being for processing the workpiece 18; the control unit 6 that controls the laser oscillator 5, the first mirror 13, the second mirror 17, and the beam shift mechanism 38, based on the corrected processing data; and the measurement processing unit 4 that measures the depth of the keyhole 22 generated at the processing point by the processing laser beam 11 based on the optical interference intensity signal.

With such a configuration, it is possible to correct the deviation between the arrival positions of the processing laser beam 11 and the measurement beam 15 on the processing surface 19 after the processing laser beam 11 and the measurement beam 15 pass through the lens 14, which is caused by the chromatic aberration of magnification of the lens 14. Further, it is possible to correct a deviation between angles of the processing laser beam 11 and the measurement beam 15 on the processing surface 19 after the processing laser beam 11 and the measurement beam 15 pass through the lens 14, which is caused by the chromatic aberration of magnification of the lens 14, and a deviation in the angle of the measurement beam 15 from the keyhole forming axis 42 due to a change of the keyhole forming state due to the processing speed. Accordingly, the depth of the keyhole 22 by the optical interferometer 3 can be suitably measured. That is, the depth of the keyhole can be accurately measured.

Figure 35:
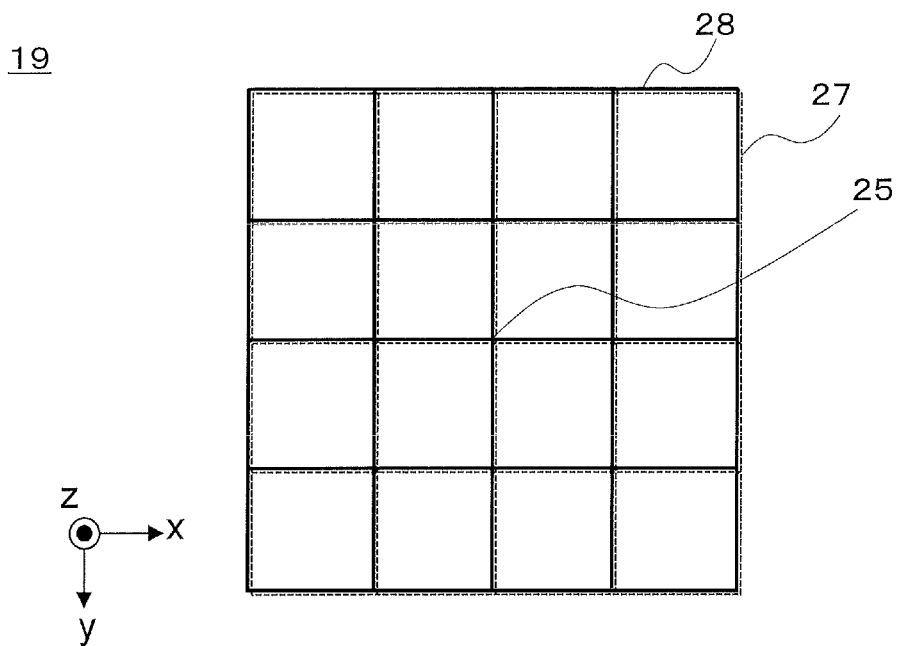
FIG. 35 is a diagram schematically illustrating the trajectories of the processing laser beam and the measurement beam on the processing surface in a state in which the influence of the chromatic aberration of magnification is corrected by operating the second mirror.

FIG. 35 is a diagram illustrating the trajectories of the processing laser beam 11 and the measurement beam 15 on the processing surface 19 in a state in which influence of the chromatic aberration of magnification is corrected due to operation of the second mirror 17. According to FIG. 35, unlike FIG. 21, it can be seen that the processing beam trajectory 28, which is a trajectory of the processing laser beam 11, the measurement beam trajectory 27, which is a trajectory of the measurement beam 15, and the respective grid points coincide with each other. Further, at this time, the measurement optical axis 23c (see FIG. 20) of the measurement beam 15 coincides with the keyhole forming axis 42 (see FIG. 19).

The present disclosure is not limited to the description of the above embodiment, and various modifications can be made without departing from the gist of the present disclosure. Hereinafter, modifications will be described.

Modification 1

In the embodiment, a case where the second mirror 17 which is a galvanometer mirror is used to change the optical axis direction of the measurement beam 15 has been described as an example. However, the present disclosure is not limited thereto.

The second mirror used in the laser processing apparatus 1 is installed, for example, between the measurement beam inlet 9 and the dichroic mirror 12, and may change the optical axis direction of the measurement beam 15 under the control of the control unit 6.

Figure 36:
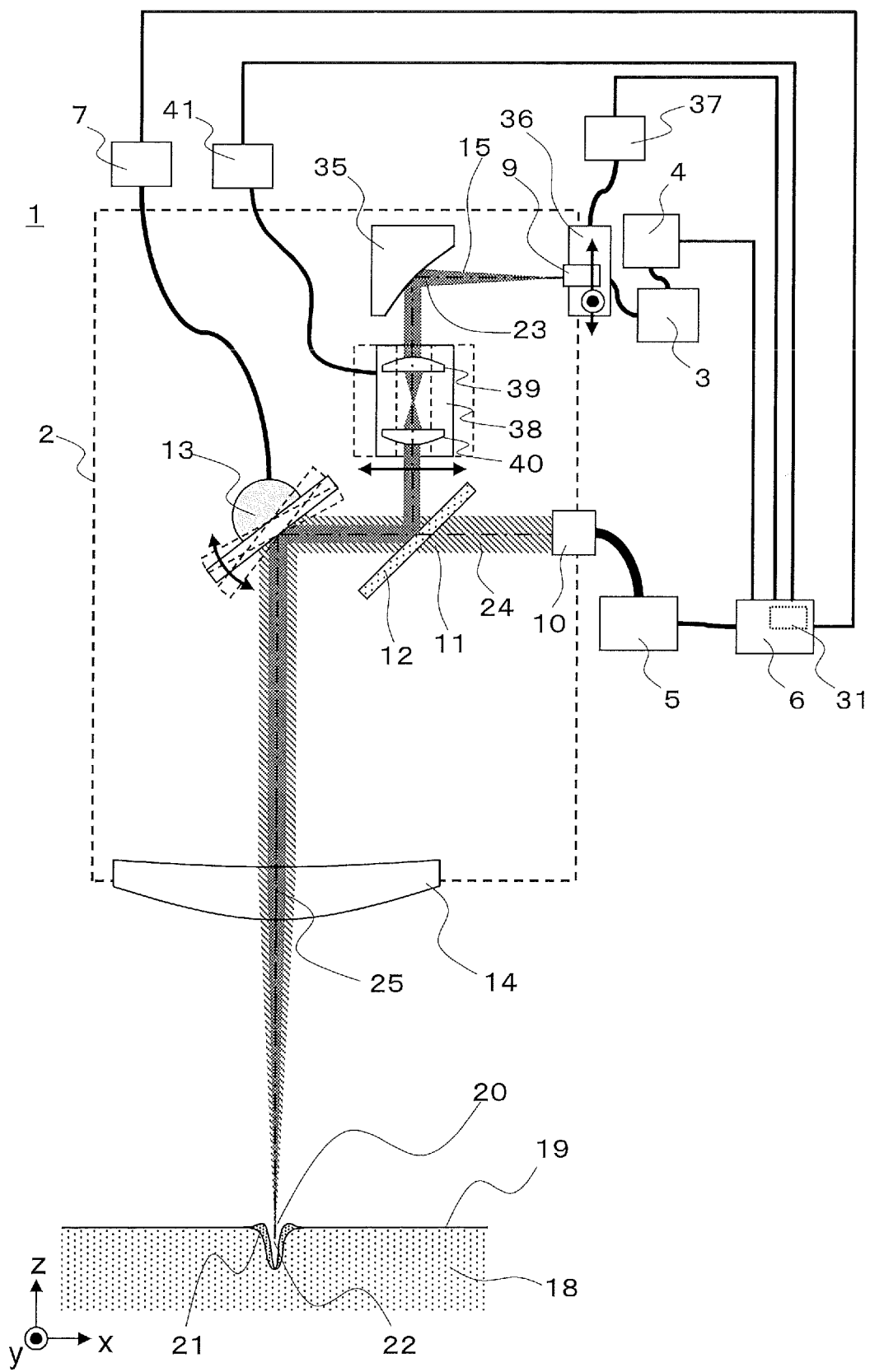
FIG. 36 is a diagram schematically illustrating a configuration of a laser processing apparatus according to modification 1 of the present disclosure.

FIG. 36 illustrates the second mirror 35 having such a configuration. FIG. 36 is a diagram schematically illustrating the laser processing apparatus 1 using the second mirror 35.

The laser processing apparatus 1 illustrated in FIG. 36 has a second mirror 35 instead of the second mirror 17 illustrated in FIG. 16 and the like, and further has a movable stage 36 and a stage driver 37. The laser processing apparatus 1 illustrated in FIG. 36 does not have the collimating lens 16 illustrated in FIG. 16 and the like.

The second mirror 35 is a parabolic mirror fixed between the measurement beam inlet 9 and the dichroic mirror 12.

The movable stage 36 is provided at the measurement beam inlet 9.

The stage driver 37 is electrically connected to the control unit 6, and operates the movable stage 36 on the basis of an instruction from the control unit 6. Accordingly, the movable stage 36 moves in the yz direction (see a vertical two-way arrow in the drawing) in the drawing. That is, the movement direction of the movable stage 36 is a two-axis direction perpendicular to the measurement optical axis 23.

An emission end of the measurement beam 15 in the measurement beam inlet 9 is disposed to coincide with a focal point of the second mirror 35. Accordingly, the measurement beam 15 becomes a parallel beam after being reflected by the second mirror 35 and travels to the dichroic mirror 12.

As the movable stage 36 moves, the angle of the measurement optical axis 23 from the second mirror 35 to the dichroic mirror 12 changes. Accordingly, the same effect as in a case where the second mirror 17 which is a galvanometer mirror is used can be obtained.

The second mirror used in the laser processing apparatus 1 may be a MEMS mirror or the like.

Modification 2

In the embodiment, a case where the first lens 39 and the second lens 40 installed in the beam shift mechanism 38 have the same focal length has been described as an example. However, the present disclosure is not limited thereto.

For example, the focal length of the second lens 40 may be made longer than the focal length of the first lens 39, and a distance between the lens principal points of the first lens 39 and the second lens 40 may be a sum of the focal length of the first lens 39 and the focal length of the second lens 40. Such a configuration is generally called a Kepler beam expander.

In the above-described configuration, the amount by which the measurement optical axis 23 of the measurement beam 15 moves in parallel is increased in proportion to a ratio of the focal length of the second lens 40 to the focal length of the first lens 39. Accordingly, the movement range of the beam shift mechanism 38 can be set small. Therefore, a stage driven by a piezoelectric element can be adopted as a parallel translation stage of the beam shift mechanism 38. Therefore, quick and accurate positioning can be realized.

The above-described configuration is also suitable for synchronizing the first mirror 13 and the second mirror 17. Further, the angle of the measurement optical axis 23 of the measurement beam 15 is reduced in inverse proportion to the ratio of the focal length of the second lens 40 to the focal length of the first lens 39. Therefore, the influence of a positioning error such as a temperature drift of the second mirror 17 can be reduced. Therefore, highly accurate positioning can be realized.

Modification 3

In the embodiment, a case where the beam shift mechanism 38 is disposed after the second mirror 17 between the measurement beam inlet 9 and the dichroic mirror 12 has been described as an example. However, the present disclosure is not limited thereto.

For example, the second mirror 17 may be disposed after the beam shift mechanism 38. However, when the spot diameter of the measurement beam 15 at the processing point 20 needs to be set small, the beam diameter of the measurement beam 15 incident on the lens 14 needs to be set large. Therefore, when the second mirror 17 is disposed after the beam shift mechanism 38, the mirror size of the second mirror 17 needs to be increased in accordance with the beam diameter of the measurement beam 15, which may have a disadvantage in that a measurement head becomes large.

To avoid this disadvantage, it is preferable that for example, the beam shift mechanism 38 is disposed between the measurement beam inlet 9 and the dichroic mirror 12 after the second mirror 17, and the beam shift mechanism 38 is configured as a beam expander. With such a configuration, the spot diameter of the measurement beam 15 at the processing point 20 can be set small while the size of the second mirror 17 is maintained small.

Therefore, the depth of the keyhole 22 having a small diameter can be measured with high accuracy without increasing the size of the measurement head.

Modification 4

In the embodiment, a case where the beam shift mechanism 38 that is a parallel translation stage is used to parallel translate the measurement optical axis 23 of the measurement beam 15 has been described as an example. However, the present disclosure is not limited thereto.

The beam shift mechanism 38 used in the laser processing apparatus 1 is installed, for example, between the measurement beam inlet 9 and the dichroic mirror 12, and may parallel translate the measurement optical axis 23 under the control of the control unit 6.

Figure 37:
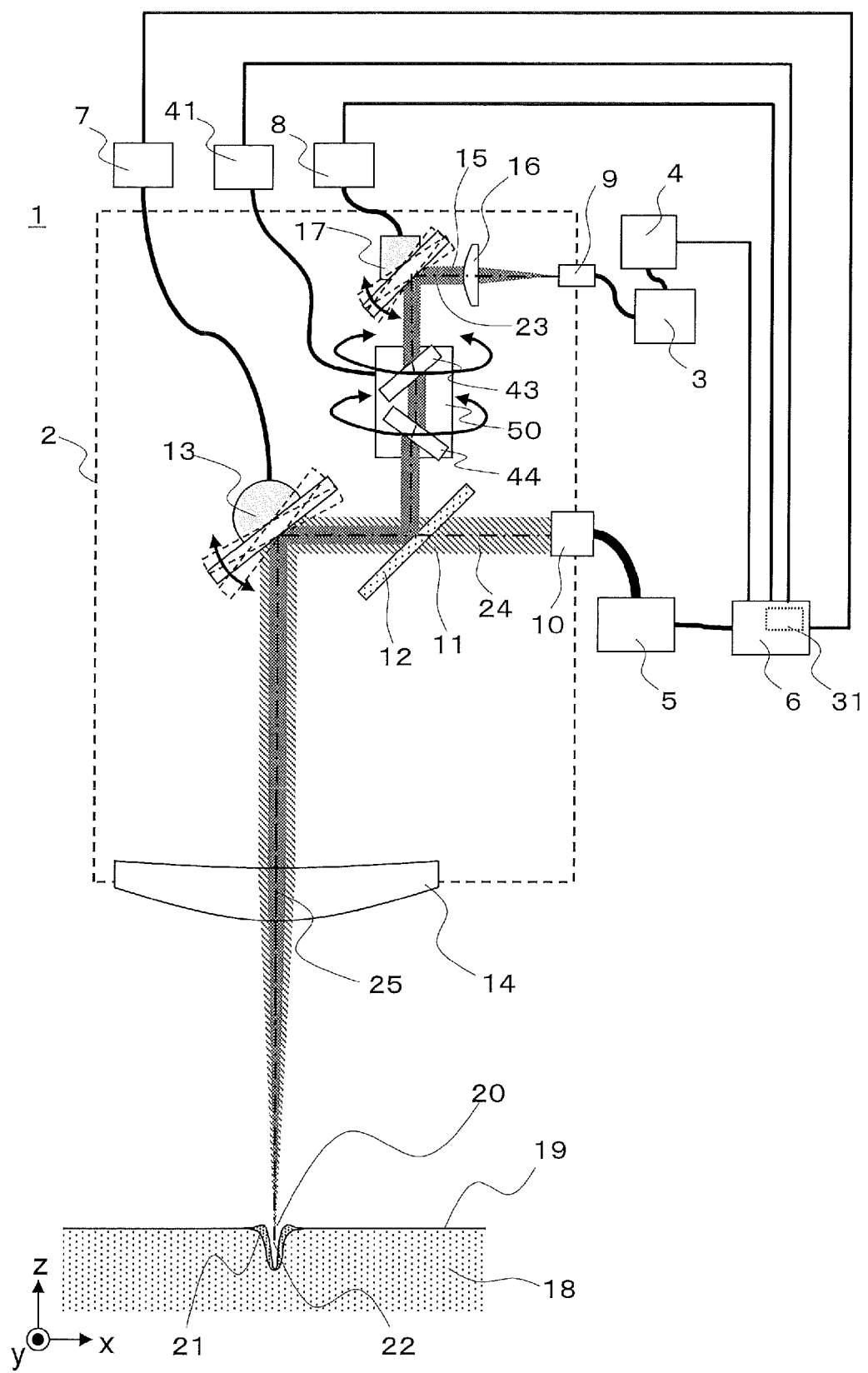
FIG. 37 is a diagram schematically illustrating a configuration of a laser processing apparatus according to modification 4 of the present disclosure.
Figure 38:
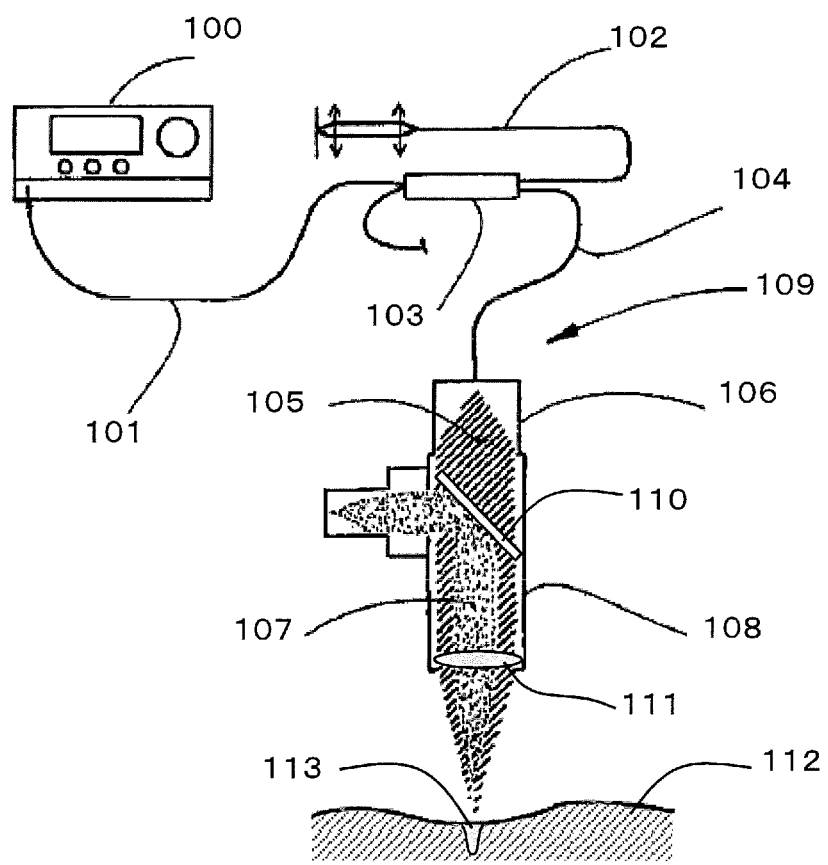
FIG. 38 is a diagram illustrating an example of a laser processing apparatus according to the prior art.

FIG. 37 illustrates a beam shift mechanism 50 having such a configuration. FIG. 37 is a diagram schematically illustrating the laser processing apparatus 1 using the beam shift mechanism 50.

The laser processing apparatus 1 illustrated in FIG. 37 has the beam shift mechanism 50 instead of the beam shift mechanism 38 illustrated in FIG. 16. The beam shift mechanism 50 is fixed between the measurement beam inlet 9 and the dichroic mirror 12.

The beam shift mechanism 50 has a first parallel plane substrate 43 and a second parallel plane substrate 44. The first parallel plane substrate 43 and the second parallel plane substrate 44 are made of, for example, glass.

In the beam shift mechanism 50, each of the first parallel plane substrate 43 and the second parallel plane substrate 44 is inclined with respect to the measurement optical axis 23 of the measurement beam 15 when the second mirror 17 is located at the original position.

Further, each of the first parallel plane substrate 43 and the second parallel plane substrate 44 rotates about the measurement optical axis 23 of the measurement beam 15 from the second mirror 17. A rotation position (which may be referred to as a rotation angle) of each of the first parallel plane substrate 43 and the second parallel plane substrate 44 is controlled based on an instruction value from the third driver 41.

When the measurement beam 15 passes through the first parallel plane substrate 43 and the second parallel plane substrate 44, due to refraction of the beam, the outgoing beam is moved and emitted parallel to the incident beam. Therefore, it is possible to parallel translate the measurement optical axis 23 of the measurement beam 15 to a predetermined position in the xy direction in the drawing according to a combination of the rotation positions of the first parallel plane substrate 43 and the second parallel plane substrate 44. Therefore, even when the beam shift mechanism 50 is used, the same effect as in a case where the beam shift mechanism 38 having the first lens 39 and the second lens 40 illustrated in FIG. 16 and the like is used can be obtained.

The above-described modifications may be appropriately combined.

The laser processing apparatus, the laser processing method, and the correction data generation method of the present disclosure are useful for laser-processing, for example, automobiles, electronic components, and the like.

What is claimed is:

1. A laser processing apparatus comprising:
   a laser oscillator that oscillates a processing laser beam at a processing point to be processed on a surface of a workpiece;
   an optical interferometer that emits a measurement beam to the processing point and generates an optical interference intensity signal based on interference generated due to an optical path difference between the measurement beam reflected at the processing point and a reference beam;
   a first mirror that changes traveling directions of the processing laser beam and the measurement beam;
   a second mirror that changes an incident angle of the measurement beam onto the first mirror;
   a lens that focuses the processing laser beam and the measurement beam on the processing point;
   a memory that stores corrected processing data;
   a control unit that controls the laser oscillator, the first mirror, and the second mirror based on the corrected processing data; and
   a measurement processing unit that derives a depth of a keyhole generated at the processing point by the processing laser beam, based on the optical interference intensity signal,
   wherein the corrected processing data is corrected processing data for processing the workpiece, which is corrected in advance to eliminate a deviation of an arrival position of at least one of the processing laser beam and the measurement beam, which is caused by chromatic aberration of the lens, on the surface of the workpiece.

2. The laser processing apparatus according to claim 1, wherein
   the processing laser beam and the measurement beam have different wavelengths.

3. The laser processing apparatus according to claim 1, wherein
   the first mirror and the second mirror are galvanometer mirrors, respectively.

4. The laser processing apparatus according to claim 1, wherein
   the first mirror is a galvanometer mirror,
   the second mirror is a parabolic mirror, and
   the laser processing apparatus further comprises a movable stage that moves the measurement beam entering the second mirror.

5. The laser processing apparatus according to claim 1, wherein
   the lens is an fθ lens.

6. A laser processing apparatus comprising:
   a laser oscillator that oscillates a processing laser beam at a processing point to be processed on a surface of a workpiece;
   an optical interferometer that emits a measurement beam to the processing point and generates an optical interference intensity signal based on interference generated due to an optical path difference between the measurement beam reflected at the processing point and a reference beam;
   a first mirror that changes traveling directions of the processing laser beam and the measurement beam;
   a second mirror that changes an incident angle of the measurement beam onto the first mirror;
   a lens that focuses the processing laser beam and the measurement beam on the processing point;
   a memory that stores corrected processing data;
   a control unit that controls the laser oscillator, the first mirror, and the second mirror based on the corrected processing data; and
   a measurement processing unit that derives a depth of a keyhole generated at the processing point by the processing laser beam, based on the optical interference intensity signal,
   wherein the corrected processing data is data obtained by correcting processing data generated in advance for processing the workpiece such that a deviation of an arrival position of at least one of the processing laser beam and the measurement beam on the surface of the workpiece, which is caused by the chromatic aberration of the lens, and a deviation between an angle of the keyhole and an angle of the measurement beam are eliminated.

7. The laser processing apparatus according to claim 6, wherein
   the corrected processing data includes an output indication value indicating an intensity of the processing laser beam oscillated from the laser oscillator, a first indication value indicating an operation amount of the first mirror, a second indication value indicating an operation amount of the second mirror, and a third indication value indicating an operation amount of the beam shift mechanism, the values being set in advance for each processing point.

8. The laser processing apparatus according to claim 6, wherein
   a wavelength of the processing laser beam and a wavelength of the measurement beam are different from each other.

9. The laser processing apparatus according to claim 6, wherein
the lens is an fθ lens.

10. The laser processing apparatus according to claim 6, wherein
the first mirror and the second mirror are galvanometer mirror, respectively.

11. The laser processing apparatus according to claim 6, wherein
the first mirror is a galvanometer mirror,
the second mirror is a parabolic mirror, and
the laser processing apparatus further comprises a movable stage that changes an emission angle from the measurement beam of the second mirror.

12. The laser processing apparatus according to claim 6, wherein
the beam shift mechanism is a stage that is parallel translated in two or more axes in a direction perpendicular to an optical axis of the measurement beam when the second mirror is located at an original position, and has a first lens and a second lens.

13. The laser processing apparatus according to claim 12, wherein
a focal length of the second lens is set longer than a focal length of the first lens, and
the second mirror and the beam shift mechanism are arranged such that the measurement beam from the optical interferometer passes through the second mirror and the beam shift mechanism in this order.

14. The laser processing apparatus according to claim 6, wherein
the beam shift mechanism has a first parallel plane substrate and a second parallel plane substrate that rotate about an optical axis of the measurement beam.

15. A laser processing method performed by a laser processing apparatus, the laser processing apparatus having: a first mirror that changes traveling directions of a processing laser beam and a measurement beam; a second mirror that changes an incident angle of the measurement beam onto the first mirror; and a lens that focuses the processing laser beam and the measurement beam on a processing point on a surface of a workpiece to be processed, the method comprising:
irradiating the workpiece with the processing laser beam and the measurement beam based on corrected processing data by controlling the first mirror and the second mirror; and
measuring a depth of a keyhole generated at the processing point by the processing laser beam based on interference caused by an optical path difference between the measurement beam and a reference beam reflected at the processing point.

16. The laser processing method according to claim 15, wherein
the corrected processing data is corrected processing data for processing the workpiece, which is corrected in advance to eliminate a deviation of an arrival position of at least one of the processing laser beam and the measurement beam on the surface of the workpiece, which is caused by chromatic aberration of the lens.

17. The laser processing method according to claim 15, the laser processing method being performed by the laser processing apparatus further having a beam shift mechanism that changes an incident position of the measurement beam to the first mirror, the method comprising:
controlling the first mirror, the second mirror, and the beam shift mechanism based on the corrected processing data, and irradiating the workpiece with the processing laser beam and the measurement beam; and
measuring the depth of the keyhole generated at the processing point by being irradiated with the processing laser beam based on the interference caused by an optical path difference between the measurement beam and the reference beam reflected at the processing point, wherein
the corrected processing data is data obtained by correcting processing data generated for processing the workpiece in advance to eliminate a deviation of an arrival position of at least one of the processing laser beam and the measurement beam on the surface of the workpiece, which is caused by the chromatic aberration of the lens, and a deviation between an angle of the keyhole and an angle of the measurement beam.

18. A laser processing apparatus comprising:
a laser oscillator that oscillates a processing laser beam at a processing point to be processed on a surface of a workpiece;
an optical interferometer that emits a measurement beam to the processing point and generates an optical interference intensity signal based on interference generated due to an optical path difference between the measurement beam reflected at the processing point and a reference beam;
a first mirror that changes traveling directions of the processing laser beam and the measurement beam;
a second mirror that changes an incident angle of the measurement beam onto the first mirror;
a lens that focuses the processing laser beam and the measurement beam on the processing point;
a memory that stores corrected processing data;
a control unit that controls the laser oscillator, the first mirror, and the second mirror based on the corrected processing data; and
a measurement processing unit that derives a depth of a keyhole generated at the processing point by the processing laser beam, based on the optical interference intensity signal,
wherein the corrected processing data includes an output indication value indicating an intensity of the processing laser beam oscillated by the laser oscillator, a first indication value indicating an operation amount by which the first mirror is operated, and a second indication value indicating an operation amount by which the second mirror is operated, the values being set in advance for each processing point.

19. The laser processing apparatus according to claim 18, wherein
the processing laser beam and the measurement beam have different wavelengths.

20. The laser processing apparatus according to claim 18, wherein
the first mirror and the second mirror are galvanometer mirrors, respectively.

21. The laser processing apparatus according to claim 18, wherein:
the first mirror is a galvanometer mirror,
the second mirror is a parabolic mirror, and
the laser processing apparatus further comprises a movable stage that moves the measurement beam entering the second mirror.

22. The laser processing apparatus according to claim 18, wherein
the lens is an fθ lens.

\* \* \* \* \*